Aug. 11, 1953  G. T. RANDOL  2,648,232
AUTOMOTIVE TRANSMISSION CONTROL
Filed March 18, 1948  13 Sheets-Sheet 8
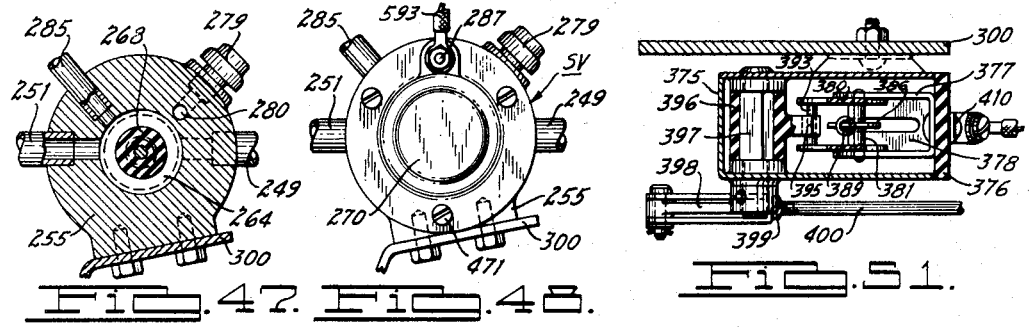
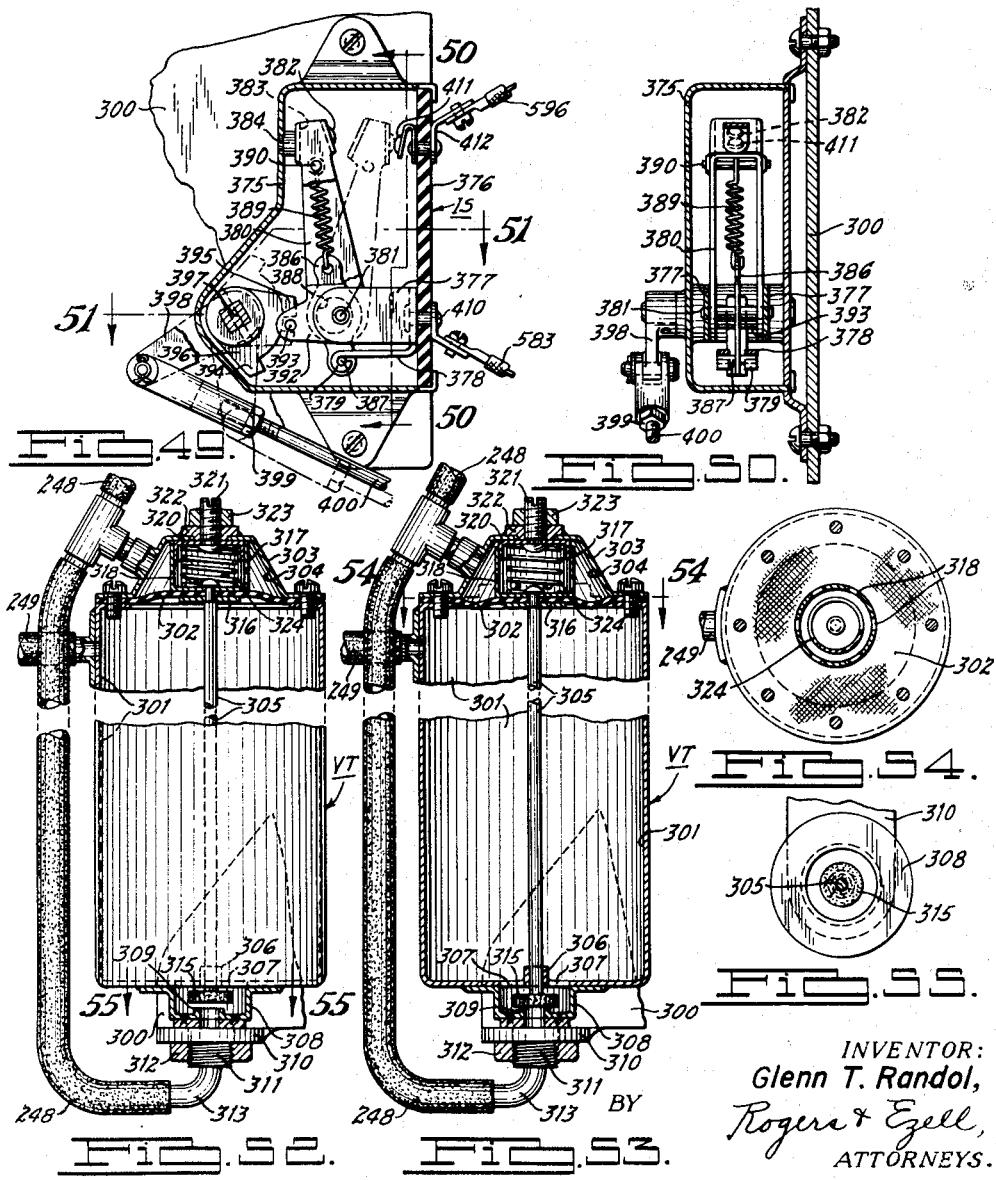
INVENTOR:
Glenn T. Randol,
BY Rogers & Ezell,
ATTORNEYS.

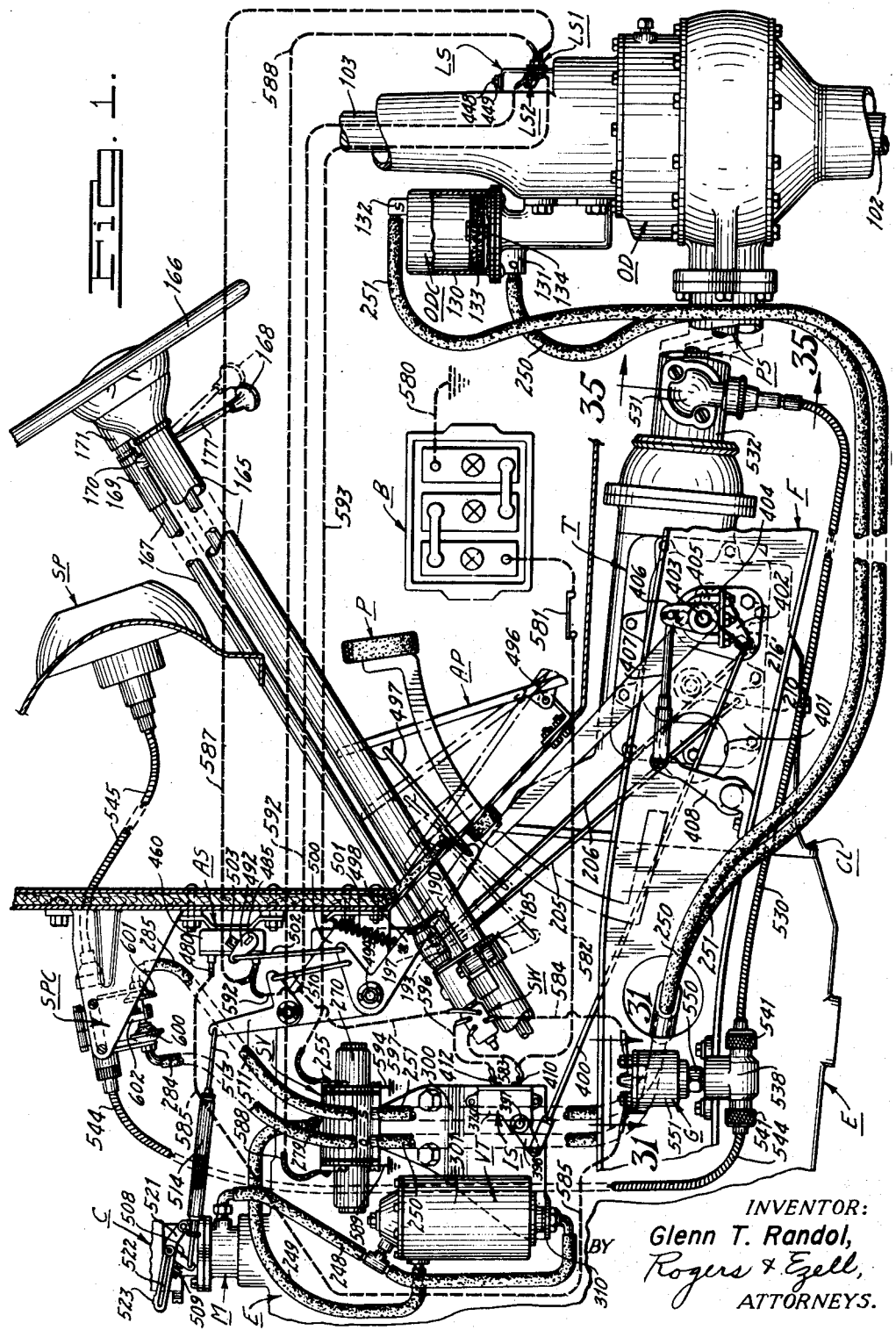

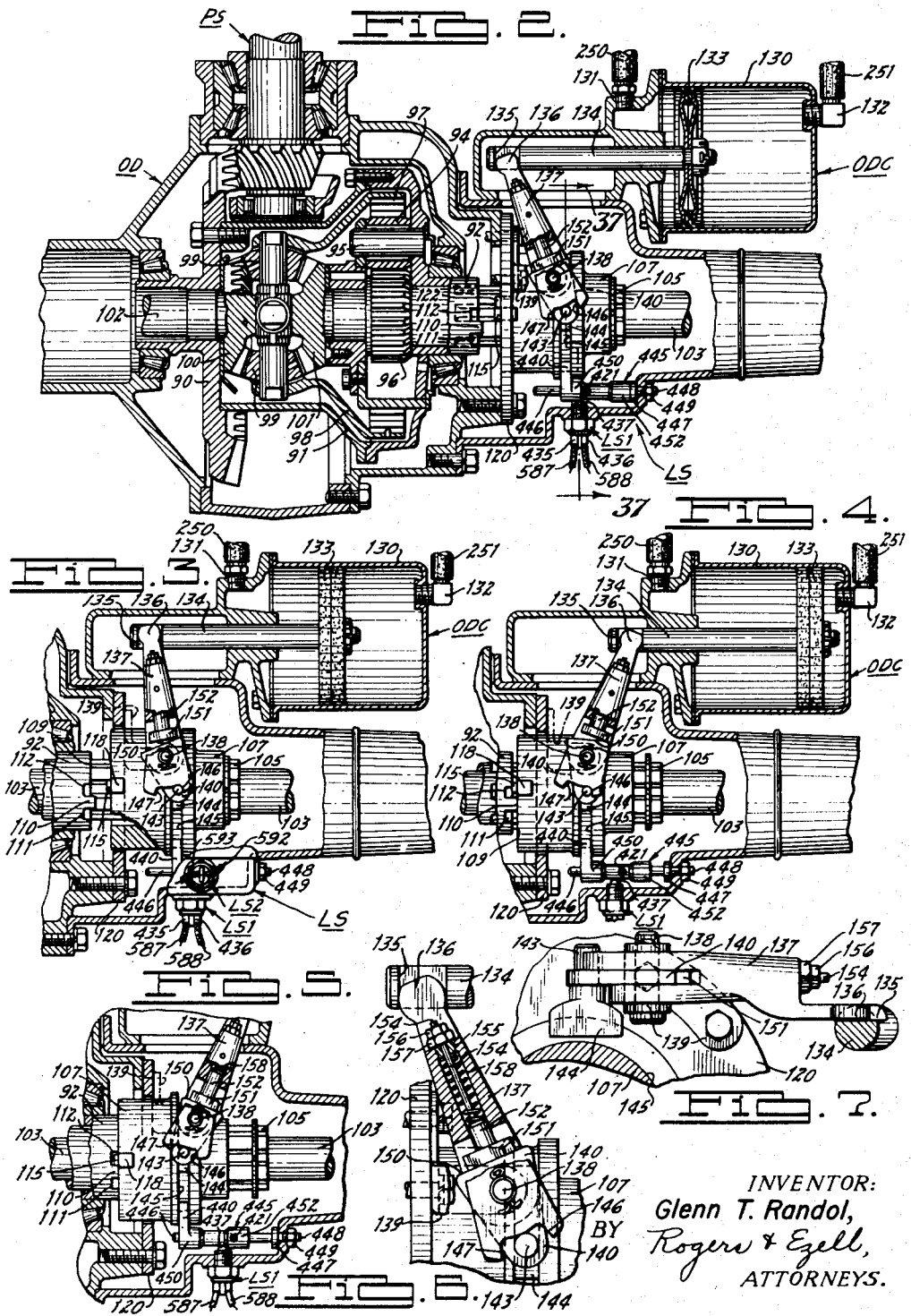

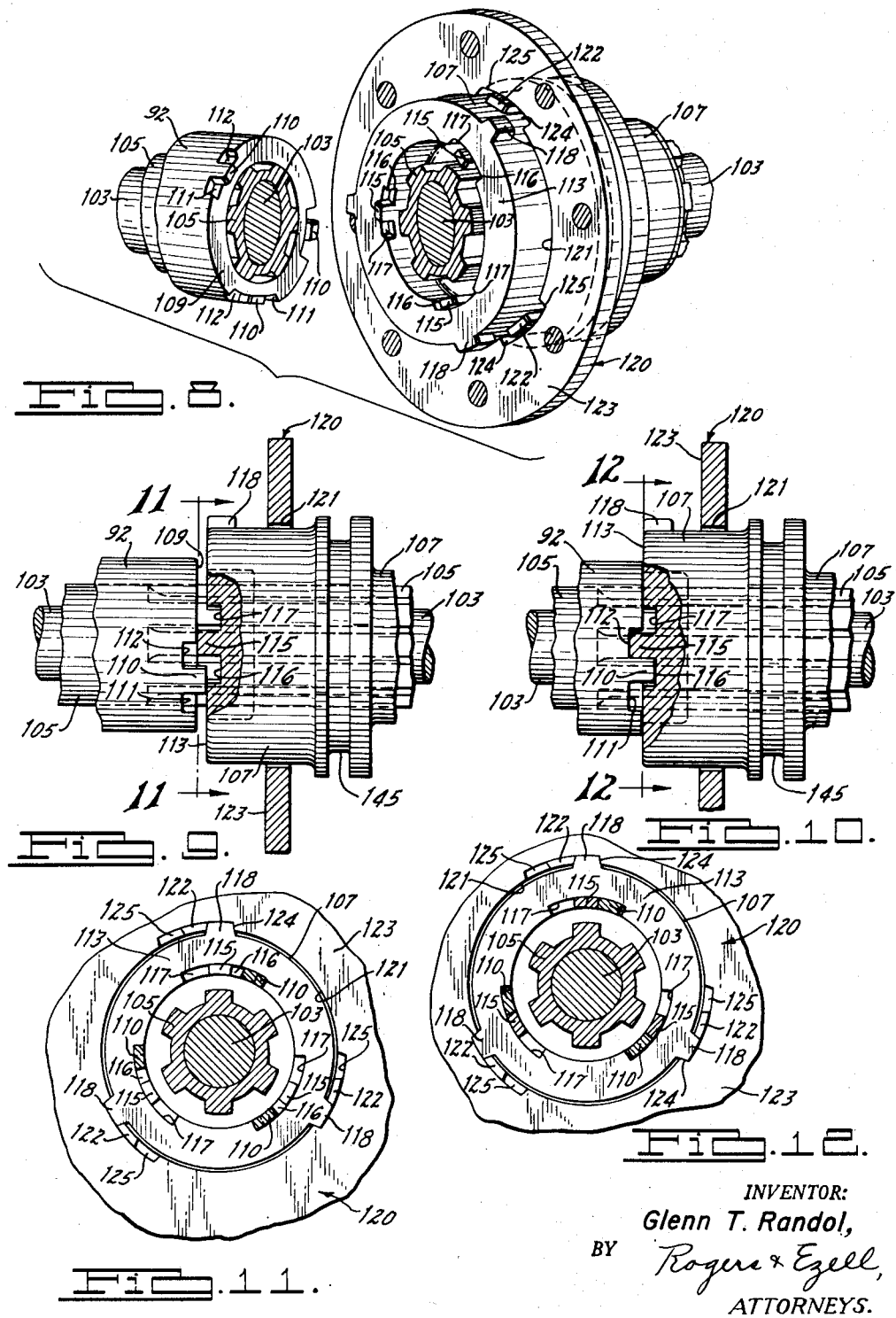

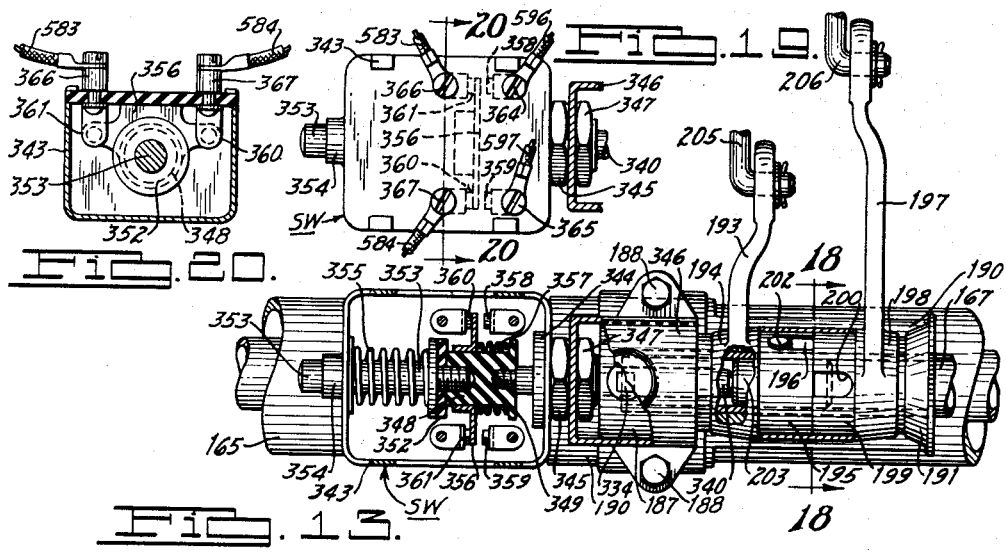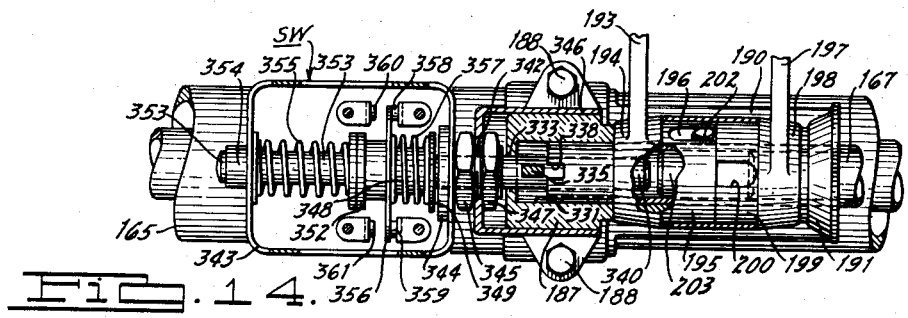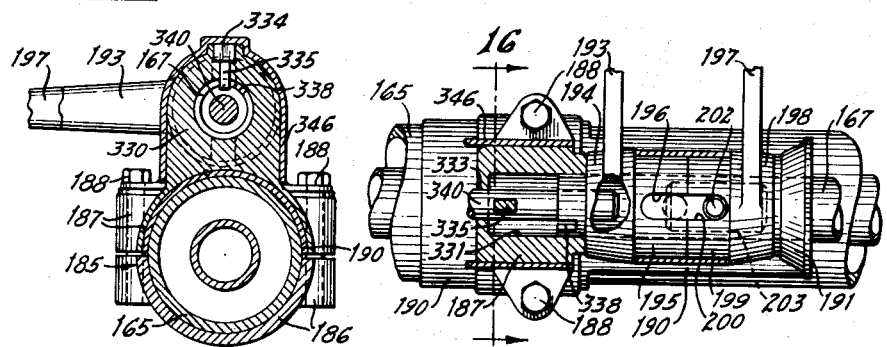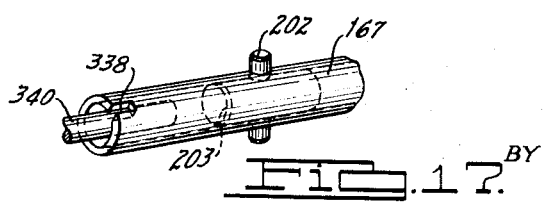

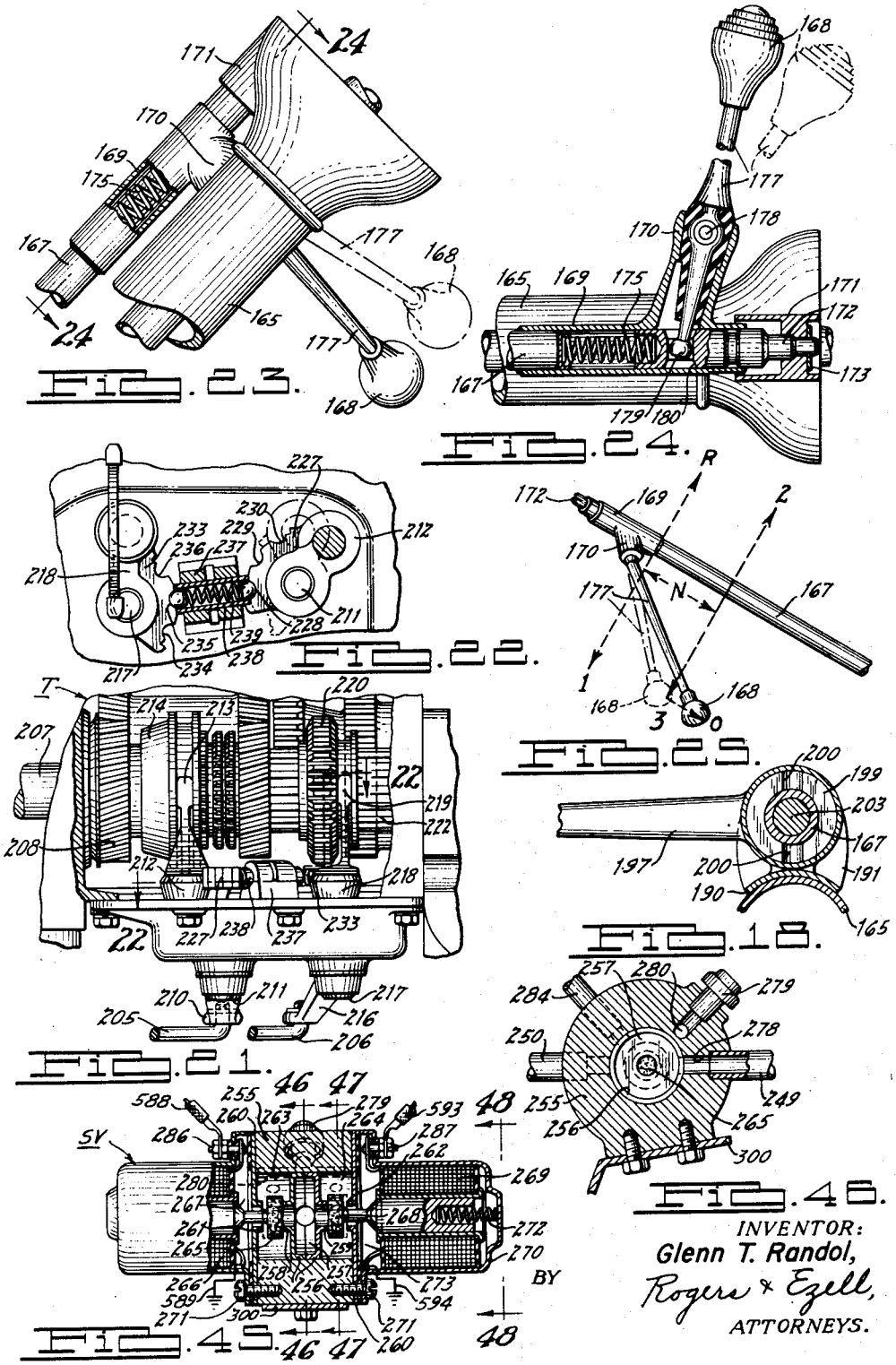

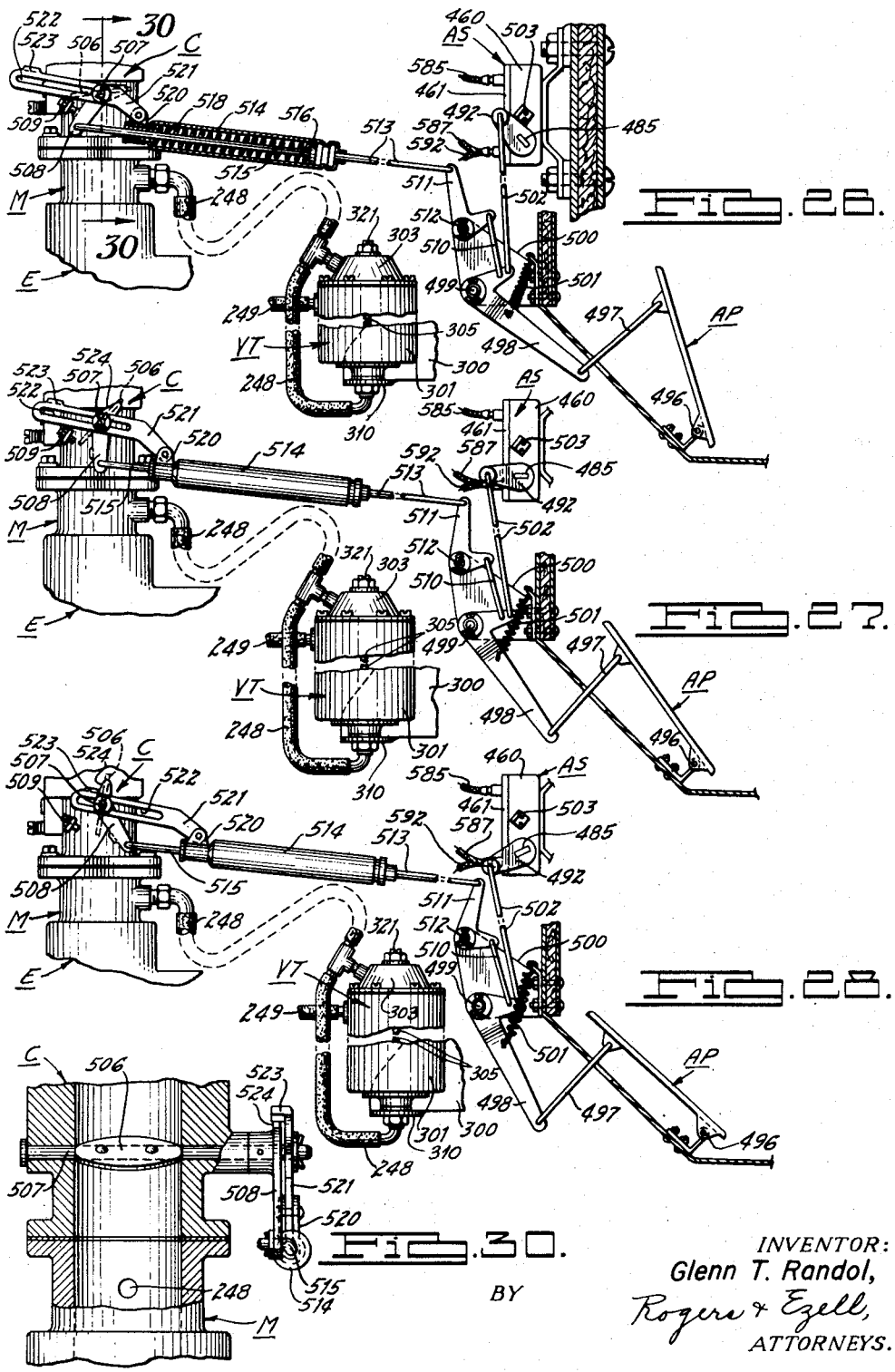

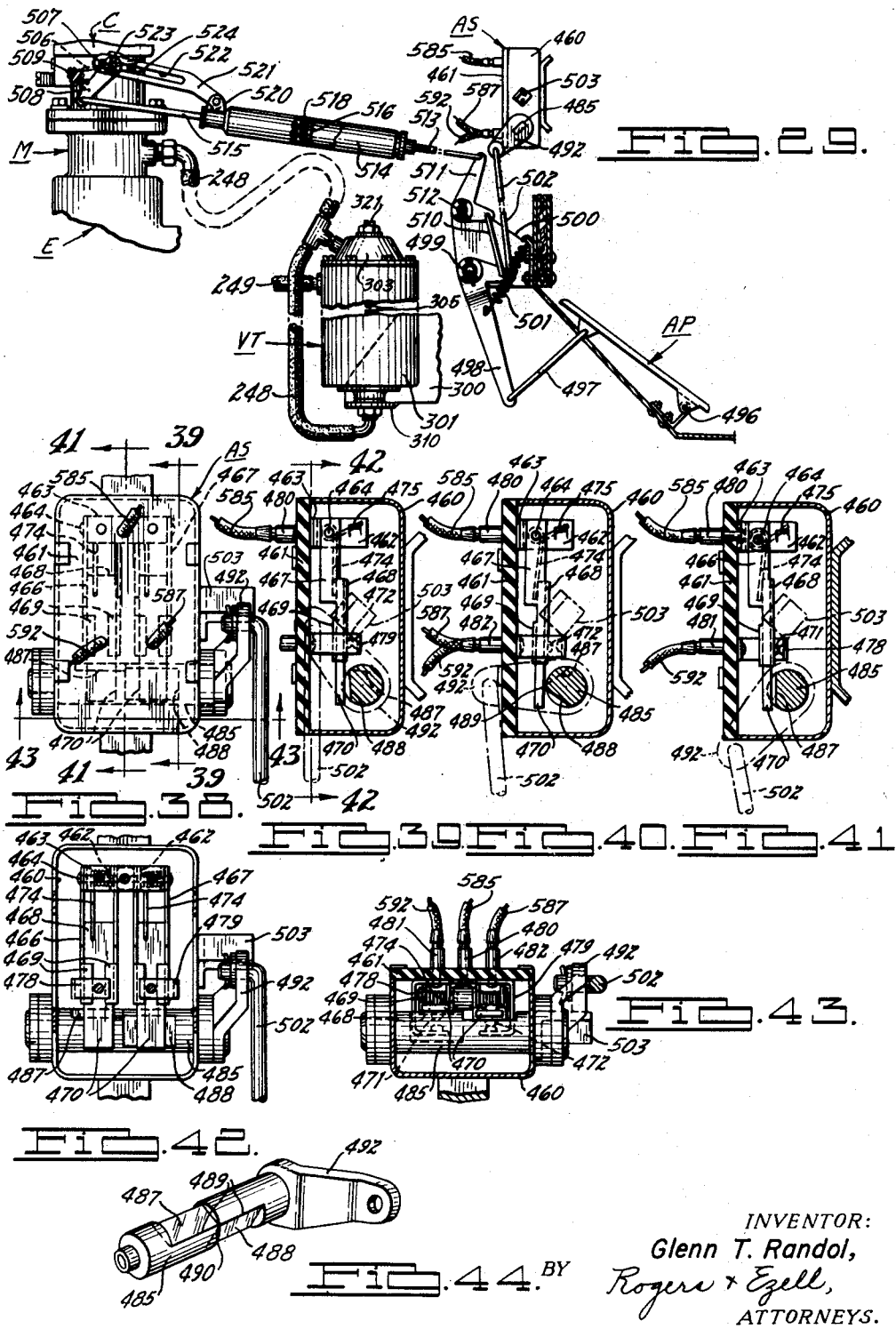

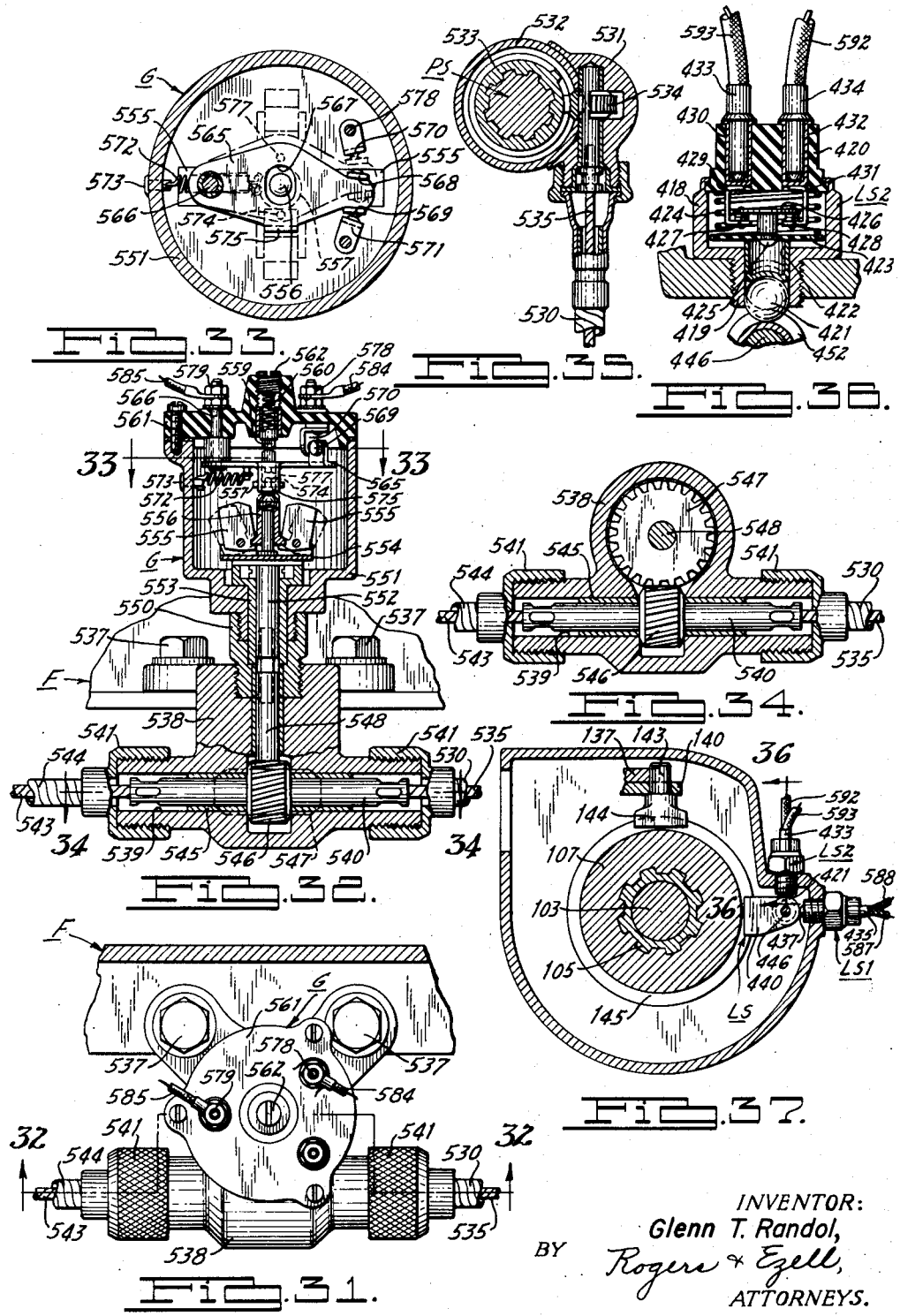

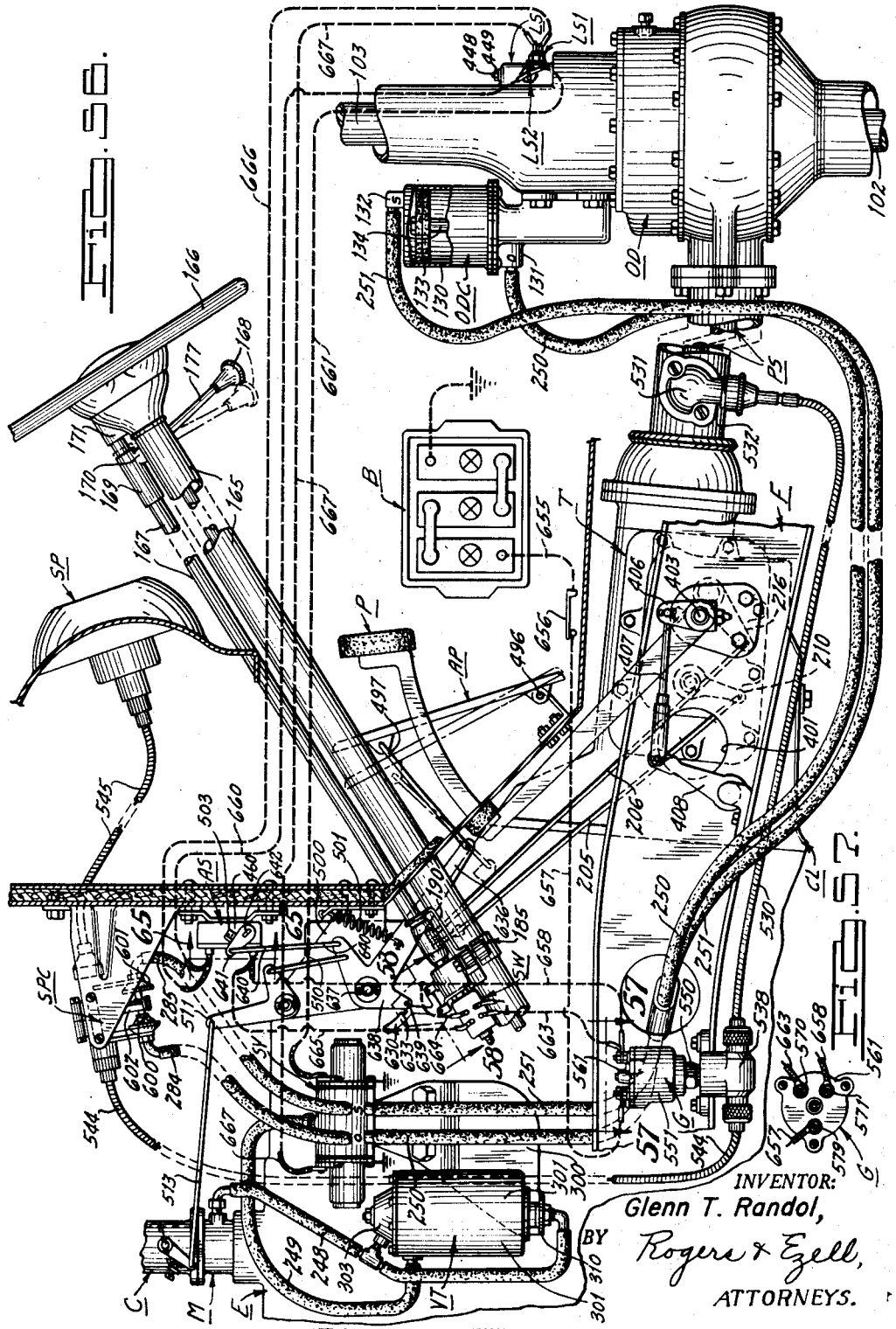

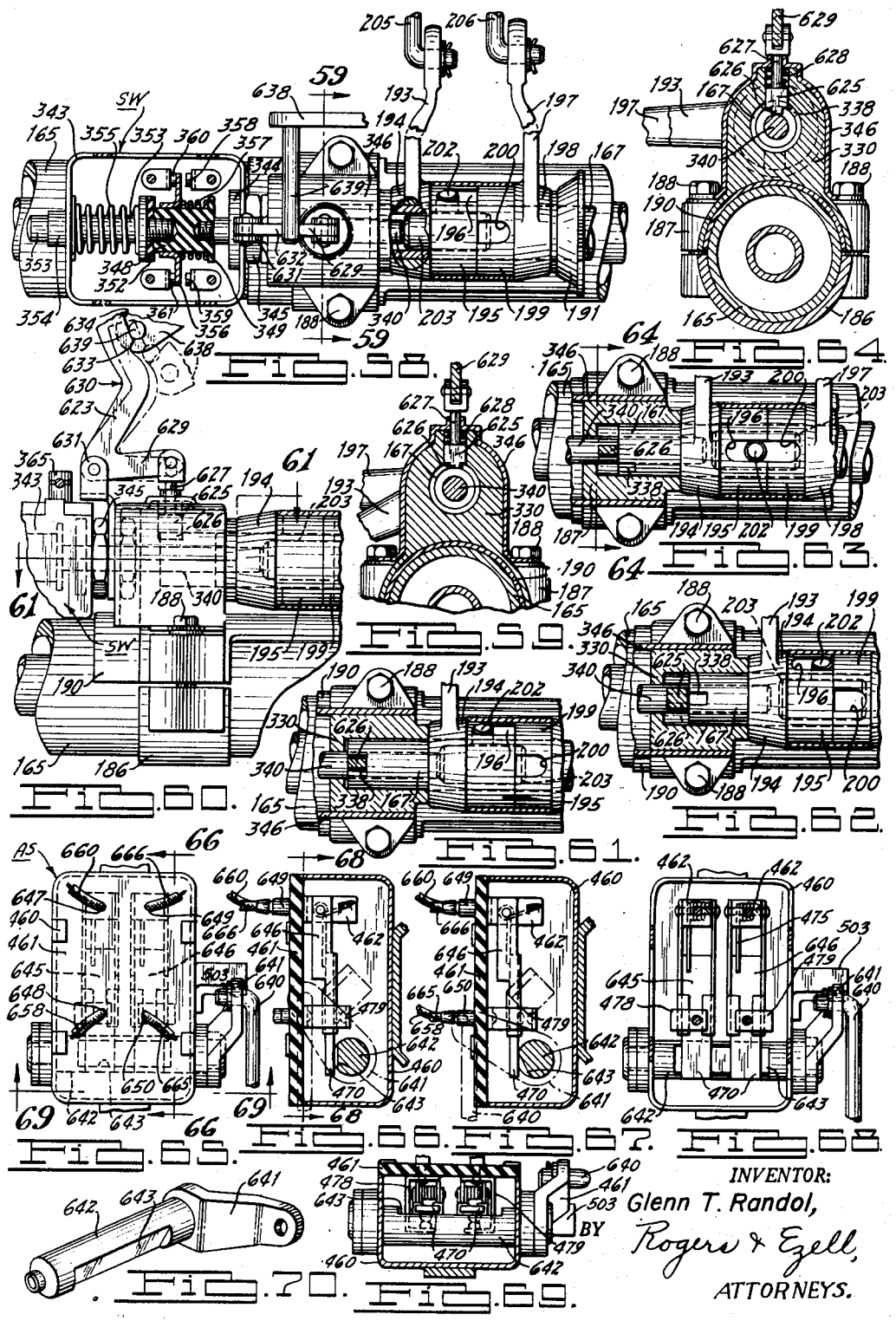

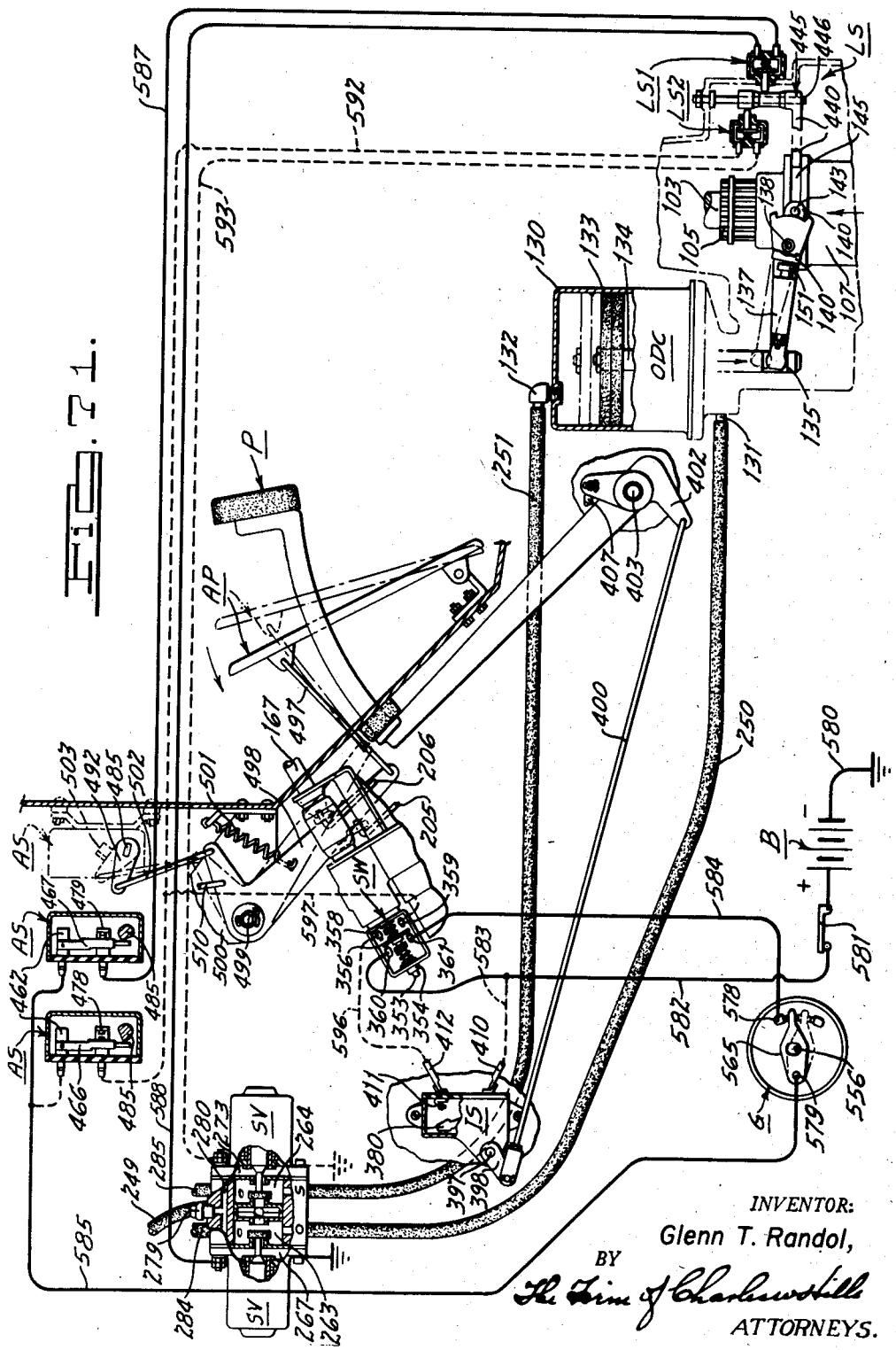

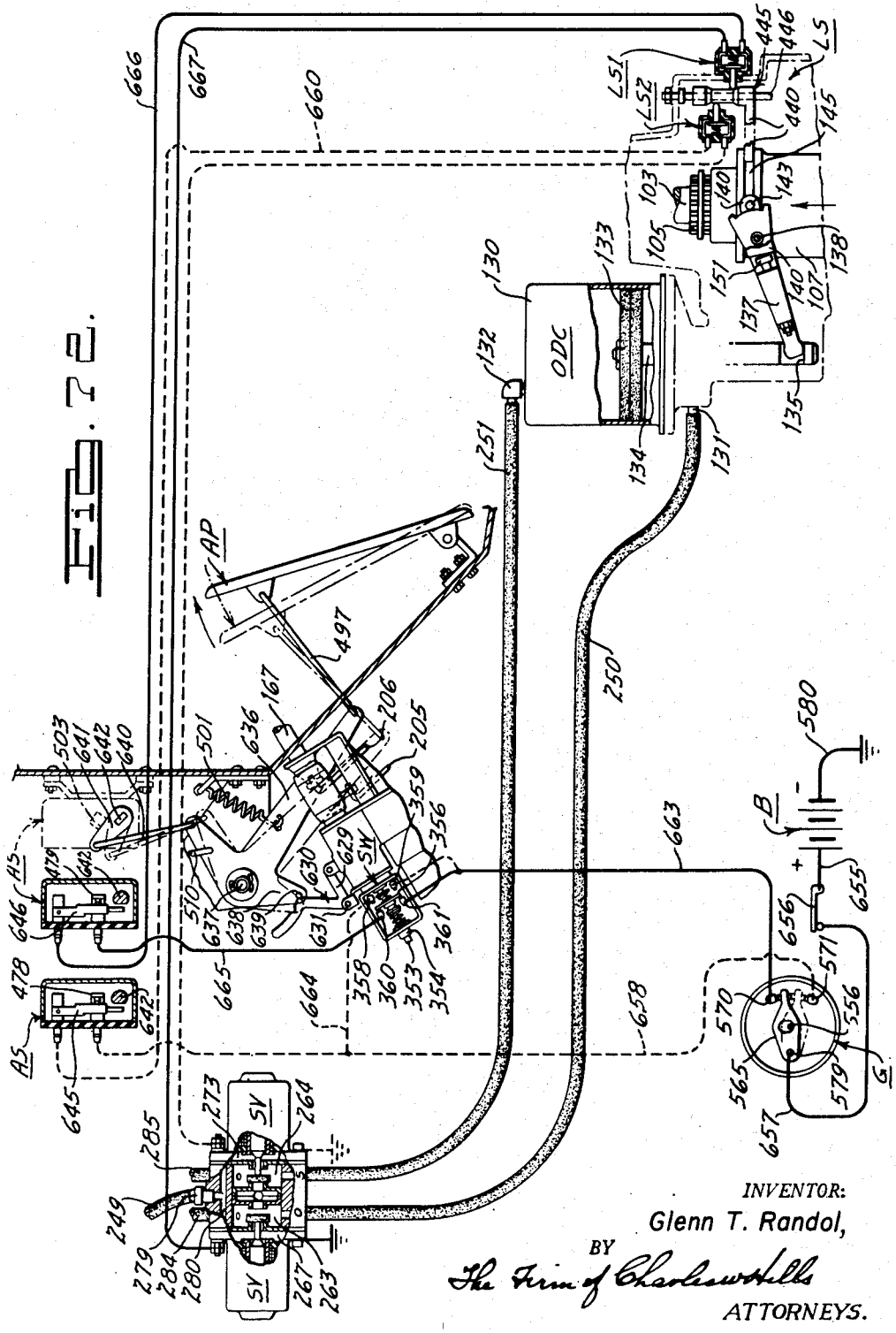

Patented Aug. 11, 1953

2,648,232

UNITED STATES PATENT OFFICE 2,648,232

AUTOMOTIVE TRANSMISSION CONTROL

Glenn T. Randol, Fort Lauderdale, Fla.

Application March 18, 1948, Serial No. 15,519

73 Claims. (Cl. 74—472)

This invention relates to a transmission control, and particularly to a control for regulating the operation of a power means that is shiftable to effect changing the speed ratios between a driving member or shaft and a driven member or shaft. A particular aspect of this invention relates to a control for a power-operated overdrive mechanism employed on motor vehicles.

In a further and more specific aspect, this invention relates to a control for a power shifting means that will establish two speed drives for an automobile or like vehicle, especially where the two speed drives are obtained by an overdrive mechanism, and where the control is actuated by particular operations of conventional driver-manipulated elements of the automobile that are found in the driving compartment thereof.

Broadly, an object of the invention is to provide a control of the foregoing type that is operated by readily understandable manipulations of the conventional control elements of the vehicle, which control elements include a hand shift control member, an accelerator pedal and a clutch pedal.

Another object of the invention is to superpose the controls of the power shift upon predetermined conventionally operated shifts, so that the conventionally operated shifting can be performed without involving operation of the final power shifting means; and more particularly so that the power shifting means can be operated only after the conventional shifting has proceeded to a given point, establishing one of its speed ratios with inhibition of power shift at any other point in the manual or conventional operation. This object is especially pertinent to a combination of a multispeed drive power transmission with an overdrive, to prevent superposition of overdrive on low speed drives.

Another object of the invention is to interconnect the control for the power shifting means with the hand gear shifting lever and one of the other operator-controlled elements, and especially the accelerator pedal, wherein the hand shift element is movable to a regular position to establish one speed drive, and is movable to a position supplemental to that regular position to condition the control, so that, upon subsequent operation of the second mentioned operator-controlled element between a first and a second position, the power means will establish another speed drive. More particularly, an object of the invention is to provide such a power shifter control that will cause establishment of the other speed drive upon release of the accelerator pedal, and will return to the previous speed drive upon full depression of the accelerator pedal.

It is a further object of the present invention to provide a transmission control utilizing a plurality of personally-operable control members to selectively establish one of a plurality of speed drives.

An additional object is to provide a transmission control utilizing a plurality of personally-operable members to establish selectively a plurality of speed drives, including personally-operable means for conditioning a control mechanism.

Another object of the invention is to provide a control for an automatic transmission shifter mechanism having a conditioning means operable into a position prerequisite to the operation of the automatic shifting means, and having mechanism inter-controlled with the accelerator pedal, so that, when the accelerator pedal is released to one position, the automatic means will produce one speed drive which may continue thereafter until the accelerator pedal is depressed to a predetermined second position, whereupon the automatic shifter means will establish another speed drive, which will thereupon continue to be effective until the accelerator pedal is again released to its position requisite to cause return of the power mechanism and the shift to the first mentioned speed drive. A specific object of the invention is to incorporate said conditioning means with the hand shift lever to be operated by movement of the hand shift lever to a position supplemental to one of the conventional positions thereof.

Another specific object is to provide means insuring the operation of the power shifting means to a predetermined one of its positions whenever the hand shift lever is returned from its supplemental position to one of its standard positions. Another object is to provide a mechanism insuring that the power means can be rendered operable only when the hand shift lever is movable from a selected one of its standard positions to said position supplemental thereto, and to insure further that, when the hand shift lever is returned to any of its standard positions, the power mechanism will cause its shift to establish a predetermined one of its speed drives.

Another object of the invention is to provide a control for a power shifter wherein, dependent upon the speed of the vehicle at a rate above a predetermined value, the power shifting means may be operated to one position by movement of the accelerator pedal to an extreme position, and held in such speed ratio until the accelerator pedal is thereafter again moved to an extreme position, irrespective of the speed of the vehicle.

Specifically, it is an object of the invention to accomplish the foregoing in either one of two ways, to-wit, where the accelerator pedal is movable to one of its extreme positions to cause one speed drive to be established and is moved to the other of its extreme positions to restore the first speed drive; and alternatively to provide that, where the accelerator pedal is moved to one of its extreme positions, the power means will establish one of its speed drives, and where, thereafter, the accelerator pedal is returned to the same one of its extreme positions, the power means will be operated to restore its first speed drive.

Another object is to provide supplemental movement of the hand gear shifting lever to an automatic position, and to provide automatic control of the power shift thereafter under regulation of the accelerator pedal; and more specifically to provide automatic shift by movement of the accelerator pedal to extreme positions after the vehicle has attained a predetermined speed.

An object of the invention is to provide a power-operated shifter control wherein shifting may be effected as a result of the interruption of torque transmitted through gearing; and especially it is an object to provide manual control that, in one action, energizes the power shifter device and interrupts the torque transmitted through the gearing so that the shifting can take place in controlled timed order.

Other objects of the invention include the provision of accelerator pedal operated switch means that attain the functions aforesaid of an accelerator switch, and particularly one wherein such functions are attained in a simple and relatively inexpensive structure.

A further object is to provide a control having the functions of pre-energizing the power shifting means, and in timed relation thereto interrupting the torque transmitted through the gearing, wherein the power means flexes a spring-like means a predetermined degree when the power means is initially energized, so that the spring means applies energy to aid the shift when torque is interrupted; and to provide such a spring or spring-like means that may be flexed a predetermined extent to permit full travel of the power means, although the toothed elements of the transmission are not fully intermeshable at the time the power means so shifts them, whereby the shifting can be completed by the spring means upon substantial synchronization of the toothed elements. A further and specific object is to provide a noise reducing feature in the shift means to prevent or to reduce noise in the event the gearing does not immediately mesh when the power means is applied thereto.

Thus, it is an additional object of the present invention to provide a transmission control including intermating elements operatively interposed between a power means and a transmission, and provided with resilient actuating means for biasing the elements toward and away from engagement to establish and interrupt activation of a transmission gear set.

Another object related to that next above is the provision of means conditioning intermating elements for subsequent engagement to activate a transmission gear set upon manipulation of a personally-operable means to interrupt torque transferral through the transmission.

A further object is to provide a vacuum storing means that will provide ample vacuum for the vacuum-operated shifter means, despite the fact that the shifting may take place when the manifold vacuum is reduced by opening of the carburetor butterfly valve. A particular object is to provide such a vacuum storage means in combination with the aforesaid yieldable means in the shifter arrangement, so that a quick, noiseless operation of the vacuum-powered portion of the shifting means may take place, and store energy for completion of the shift in the yieldable spring means, whereby the latter may complete the shift while the vacuum means holds the spring means in energized shifting condition. Another object of the vacuum storage feature is to render available a sufficient vacuum for effecting the shifting of the vacuum power means of the shifter device immediately during a part of the releasing action of the accelerator pedal and before the butterfly valve is completely closed, whereby, when torque through the mechanism is interrupted, the power means will be immediately capable of effecting the shift.

Another object of the invention is to provide a throttle closing mechanism that is operated by a slight supplemental movement of the accelerator pedal from its normally maximum depressed position. Stated somewhat more particularly, it is an object of the invention to provide a means to interrupt torque and to restore maximum vacuum conditions by substantially full depression of the accelerator pedal. A specific object in this mechanism is to provide a sensible distinction between the supplemental depressing operation of the accelerator pedal and the normal depressing operation of the accelerator pedal.

Another object is to provide a control including a switch mechanism operated by the accelerator pedal, and a butterfly valve control operated by the accelerator pedal, so arranged that, when the accelerator pedal is operated to an extreme position, the control will operate to effect a shifting of the power means which will thereafter be maintained through normal accelerator operation until the accelerator pedal is again moved to an extreme position.

Many other objects will appear from the description to follow.

In the drawings:

Figure 1 is a somewhat schematic view of the control with the related parts of an automobile (non-energized portions of the electrical circuit being shown in dotted lines);

Figure 2 is a horizontal medial section through the overdrive shifter mechanism and rear axle system, showing the mechanism in its overdriving position;

Figure 3 is a fragmentary section of the overdrive shifting mechanism after initial energization to shift to direct drive position;

Figure 4 is a view similar to Figure 3 showing the overdrive power means fully shifted, but the shifter mechanism in temporary locked out position owing to lack of intermeshing of the clutch teeth;

Figure 5 is a view similar to Figures 3 and 4, but showing a full engagement of the clutch of the overdrive shifter to obtain direct drive speed ratio;

Figure 6 is a somewhat enlarged view of the compound overdrive collar shifter lever;

Figure 7 is a view of the compound shifter lever, taken from the right of Figure 6 and turned 90°;

Figure 8 is a sectionalized perspective view of the overdrive clutch collar, showing both the movable and the fixed elements with which it is selectively engageable;

Figure 9 is an enlarged partly broken away section of the overdrive clutch mechanism, shown immediately ahead of direct drive engaging position when the toothed elements are in abutting relation, and corresponding to Figure 4;

Figure 10 is a view similar to Figure 9 showing the clutch collar in fully engaged direct drive position and corresponding to Figure 6;

Figure 11 is a transverse view of the clutch collar mechanism, taken on the line 11—11 of Figure 9;

Figure 12 is a view similar to Figure 11, but taken on the line 12—12 of Figure 10, showing full engagement of the clutch teeth;

Figure 13 is an enlarged plan view of the lower end of the steering column shifter control shaft and shifter arms actuated thereby as shown in Figure 1 including the associated selector switch which is turned 90° from normal position to facilitate illustrating a horizontal section thereof, the mechanism being shown in overdrive;

Figure 14 is a view of the lower end of the steering column shifter control shaft assembly similar to Figure 13, with the lower bearing of the shifter control shaft in section, with the selector switch cover in section, and with the shifter mechanism in third speed (direct drive) position;

Figure 15 is a view of the lower end of the shifter control shaft mechanism exclusive of the selector switch, similar to Figure 14 but with the shifter control shaft in upper neutral position;

Figure 16 is a transverse section through the lower bearing for the shifter control shaft, taken on the line 16—16 of Figure 15;

Figure 17 is a perspective view of the lower end of the shifter control shaft, with the cross pin, and showing the upper end of the selector switch actuating pin;

Figure 18 is a section through the shifter arm hub assembly on the line 18—18 of Figure 13;

Figure 19 is a plan view of the selector switch mechanism;

Figure 20 is a transverse section through the selector switch mechanism, taken on the line 20—20 of Figure 19;

Figure 21 is a fragmentary plan view of a typical three speeds forward and reverse automobile transmission;

Figure 22 is a section on the line 22—22 of Figure 21, showing the selector lock mechanism of this transmission;

Figure 23 is a side elevation, partly broken away, of the upper end of the steering column, shifter control shaft, and the shifter shaft handle;

Figure 24 is an axial section through the shifter control shaft at its upper end, taken on the line 24—24 of Figure 23;

Figure 25 is a diagrammatic view of the shifter handle, showing its several operative positions;

Figure 26 is a somewhat diagrammatic view in section of the assembly, controlled by the accelerator pedal, shown in released position of the accelerator pedal;

Figure 27 is a view similar to Figure 26 of the accelerator pedal assembly, with the pedal shown substantially in an intermediate depressed position;

Figure 28 is a view of the accelerator pedal assembly shown in maximum normal depressed position of the accelerator pedal;

Figure 29 is a view of the accelerator pedal assembly with the accelerator pedal in extra depressed position;

Figure 30 is a sectional view through the carburetor butterfly valve and operating linkage, taken substantially on the line 30—30 of Figure 26;

Figure 31 is a plan view of the governor and its switch;

Figure 32 is a broken vertical section through the governor and its switch, taken on the line 32—32 of Figure 31;

Figure 33 is a transverse section through the upper end of the governor switch, taken on the line 33—33 of Figure 32;

Figure 34 is a transverse section through the power take-off means of the governor, taken on the line 34—34 at the bottom of Figure 32;

Figure 35 is a section through the power take-off means from the propeller shaft of the vehicle to the governor and speedometer operating cable;

Figure 36 is a transverse view through one of the governor switches;

Figure 37 is a transverse view through the overdrive mechanism, showing the two limit switches of the overdrive, and taken on the line 37—37 of Figure 2;

Figure 38 is a front elevation of the accelerator switch;

Figure 39 is a transverse section through the right side of the accelerator switch as it appears in Figure 38;

Figure 40 is another transverse section through the accelerator switch at the same point of the section of Figure 39, but showing the accelerator switch in position wherein the accelerator pedal is depressed substantially to the intermediate position of Figure 27;

Figure 41 is a section through the middle of the accelerator switch, taken on the line 41—41 of Figure 38, but showing the condition of the switch where the accelerator pedal is depressed to the position of Figure 29;

Figure 42 is a front view of the accelerator switch mechanism similar to Figure 38, but with the front panel removed, the section being taken on the line 42—42 of Figure 39;

Figure 43 is a transverse horizontal section through the bottom of the accelerator switch, taken on the line 43—43 of Figure 38;

Figure 44 is a perspective view of the accelerator switch operating shaft and crank arm assembly;

Figure 45 is a view partly in medial section through the selector valve;

Figure 46 is a transverse section through the selector valve, taken on the line 46—46 of Figure 45;

Figure 47 is a transverse section through the selector valve, taken on the line 47—47 of Figure 45;

Figure 48 is an end view of the selector valve, taken from the line 48—48 of Figure 45;

Figure 49 is a transverse front-to-rear vertical section through the interrupter switch;

Figure 50 is a side-to-side section through the interrupter switch, taken on the line 50—50 toward the right of Figure 49;

Figure 51 is a transverse horizontal section through the interrupter switch, taken on the line 51—51 of Figure 49;

Figure 52 is a side elevation of the vacuum accumulator tank and its control, the vacuum tank being shown partially in section with its valve open;

Figure 53 is a view similar to Figure 52, but showing the vacuum tank in full section, with its control valve closed;

Figure 54 is a transverse section through the top of the vacuum tank, taken on the line 54—54 of Figure 53;

Figure 55 is a transverse section through the bottom of the vacuum tank, taken on the line 55—55 of Figure 52;

Figure 56 is a somewhat schematic view of a modified form of shifter control with the related parts of an automobile (non-energized portions of the electrical circuit being shown in dotted lines);

Figure 57 is a top plan view of the governor switch, taken on the line 57—57 of Figure 56;

Figure 58 is an enlarged plan view of the lower end of the shift control shaft in the modification with the associated selector switch turned 90° from normal position and shown in horizontal section with the other parts partly broken away, the shift being in its overdrive position;

Figure 59 is a transverse section, taken on the line 59—59 of Figure 58, through the lower bearing of the shift control shaft, showing the limiting pin construction for the shifter control shaft;

Figure 60 is a side elevation of the limit pin control and adjacent parts, as they would appear from the underside of Figure 58, but with the pin in overdrive position;

Figure 61 is a sectional view of the lower end of the shifter control shaft and its lower bearing, taken approximately on the line 61—61 of Figure 60;

Figure 62 is a section similar to Figure 61, but showing the shifter control shaft and limit pin in third speed (direct drive) position;

Figure 63 is a view similar to Figure 61 and Figure 62, but showing the shifter control shaft in its neutral position;

Figure 64 is a transverse section through the lower bearing for the shifter control shaft, taken on the line 64—64 of Figure 63;

Figure 65 is a front elevation of the accelerator switch of this modification;

Figure 66 is a transverse vertical section through the selector switch, taken on the line 66—66 at the right side of Figure 65;

Figure 67 is a section similar to Figure 66 of the accelerator switch, but showing the position when the accelerator pedal is partly depressed;

Figure 68 is a section on the line 68—68 to the left of Figure 66;

Figure 69 is a transverse horizontal section through the bottom of the accelerator switch on the line 69—69 of Figure 65;

Figure 70 is a perspective view of the accelerator switch operating cam shaft and crank;

Figure 71 is a diagrammatic illustration of the electrical circuits and associated controls of Figure 1 (non-energized circuits being shown in broken lines); and Figure 72 is a diagrammatic illustration of the electrical circuits and associated controls of Figure 56 (non-energized circuits being shown in broken lines).

The following description is of the illustrated embodiments of the invention, wherein the control is applied to an overdrive for use in supplement to a conventional manually-operated change-speed transmission, associated with a pedally-operated clutch and a pedally-operated accelerator. Also the embodiment shows a vacuum-operated overdrive, and electrical control devices relaying to a vacuum power mechanism the sequence of operations desired. These particular elements of the embodiments are combined and improved in novel ways; but, as is known in the art, there are numerous well known substitutes for these elements, and such substitutes are intended to be embodied in the broader claims.

General assembly

Figure 1 shows schematically parts of an automobile. There is an engine E, mounted on a frame F. The engine drives through a clutch CL, controlled by a clutch pedal P, to a three speeds forward and reverse speed selective sliding gear transmission T, from which a propeller shaft PS leads. The shaft PS enters a combination differential and overdrive housing OD, from which the axles extend laterally. Thus, in the illustration, there is a conventional transmission T, plus an overdrive; but, in a broader sense, both of these jointly constitute the "transmission."

The overdrive illustrated is of the vacuum operated type, deriving vacuum (i. e., a subatmospheric pressure) from an intake manifold M, of the engine E, with which manifold a carburetor C is associated. The manifold M is connected to a vacuum trapping tank VT, that, in turn, is connected to an electromagnetic selector valve SV. The valve SV is oppositely connected to the ends of an overdrive power cylinder ODC.

The selector valve SV is the relay by which an electrical control system is interconnected into the vacuum system. The selector valve, therefore, has movable elements that are moved by the electrical control system, and find reflection in the corresponding elements of the vacuum system. To this extent, the selector valve itself constitutes a power-operated means actuated by the electrical system in a given order, to obtain a shift; although, in a more restricted sense, the power-operated means in the vacuum power means, with or without the selector valve. In certain types of transmission, and of overdrive, the electrical mechanism directly produces the shift, without relaying through vacuum power means.

The electrical system includes six switches in the full embodiment of Figure 1. There is a selector switch SW positioned in response to predetermined movements of the manual shift lever. As stated, the illustration is of a conventional three speeds forward and reverse sliding gear type of transmission, controlled by a steering column mounted hand lever. The selector switch SW has two positions, one to condition the system for a first speed ratio or drive and the other to condition it for choice of either the first ratio or a second speed ratio or drive. In the illustrated embodiment, especial mechanism is provided to limit the power shift to provide a fourth ratio drive obtainable only after the third (direct drive) speed ratio; and, in such case, the two ratios controlled by the system are the conventionally designated third speed and a fourth speed, the latter being an overdrive. When the hand lever is in third speed drive position, the selector switch SW is in position to preselect third speed drive, which corresponds to the normal situation arising from conventional shifting to third speed. When the hand lever is released in third speed position, and that only, it is automatically displaced to a supplemental position, without return from third speed position to neutral; and, in this supplemental position, it moves the selector switch SW to position to pre-condition the system for shift to the second power-operated speed, here overdrive ratio, or back to the third speed direct drive.

The electrical system includes also an interrupter switch IS operated by depression of the clutch pedal P, and hence closed by a torque interrupting operation that disestablishes drive through the transmission. The electrical system associates the interrupter switch and the selector switch SW in its standard position, so that the selector valve SV establishes direct or third speed drive, the first of the two power drives, when the selector switch is in direct drive position and the interrupter switch is operated simultaneously or coordinately. As the torque breaking operation, whether manually or automatically performed, by a manual clutch, a power clutch, or a fluid-coupling, always accompanies any normal stopping or initial starting of the vehicle, the control means will always assure direct drive when starting; and also this arrangement enables the operator to obtain direct drive at will by breaking the torque and displacing the handle to one of its normal positions outside the supplemental position.

The electrical system includes also a governor or speed responsive switch G. This switch is held in one position when the speed is below a critical value, and in another position when the speed is above a critical value, the expression "critical value" encompassing the conventionally provided differential where such is provided for the purpose, among other things of avoiding "short cycling" when the speed rapidly passes back and forth across the make or break value. The governor is operated by one of the transmission shafts, such as an output shaft.

The electrical system includes also an accelerator pedal operated switch mechanism AS. The first phase of this mechanism closes a switch between a predetermined intermediate accelerator pedal position and the fully released position. This switch is connected with the governor switch G, and the selector switch SW in its second or supplemental position, to operate the selector valve SV to obtain supplemental or overdrive ratio whenever these switches are all closed. Hence, after movement of the hand lever to third speed position, and its release to supplemental position, and after the vehicle attains a predetermined speed, the operator may manually attain supplemental speed, which involves his releasing the accelerator pedal. As the circuits are closed before full release of the pedal, the power shifting means can be fully energized, despite lag in the vacuum operated parts of the system, by approximately the time the accelerator pedal reaches fully released position.

In a shifting of the usual typical speed change shifters such as illustrated, where a shiftable toothed member is subjected to torque through the transmission, when it is engaged in either position, there is a "pinch" between the teeth of the member and the complementary element with which it is engaged, during torque transmission. This "pinch" is relieved when the torque is relieved. By the time the accelerator pedal has become fully released, this "pinch" will have been relieved, so that the power means, previously energized when the accelerator switch was closed, completes the shift.

The other or second phase of the accelerator switch is closed upon extreme depression of the accelerator pedal, and it is also associated with the governor switch and the selector switch in its supplemental position. The circuit through the second accelerator switch energizes the first or standard ratio part of the selector valve SV, to give a manually and selectively operable "kick-back" to the lower speed ratio, despite the supplemental ratio.

In connection with the "kick-back" operation, means are provided to effect a momentary torque reduction, and also a momentary vacuum increase, as further functions of the extreme depression of the pedal. These functions are obtained by the illustrated embodiment of the invention, by a mechanism that quickly moves the carburetor butterfly valve to closed position when the accelerator pedal is moved from its normally full throttle position of depression to the extreme depressed position, the operation overlapping the closure of the "kick-back" switch means of the accelerator switch AS.

Limit switches LS1 and LS2 operated by mechanism generally indicated by the letters LS are provided to open each energizing circuit when the shift is fully moved into the corresponding drive position. This insures economy of electricity and vacuum, and, as the full description will show, quickens an opposite shift by relieving vacuum on the side of the power means that, for opposite shift, must be at high (atmospheric) pressure.

In a modification, the governor switch G has contacts for both its low speeds and its high speeds, these contacts being ultimately connected to opposite sides of the selector valve. The accelerator switch AS has a switch means connected with each governor contact; but the high speed governor contact also passes through the selector switch SW in its second position. Both accelerator switches are closed by the same movement of the accelerator pedal, toward released position. By this arrangement, the operator obtains the first speed drive by release of the accelerator pedal, when the vehicle is moving below the critical governor speed, and obtains the second speed by the same operation when the vehicle is moving above the critical speed.

In order to prevent an unexpected effecting of the second speed drive whenever the handle is shifted in standard manner to establish the first speed, the accelerator pedal is released, and the vehicle is traveling above the critical speed, means is added to prevent shifting of the selector switch to second position when the handle is moved to first speed drive position and released, at the time the accelerator pedal is released. Only by a depression and release of the accelerator pedal, subsequent to establishment of the first speed, can the power shift produce the second speed drive.

To provide a convenient "kick-back" for this modification, to return the power shift to its first speed despite vehicle speed above the critical value, the high speed contact of the governor is also connected to the first speed side of the selector switch SW, and thence to the first speed switch means of the accelerator switch AS. When the shifter handle is drawn to direct drive (i. e., third speed) position and the accelerator pedal is released, the first speed drive of the power-operated means will always be obtained.

Other and detailed functions of the over-all mechanism and its elements will be developed in the following description.

*The overdrive*

In Figure 2, the propeller shaft PS is shown as entering the housing for the overdrive OD and for the differential. As is indicated, the propeller shaft has a pinion gear that drives a ring gear 90. A generally cylindrical planet gear cage 91 is attached to the ring gear 90, and terminates in a sleeve 92 that, as will appear, has rotatable bearing upon a splined shaft concentric with the ring gear, which splined shaft, in turn, is rotatably mounted upon one of the axles.

The planet gear cage 91 supports a plurality of planetary gears 94 that are rotatable on stud shafts 95 projecting from the cage 91. These planetary gears are enmeshed with a sun gear 96, and also with an internal ring gear 97, which latter is mounted upon a rotatable support 98 that carries the differential pinions 99 engaging with the differential gears 100 and 101. The gear 100 is connected to drive the axle 102 and the gear 101 is connected to drive the axle 103.

The sun gear 96 is fixed to a splined shaft 105, which splined shaft provides a mounting for the sleeve 92 as aforesaid, and in turn rotates on the axle 103. The splined shaft 105 extends to the right in Figure 2 a considerable distance, so as to receive a clutch collar 107. The clutch collar is splined to the splined shaft 105 and is slidable therealong.

As particularly shown in Figures 8 to 12, the sleeve 92 has an annular end face 109 that is disposed opposite the inner end face of the collar 107. The end face 109 of the collar 92 is provided with a plurality of outwardly projecting, circumferentially spaced lugs 110, there being three shown as this constitutes the preferred number. The lugs 110 are flanked on either side by recesses, as indicated at 111 and 112. Preferably, the total length of the lugs 110 from the bottoms of the recesses 111 and 112 is about one and one-half times the depths of the recesses.

Reference particularly to Figure 8 shows that the clutch collar 107 has an annular extension 113 projecting inwardly therefrom. This ring affords a recess of more or less annular nature between its inner circular surface and the outer surface of the splined shaft. The ring portion 113 is provided with a plurality of circumferentially spaced lugs 115 projecting inwardly, these being of the same number as are the lugs 110 on the sleeve 92. The lugs 115 are in turn flanked by recesses 116 and 117.

The ring portion 113 has also external circumferentially spaced lugs 118 that are preferably three in number. The collar 107 slides within a fixed ring 120 that is attached to the differential housing, as indicated in Figure 2. This ring 120 has an opening 121 to receive the collar 107. The edge of the opening 121 is provided with a plurality of lugs 122, corresponding in number spacing to the lugs 118. These lugs 122 project inwardly toward the differential beyond the face 123 of the ring 120. Each lug 122 is flanked by two recesses 124 and 125.

The operation of the collar 107 is to slide back and forth so as to engage lugs and recesses to fix the collar 107 to the sleeve 92, or alternately to fix the collar 107 to the fixed ring 120. This is a selective movement by which either overdrive or direct drive may be obtained.

The operating mechanism for producing the shift of the collar 107 so as to provide either overdrive or standard drive includes a power mechanism generally indicated at 130. This power mechanism is here exemplified by a vacuum cylinder having opposite ports 131 and 132, and having a movable piston 133 with a piston rod 134. The piston rod 134 is recessed at 135 to provide a notch to receive operatively a round end 136 on a lever 137. This lever 137 is pivoted on a pin 138 that is secured between two outstanding ears of a bracket 139, which bracket is attached to the housing of the overdrive.

As shown in Figure 7, the lever 137 is bifurcated at its lower end. Into this bifurcation, a secondary lever or arm 140 is inserted and is freely pivotable on the pin 138.

The secondary lever 140 rockably receives a pin 143 that has on its inner end a shoe 144 that rides in a peripheral groove 145 around the collar 107. Reference to Figure 7 will show that the inner bifurcation of the lever 137 is shorter than the outer one, so that the former does not interfere with the operation of the shoe 144. The outer arm of the lever 137 has two opposite, angularly separated fingers 146 and 147 that extend to the sides of the pin 143 and are selectively engageable with the pin 143.

It will be seen that the main lever 137 and the secondary lever 140 are pivoted onto the bracket 139 about the same pin 138, and that the secondary lever 140 has the limited pivotal movement relative to the main lever 137 that is provided by the distance between the two abutment fingers 146 and 147.

The secondary lever 140 has a flat upper edge 150. This edge is engaged by a flat abutment shoe 151 with a guide stem 152 that is slidable in a hole extending upwardly into the body of the lever 137. A pin 154, constituting an extension of the stem 152, extends upwardly through the hole and through a threaded fitting 155 at the upper end of the lever 137, whereby its upper end is guided. This fitting 155 has a head 156, and is threaded adjustably into the upper end of the lever 137. A lock nut 157 surrounds the threaded fitting 155 outside the lever, so that the fitting may be locked in adjusted position. A stiff coil spring 158 surrounds the pin 154 within the hole of the lever 137 and urges the shoe 151 downwardly against the flat edge 150 on the secondary lever 140. As is evident, the spring causes the shoe 151 to abut the edge 150 and attempt to maintain the two levers in alignment radially of the pin 138. However, relative rocking movement, as indicated in Figure 4, can be obtained and also during counter-clockwise rotation of the levers, but this causes a compression of the spring 158. The force of the spring may be adjusted by releasing the lock nut 157 and turning the head 156 of the fitting collar 155.

*Operation of the power-shifted overdrive*

The position of Figure 2 is that of overdrive operation. In a previous cycle, low pressure has prevailed on the left side of the piston 133 and it has been moved to the position shown.

In overdrive position, the propeller shaft PS drives the ring gear 90, and, in conventional operation, the upper side of the ring gear in Figure 2 moves downwardly. The planetary gear cage 91 thus moves downwardly at its upper end and upwardly at its lower end in Figure 2; and it similarly moves the stud shafts 95 with the planetary gears 94 thereon. The planetary gears mesh with the sun gear 96 and the internal ring gear 97.

As will appear, the sun gear 96 is held fixed in the overdrive position, and as a result the planetary gears 94 roll around the sun gear 96 upon rotation of the cage 91, and cause the internal ring gear 97 and its support 98 to move more rapidly than does the cage 91.

As noted, the sun gear 96 is fixed against rotation in the position of Figure 2. This is occasioned by the fact that the collar 107 is in its outer position. In such position, the lugs 110 on the sleeve 92 are disengaged from their corresponding notches 116, 117 on the collar 107; and the lugs 115 are disengaged from the notches 111 and 112 on the sleeve 92. With this disengagement, the sleeve 92 that forms a continuation or extension of the planetary gear cage 91 can rotate on the splined hollow shaft 105, and does so because that shaft is held fixed, as will now be explained.

With the collar 107 in its outer position, the outer peripheral lugs 118 on the ring 113 of the collar 107 are engaged in the notches 124 or the notches 125 on the fixed ring 120. By this arrangement, the collar 107 is held nonrotatably with respect to the casing. As the collar 107 is splined to the splined shaft 105, and as the latter is fixed together with the sun gear 96, that gear is held immovable and the previously described overdrive operation is produced when the propeller shaft PS rotates.

This overdrive is adapted to be operated by a control having certain characteristics that will be hereinafter described. Suffice it to say at the present time that one of the things done by the control will be to reverse the vacuum and air conditions operating upon the piston 133, so that the piston moves from the position shown in Figure 2 toward the opposite end of the cylinder.

In normal drive, this reversal of the piston 133 may take place while torque is being transmitted from the propeller shaft PS to the axles 102 and 103. Such torque applies a rotary thrust force to the collar 107 and tends to bind the lugs 118 against the side walls of which whichever of the slots 124 or 125 they are engaged. This side wall thrust tends to prevent the ready withdrawal of the collar in an axial direction so as to release the lugs from the slots. Consequently, when the piston begins to move to the right from the position of Figure 2, it will first move to a position such as that shown in Figure 3. In this movement, the lever 137 is rocked about the pin 138, but the secondary lever 140 is not moved because it is retained by the shoe 144, which is held against axial movement by the collar 107 that resists movement in the manner aforesaid. Consequently, the main lever 137 will be rocked relatively to the secondary lever 140.

This relative rocking movement will cause the upper edge 150 of the secondary lever and the flat shoe 151 to be rocked to the position shown in Figure 3, which additionally compresses the spring 158.

The foregoing relative movement, that is to say, rocking of the main lever 137, without rocking of the secondary lever 140, will continue until the finger 146 on the main lever engages the pin 143, as is specifically indicated in Figure 3. Thereupon, in normal operation, the piston 133 will stop, because the power is ordinarily insufficient to overcome the torque effect that locks the collar 107 to the fixed plate 120. In other words, the continued transmission of torque through the overdrive and differential mechanisms will normally prevent the shift of the overdrive from one position to another.

If, while the parts are in the positions of Figure 3, the torque is released, the shift may be completed. This torque is readily released by the driver, as by release of the accelerator pedal. When the accelerator pedal is released, there is ordinarily first a reduction of torque and finally a reversal of torque as in "coasting" drive. Such reversal and/or release of torque relieves the pressure between the lugs 118 and the side walls of their respective slots in the plate 120, and perhaps reverses it reapplied. At the instant it is relieved, the vacuum pressure acting upon the piston 133 (or, more accurately, the pressure differentials acting thereon, by whatever means obtained) causes a rapid movement of the piston 133 to the right hand end of the cylinder, as shown in Figure 4. Simultaneously, the spring 158 tends to realign the levers 137 and 140.

As the collar 107 approaches its inner or left hand position, projecting ends of the lugs 115 on the annular part 113 of the collar 107 may abut the face 109 of the sleeve 92; and, at the same time, the ends of the lugs 110 will engage the annular face of the portion 113 of the collar 107. When this occurs, the parts will be in the positions of Figure 4, wherein the lever 137 is moved its full stroke by the overdrive power cylinder ODC; but the secondary lever 140 is again angularly displaced relatively thereto due to the abutting condition above-described. The pin 143 is in engagement with the finger 146 on the main lever 137, and the compression spring 158, acting through the shoe 151, is applying a force that tends to cause the secondary lever 140 to move into alignment with the main lever 137, a condition shown in Figures 2, 5 and 6.

The end abutment of the lugs 110 and 115 on the respective surfaces of their companion members is a relatively noiseless engagement, despite the relative rotative movement between the parts.

The relative speeds of the sleeve 92 and of the collar 107 are determined by the torque conditions at the time of shift. It may be assumed first that the sun gear 96 is driving the splined shaft and the collar 107 at higher speeds than those of the sleeve 92. In this case, the lugs 115 will move around the face 109 of the sleeve 92 until the lugs 115 abut the lugs 110. Thereupon, the action of the spring 158 upon the secondary lever 140 will cause the lever 140 to align itself with the lever 137, in which operation it moves the pin 143 and the sleeve 144 to shift the collar 107 from the position of Figure 4 to the position of Figure 5. In this position the direct drive is completed, the lugs 110 being engaged in the notches 116, and the lugs 115 in the notches 112. It will be evident that, if the relative rotation between the sleeve 92 and the collar 107 were opposite to that described, the lugs 110 could have entered the notches 117, and the lugs 115 entered the notches 111.

Briefly, the direct transmitting drive operates by having the sleeve 92 driven by the ring gear 90 fixed to the collar 107, and hence splined to the splined shaft 105 and to the sun gear 96. Thus the sun gear and the planetary gears are caused to rotate in unison and to drive the internal overdrive ring gear 97 at the same speed as the main ring gear 90 rotates.

When it is desired to shift from direct drive to overdrive, the operation is a direct opposite to that previously described. When the piston 133 is moved from the position of Figure 5, it moves an initial distance which causes the main lever 137 to shift without movement of the secondary lever 140 until the finger 147 of the main lever engages the pin 143. Then, as long as torque is applied through the gearing, the friction of the interlock of the lugs between the sleeve 92 and the collar 107 will prevent further movement of the piston 133. If then the torque is relieved, as by brief release of the accelerator pedal, the piston may continue its movement to the left and the lever mechanism will shift the collar 107 away from the direct drive to release the lugs 110 and 115 from their respective slots. The piston will move rapidly to the position of Figure 2, at the end of which, in normal operation, will cause the lugs 118 to abut against the surface 123 of the fixed ring 120. When this occurs, the secondary lever 140 will be rocked relative to the main lever 137, similarly but in reverse to the position of Figure 4. As soon as the lugs 118 become aligned with the slots 124 or the slots 125, the shift will be completed under the force of the spring 158 acting upon the shoe 151, to align the secondary lever 140 with the main lever 137.

As previously suggested, the lugs in every case are provided with two sets of slots or notches in which they may be engaged. This is done because the relative speeds of the engaging members are not always the same. It is therefore not necessary that particular relative rotations be obtained before engagement can take place. If the relative rotations are in one direction, the lugs 110 will engage in the notches 116, while the lugs 115 engage in the notches 112. If the relative rotations are opposite, however, the lugs 115 will engage in the notches 111 and the lugs 110 will engage in the notches 117. The result will be the same in both cases, because the engagements are full lockups for either direction of torque transmission.

Similarly, the lugs 118 may engage in the notches 124 or 125, depending upon the relative rotation between the collar 107 and the fixed plate 120.

Thus it will be seen that a relatively quiet overdrive shift has been provided, that, for all practical purposes, eliminates the noise attendant to the shift. Heretofore, multiple gear teeth shifting has been used, which had the disadvantage that the ratchet type rattle of gears frequently occurred, and indeed lockout frequently occurred where there was a block of tooth end against tooth end in such manner that relative rotation did not take place. If the shifting power were cut off before the shift is completed with the block as aforesaid, the drive would become ineffective.

Furthermore, this shift provides for a torque controlled shift that may be conveniently related to accelerator operation, and hence interoperated with an accelerator control such as that hereafter to be described.

In certain and unusual times, the teeth may be directly aligned at an instant of shift, so that the position of Figure 4 will never actually occur; nor will the corresponding position when the shift is being made in the opposite direction. This, however, does not change the fact that, in most cases, the shift will provide the positions corresponding to Figure 4, wherein the spring 158 will complete the shift without block and with practically no noise.

Furthermore, this shift can operate without the problems that are attendant upon loss of power in certain other types of shift. For example, a sudden acceleration of the engine at the instant of shift will cause a drop of vacuum power where the operation of the piston is dependent upon vacuum conditions generated in the intake manifold. If the power available is sufficient to produce the condition of Figure 4, or its counterpart in the reversal of the operation, the spring may complete the shift, although the power thereafter decreases. In case the vacuum is so low that the piston cannot overcome the spring 158, then the initial position of Figure 3 will not be obtained by the piston, but rather the piston will not move at all until the torque is interrupted. However, even in such case, the spring 158 acts as a cushioning device between the power and the shifted elements, as for example when the lugs abut before the piston 133 has reached the end of its stroke.

Manual shifting means

This overdrive is particularly adapted to be associated with one of the conventional manually-controlled transmissions, although not necessarily restricted to such. In Fig. 1, a conventional steering column 165 has a steering wheel 166. Figure 1 also illustrates one of the conventional types of steering column mounted shift control levers, wherein there is a shifter control shaft 167 and a handle 168 for operating the same. These parts are shown in somewhat greater detail in Figures 23 and 24.

In Figures 23 and 24, the shifter control shaft 167 is shown as being attached to a tube 169 that has a laterally projecting extension 170. The tubular extension 169 projects upwardly into a cap-like element 171 that is supported on the hub of the steering column 165. The cap 171 has a recess into which the tubular extension may move during shifting operations.

A guiding element 172 is attached in the cap 171 and has a cotter pin 173, or the like, by which it is secured in position, by insertion from the lower end of the cap 171. As shown, there are shoulders to limit the upward movement of the stabilizing or guiding element 172. The elements 172 engages slidably within the tubular extension 169 so as to guide the same in axial and rocking movements. This tubular extension at its lower end receives a compression spring 175 that normally tends to separate the shaft 167 from the guide 172, or, in other words, to move the tubular extension 169 and the shaft 167 downwardly.

The lateral extension 170 receives a lever 177 to which the handle 168 is attached. This lever is pivoted in the extension at 178 and has its inner end 179 rounded to engage rockably within a transverse opening 180 in the member 172.

By the foregoing arrangement, the handle 168 may be drawn upwardly, which is to the right in Figure 24. In this action, the inner end 179 rocks within the opening 180, while the pin 178 draws the extension 170 and consequently the shift control shaft 167 upwardly. This action compresses the spring 175.

From either its upper or its lower position, the handle 168 may be rocked in conventional fashion, either clockwise or counterclockwise. Such rocking movement twists the shaft 167. These movements are designed to afford the conventional H-pattern, by which reverse, first, second and third gears or speed drives are established. These positions are shown in Figure 25. From this, it will appear that drawing the handle 168 upwardly passes the handle across the bar of the H while the transmission remains in neutral. Then the handle may be rocked clockwise downwardly into first gear drive position, or counterclockwise upwardly in the same plane into reverse gear drive position. When it is returned to the medial position from either first or reverse and released, the spring 175 will cause the handle to move downwardly, carrying the shaft 167 downwardly to its lower neutral position in which it is at rest. From the lower neutral position, the handle 168 may be drawn clockwise downwardly, to third gear drive position, or counterclockwise upwardly in the same plane to second gear position.

Figures 1, and 13 through 17, show the construction of the lower end of the shifter control shaft of this typical shift mechanism. In Figure 1, it will be seen that adjacent the lower end of the steering column 165 there is a bracket 185, which is indicated as being of the split type so that it can be attached to the steering column 165. This bracket appears in greater detail in Figure 16, wherein the lower portion is shown at 186, and the upper portion at 187, these two being held together by screws 188. A bearing extension bracket 190 is mounted over the column 165 and is clamped thereto beneath the upper bearing member 187. This extension has an upstanding flange 191 that forms a back thrust limiting element for the steering column shifter arms, as will appear, the bearing 191 surrounding and receiving the shift control shaft 167.

Between the upper bearing member 187 and the bearing extension 191, the shift control arms are mounted on the shift control shaft 167. The lower arm 193 has a bearing 194 on the shaft 167, and a hub extension 195. This hub extension has a pair of diametrical notches 196 extending thereinto in an axial direction to receive a cross pin, as will appear.

The other steering column shift arm 197 has a hub 198 also on the shaft 167, and is similarly provided with a hub 199 having opposed notches 200 thereon for receiving the cross pin. It will be understood that both of the arms 193 and 197 are rockable with respect to the shaft 167.

As shown particularly in Figure 17, the shaft 167 has a cross pin 202 through it. In the preferred construction, this cross pin is strengthened by the presence of a cylindrical plug 203 within the hollow shaft 167, the plug terminating above the lower end of the shaft for a purpose to appear.

When the transmission is in neutral, as indicated in Figure 15, the opposed notches 196 and 200 are in alignment, and the cross pin 202 may be moved by axial displacement of the shift control shaft 167, freely from the notches 196 to the notches 200. As previously indicated, the spring 175 at the top of the shaft 167 normally maintains the cross pin 202 downwardly and thus within the slots 196, but above the bottom thereof, as will be explained. The lower neutral position of the pin 202 is in dotted lines in Figure 15. Upward movement of the handle 168 will draw the cross pin 202 upwardly into the slots 200, as shown in full lines in Figure 15.

When the shaft is rocked clockwise from released position of the handle 168, the pin 202, by engagement in the notches 196, will displace the hub extension 195 and hence the steering column shifter arm 193 clockwise to effect third speed. Similarly, reverse or counterclockwise movement of the handle 168 from the released position will rock the arm 193 counterclockwise to obtain second gear position. When the handle 168 is lifted to engage the pin 202 in the notches 200, and the handle 168 is then rocked clockwise, the arm 197 will be moved to engage first speed. Similarly, a counterclockwise operation of the handle 168 from its upper position will produce reverse gear.

The arm 193 has a connecting rod 205 pivotally attached thereto and the arm 197 has a connecting rod 206 pivotally attached thereto. Figure 21 shows the connection of these parts into the transmission itself, which is here illustrated as one of the typical commercial automobile transmissions. In Figure 21, the drive shaft 207 from the engine or clutch enters the transmission to operate the gear 208. As this transmission is typical, it is not necessary to describe it in detail. Suffice it to say that, with reference to Figures 21 and 22, the connecting rod 205 is connected to a rocker arm 210 that rocks a stud shaft 211 having an internal crank 212, with a fork 213 that engages a synchronizer blocker 214 to move it forwardly to effect direct drive or third speed, and to move it backwardly to effect second speed. Figures 21 and 22 show direct drive in engagement. The connecting rod 206 is similarly connected to a rocker arm 216 that is connected to a stud shaft 217, to which also is connected an internal crank 218 having a fork 219 that operates a first and reverse gear 200. When the gear 220 is moved forwardly, it meshes with a low speed countershaft gear to effect first forward speed. When the gear 220 is moved backwardly, it engages with a reverse idler countershaft gear to effect reverse drive. As is typical, the gear 220 is splined onto a splined shaft 222 that is connected to the propeller shaft PS.

Figure 22 shows a selector locker mechanism that is typical of the illustrated transmission, although it will be understood that other selector mechanisms are familiar in the art. Within the box, the shaft 211 has a more or less arcuate flange 227 on it. This flange has three notches 228, 229 and 230. As indicated, the edge walls of the plate 227 are flattened adjacent the notch 229 so that they extend out radially a shorter distance than they do adjacent the other two notches.

The other stud shaft 217 has a similar plate 233 on it, which has three notches 234, 235 and 236. The construction of this plate is similar to the plate 227.

Mounted upon the transmission housing cover there is a block 237 that slidably supports a sleeve 238 in which there is a compression coil spring 239 acting upon two balls, as indicated. The length of the sleeve 237 is such that it precisely fits between the two plates 227 and 233 when it is adjacent the middle notch of one and is adjacent the end notches of the other. When both middle notches are positioned to receive the balls, there is a slight lost-motion of the sleeve 237 therebetween.

By this arrangement, when both shafts are in neutral position, either shaft may be rocked from middle position, which represents neutral, in either direction. But, after either of the stud shafts is rocked from its neutral position, the sleeve 237 is caused to snugly engage the flat portions adjacent the middle notch of the other stud shaft, and thereby prevent its movement at all. Figure 22 illustrates the transmission in third speed, wherein the sleeve 237 is snugly engaged against the flat portions adjacent the notch 235. The only movement provided in this case is the return of the shaft 217 to neutral, after which either shaft may be moved; although only one shaft may be moved at a time.

In view of the fact that the foregoing represents a typical manually-operated transmission, with steering column control, it is thought unnecessary to describe its operation in detail. The sequence is conventional. For present purposes, the important thing to note is that only one of the steering column shifter arms 193 and 197 can be moved at any one time. Also, the drawings indicate several positions of the arms. In Figure 14, high gear or direct drive is established by the rotation of the cross pin 202 clockwise when the handle 168 and the shaft 167 are axially released to their lower positions. As indicated, the hub 195 has been rocked. As the cross pin 202 is not in the notches 200 of the other arm 197, this arm has not been rotated and cannot be rotated because of the selector locker mechanism illustrated in Figure 22.

In Figure 15, the arms are in neutral, and it will be understood that the operator, by axial displacement of the handle 168, may select either one of the two arms for rotational movement.

The control

Reference to Figure 1 will show that the mechanism is applied to a conventional automobile that has an engine E on a frame F, with a clutch CL, a clutch pedal P, an accelerator pedal AP, a transmission T, as indicated, the propeller shaft PS, as indicated, the combination overdrive and differential OD, previously discussed, a speedometer SP, a carburetor C, an engine manifold M, and a battery B, that are involved in the present control mechanism along with other parts that will be described.

Of the control parts, there are a selector switch SW, preferably mounted at the lower end of the shifter control shaft on the steering column, an interrupter switch IS, an accelerator switch AS, a vacuum selector valve SV, a vacuum accumulator tank VT, a governor G, a speedometer control SPC, and a limit switch mechanism LS mounted on the overdrive. The foregoing constitutes the main components and other parts will appear from the detailed description to follow.

The vacuum system

As previously stated, the overdrive shift is attained by fluid pressure differences applied to the piston 133. These pressure differences are preferably attained by vacuum developed in the engine intake manifold M, stored in a vacuum tank V, and applied opposite the piston 133 in such wise that, under certain circumstances, one side of the piston will be subjected to vacuum and the opposite side to atmosphere, under other conditions, just the reverse. This selection is made by the selector valve SV.

Referring particularly to Figure 1, the vacuum system derives low pressure conditions from the engine manifold M. A vacuum pipe 248 is connected to the engine intake manifold between the cylinders and the carburetor C, and leads to opposite ends of the vacuum tank VT, which, as will appear, is designed to act as an accumulator for maintaining low pressure conditions available under varying manifold pressure conditions. At the present, suffice it to say that the vacuum tank VT accomplishes this end and affords a continuous vacuum available in a pipe 249 that leads from the vacuum tank VT into the selector valve SV. From the selector valve, there lead two pipes 250 and 251.

The selector valve

The selector valve SV is illustrated in Figure 1, and in Figures 45, 46, 47, and 48.

This selector valve has a central annular valve block 255. Two oppositely arranged flanged stampings 256 are placed edges together to provide a medial vacuum chamber 257, and to provide two extruded valve seats 258 and 259 affording axial ports extending oppositely from the vacuum chamber 257. The ends of the annular housing 255 receive opposite plates 260 that also provide extruded valve seats 261 and 262, the valve seat 261 being opposite the valve seat 258, and the valve seat 262 being opposite the valve seat 259. Between the pairs of plates and the valve seats 258 and 261, there is an annular valve chamber 263, and on the other side a similar annular valve chamber 264.

Within the annular chamber 263, there is a valve head 265 that is alternately engageable with either the seat 258 or the seat 261. The valve head 265 is attached to a core that is adapted to be moved by a solenoid coil 266 that is mounted in a suitable cup-like cover and attached to the end block 255, as by screws 271. These screws attach the cup with the solenoid, suitable packing means and the plate 260 against the block. The arrangement also affords an atmospheric chamber 267 that may communicate past the valve seat 261 with the annular valve chamber 263.

Similarly, on the other end, there is a valve head 268 operable between the valve seats 259 and 262 by a coil 269 contained within a cup 270 mounted on the end of the block 255 by screws 271.

Both of the solenoids are identical, and, as appears from the right hand side of Figure 45, showing a full cut-away, the two cores are urged by light springs 272 inwardly so that, when the coils 266 and 269 are both deenergized, the valves 265 and 268 will be engaged with the inner seats 258 and 259, respectively. When the coils are selectively energized, the valves are drawn to the opposite or outer seats.

As shown in Figure 46, there is a connection to receive the vacuum pipe 249 that, with respect to the selector valve itself, is the vacuum source. This connection includes a port 278 into the vacuum chamber 257. There is also an exhaust or atmospheric fitting 279 that connects into an axial passage 280, which axial passage, as shown in dotted lines in Figure 45, connects to opposite ends of the block 255 and hence into the two atmospheric chambers 267 and 273.

The two pipes 250 and 251 are connected, respectively, to the two annular chambers 263 and 264. Similarly, the two annular chambers receive speedometer regulating pipes 284 and 285 that lead to the speedometer control SPC.

Figure 47 shows the pipe 251 connected into the annular chamber 264, that is occupied by the valve head 268. It also shows the speedometer connector 285 leading into this chamber.

As indicated in Figure 45, the two solenoid coils 266 and 269 are preferably grounded at one end of each. The other end of the coil 266 is connected to a terminal 286; whereas the other end of the coil 269 is connected to a terminal 287.

It may be predicted that, when both of the valve heads 265 and 268 are released to the positions indicated in Figure 45, both annular chambers 263 and 264 are connected to atmosphere past the valve seats 261 and 262, respectively, to the atmospheric chambers 267 and 273 that are ported to atmosphere through the interconnecting cross passage 280 and the atmospheric fitting 279. This produces equal atmospheric pressure on opposite sides of the operating piston 133 of the overdrive mechanism. However, when either of the coils is energized, its valve will be drawn outwardly to close its atmospheric seat and to port vacuum from the vacuum chamber 257 into its annular valve chamber, and hence into its one of the two pipes 250 and 251 to apply vacuum to one side or the other of the piston 133.

The vacuum tank

The vacuum system also includes the vacuum tank VT (Figure 1), which is designed to maintain an available vacuum at all times despite variations in the conditions in the intake manifold M. The details of this vacuum tank are shown in Figures 52 and 53, with sections in Figures 54 and 55.

This vacuum tank is preferably mounted upon a bracket 300 that is attached in suitable fashion to the engine E. As previously noted, the pipe 248 is connected to the manifold M.

The vacuum tank comprises a suitable reservoir or container 301 with inturned flanges at its top. The top is enclosed by a flexible diaphragm 302 that is clamped between the flanges of the tank and a cup-shaped member 303. This cup-shaped member provides within it and above the diaphragm an upper vacuum chamber 304.

The diaphragm supports a valve rod 305 connected centrally thereto that extends through a bearing 306 formed by internally flanging the bottom wall of the tank 301, and at the same time forming passages 307 through the inner portion of the bottom wall. Below the tank, there is welded or otherwise attached a cup-shaped member 308 that provides a valve chamber, this fitting having a valve seat 309 therein. The bracket 300 has a flange 310 thereon upon which the tank may rest. The bottom of the cup-shaped member is welded to a flanged and threaded fitting 311 that passes through an opening of the flange 310 and receives a nut 312, by means of which the tank is attached to and supported on the flange 310 of the bracket 300. These parts are ported to receive a connector 313, by means of which the pipe 248 is connected into the bottom of the tank 301.

The valve stem 305 has a valve head 315 on its lower end. When this valve head is down, the valve seat 309 is closed and the vacuum is cut off from the tank.

The valve stem, at its upper end, has a buffer plate 316 beneath the diaphragm, and a first cup-shaped member 317 above the diaphragm, the valve stem being peened over to attach these parts securely together, so that there will be no leakage therethrough. The lower cup-shaped member 317 is ported at 318, so as to equalize pressures within it and without it.

Telescoping into this lower cup-shaped member 317 is an upper cup-shaped guide element 320 that rotatably receives a screw 321, which screw is threaded through a nut 322 that is welded to the top of the member 303. The outer end of the screw has a kerf to receive a screw driver. A lock nut 323 is provided outside the tank.

The two cup-shaped members that telescope together receive a light coil spring 324 therebetween, which, as appears, urges the valve downwardly with a force that may be adjusted by loosening the lock nut 323 and turning the screw 321.

It will be observed that, when the pressure within the tank 301 is greater than the pressure within the upper chamber 304, plus the downward force of the spring and gravity, the valve 315 will be opened so as to connect the manifold pipe 248 to the interior of the tank 301. When, however, the tank pressure is not as great as that stated, the valve will be closed.

Assuming that the outlet 249 is closed, as when both of the valves 255 and 268 of the selector valve SV are released, then the operation of the valve 315 to the vacuum will depend upon conditions of manifold vacuum. When the accelerator pedal is released, and the butterfly valve is substantially closed, there is high manifold vacuum. If at such time the tank pressure is high, because of leakage or other causes, the reduction in pressure in the upper chamber 304, produced by the high manifold vacuum, will be sufficient to cause the tank pressure to lift the diaphragm and open the valve, permitting the manifold to be connected into the tank to evacuate the same. Evacuation will continue until the tank pressure is reduced to a point where it cannot overcome the combination of spring and gravity forces plus pressure within the chamber 304, whereupon the valve 315 will close. At this point, there will be a satisfactory vacuum within the tank 301, and it will be held despite lowering thereafter of engine inlet-manifold vacuum conditions, or, stated in reverse, a rise in manifold pressure such as might occur by a subsequent acceleration of the engine. In other words, the tank 301 will entrap a low pressure condition and maintain it despite reduction of the vacuum conditions and consequent rise in manifold vacuum pressure. As will appear, this arrangement provides adequate vacuum to effect a shift of the piston 133 at any time, even though the accelerator pedal is depressed at the instant shifting is to occur or is occurring.

On the other hand, if, with a given vacuum condition in the tank, the pipe 249 is opened and air enters the same and the tank, the tank pressure may rise and act upon the bottom of the diaphragm 302 to cause the valve to open and effect restoration of vacuum conditions within the tank 301.

The selector switch

The selector switch SW appears in Figure 1, and, in greater detail, in Figures 13, 14, 15, 16, 17, 19 and 20.

The upper bearing bracket 187 of the steering column shift operating mechanism includes a unitary upstanding portion 330 that has an opening 331 through the upper end thereof, into which the end of the shaft 167 extends for support in its rocking and axial movements. This extension 330 also has a coaxial but reduced bearing 333 to receive a pin 340 that extends well into the hollow shaft 167 for a purpose to appear.

The bracket 330, as shown particularly in Figure 16, has at its top side a limit pin 334 that preferably is in the form of an enlarged square at its upper portion with a rectangular extension 335 depending downwardly into the opening 331 far enough to be engaged by the lower end of the shaft 167, but not to interfere with the movement of the pin 340. The edge of the shaft 167 is provided with a rectangular notch 333 at a particular point on its periphery, which in only one rotated or rocked position of the shaft 167 will become aligned with the limiting pin 335.

The spring 175 (Figure 24) at the top of the shaft 167 normally urges that shaft downwardly. The lower limit of this movement is determined by the engagement of the lower end of the shaft 167 with the limiting pin 335. Reference to Figure 15 shows that, when the two arms 193 and 197 are in neutral position, the notch 333 is not aligned with the pin 335. In this particular figure, the operating handle 168 has been drawn upwardly so that the pin 202 has moved into the notches 200 on the hub of the arm 197, which condition would exist in preparation for a shift into first or reverse speeds. Consequently, the lower end of the shaft 167 is withdrawn from the pin 335. If the handle 168 is released from the position in Figure 15, the shaft 167 will move downwardly or to the left in that view until its edge engages the limiting pin 335 that is fixed to the bearing bracket. If from this released position the handle lever be rocked counterclockwise as in engaging second speed, the notch 338 will merely be rocked further away from the limiting pin 335, while the lower edge of the shaft 167 merely slides across the upper face of the limiting pin.

However, if the handle 168 be rocked clockwise from its released position in a direction to engage third speed drive, the notch 338 will be rocked to a position in alignment with the limiting pin 335, as is indicated in Figure 14. From this position, indicated in Figure 14, a release of the handle will release the upper spring 175 to force the shaft 167 downwardly, carrying the cross pin 202 with it, this movement being accommodated by the depth of the notches 196 in the hub 195 of the arm 193. It will be evident that in increased downward movement of the shaft 167 is thus provided when, and only when, the shift handle 168 is disposed in a position corresponding to third speed.

The switch actuating pin 340 projects into the shaft 167 to a position near to the plug 203 that supports the cross pin 202, which plug is thereby made to comprise a driving abutment for the pin 340. When the parts are in the position indicated in Figure 14, which is a normal position of establishment of third speed, the end of the switch pin 340 will be slightly spaced from the adjacent end of the plug 203. However, upon release of the handle 168 and attendant action of the spring 175 upon the upper end of the shaft 167, that shaft will be moved downwardly the distance provided by the relatively deep notches 196. In this movement, the plug 203 will be caused to abut the end of the switch pin 340, and, as the notch 338 embraces the pin 335, the switch pin 340 will be displaced axially downward.

The switch pin 340 is mounted in a flanged, tubular, threaded fitting 342. This fitting is passed through a wall of a switch casing 343 until the flange 344 of the fitting engages that wall. A nut 345 outside the wall is threaded over the fitting 342 to secure it to the casing 343. Then the fitting 342 is passed through a wall of a cover bracket 346 secured over the bracket cap 330 by the nuts 188. Inside the cover bracket, another nut 347 is applied over the fitting 342. By this means, the casing 343 is securely attached to the steering column.

The pin 340, that slides through the fitting 342, is attached, such as in the manner indicated in Figure 13, to an insulating plug 348 that is flanged at 349. The left end of the plug 348, as shown in the figures, receives an insulating washer 352, and then threadedly receives the end of a flanged plunger 353 that slides in a bearing 354 formed in the casing 343. A relatively stiff coil spring 355 acts between the housing and the flange on the plunger 353 to urge the plunger to the right. This rightward movement is transmitted to the plug 348 and the pin 340 to urge these parts upwardly of the steering column. It will be understood, however, that the spring 355 is not strong enough to overcome the spring 175.

A contact plate 356, having outstanding contact wings as shown in Figure 20, is slidably mounted on the plug 348. Its upper edge is flat, to bear against the inner surface of the insulative cover of the casing to prevent rotation of the plate 356 relatively to the housing. A relatively light coil spring 357 urges the contact plate 356 downwardly, or to the left in the drawings.

There are two pairs of fixed contacts attached to the inner surface of the insulative cover that are selectively engageable by the movable contact disc 356, and thereby connected together. The first pair of contacts is designated at 358 and 359, and they are the direct drive contacts. The opposite pair of contacts are 360 and 361, and they consist of the overdrive contact pair.

When the pin 340 is not engaged by the plug 203 of the shaft 167, the spring 355 will move the pin 340 and the plug 348 to the right (see Figure 14), and the washer 352 will displace the contact disc 356 upwardly to establish closure of the contacts 358 and 359 for direct drive. The spring 355 will overcome the spring 357, but will not put undue pressure on these contacts. When, however, the pin 340 is moved downwardly by the operation of the shaft 167 in the manner previously described, this will displace the plug 348 and the plunger 353 to the left in the views, so that the contact disc 356 connects the two contacts 360 and 361 for overdrive operation. The coil spring 357 is provided to prevent undue strain upon the contact parts in this last named operation, by accommodating overtravel of the plug 348.

It may be forecast at the present time, therefore, that, in normal positions of the shift control handle 168 establishing neutral, first, second, third and reverse, the selector switch will be in released condition wherein the contact disc 356 closes the contacts 358 and 359 together. Only after third gear position has been established and the handle released will the shaft 167 move down its extra distance to cause the shifting of the pin 340 and the displacement of the contact disc 356 away from the direct drive contacts 358 and 359, and into closure with the overdrive contacts 360 and 361, which are thereby connected.

Figures 19 and 20 show that the direct drive contacts 358 and 359 are connected with terminals 364 and 365; whereas the overdrive contacts 360 and 361 are connected with terminals 366 and 367.

The operation of the selector switch SW between the direct drive contacts 358 and 359 for the overdrive contacts 360 and 361 is a preselecting operation. The actual shift of the overdrive unit is completed only after coordinate operations of associated control mechanisms are also performed.

The interrupter switch

The interrupter switch is shown in Figure 1 and also in Figures 49, 50 and 51. Figure 1 shows the interrupter switch mounted upon the bracket 300 that is attached to the engine, as this is a convenient mounting arrangement to facilitate actuating hook-up.

Referring to Figure 49, the interrupter switch is shown as having a casing 375 with a panel 376 of insulating material. There is a three-armed bracket 377 attached to the panel 376 and projecting into the housing 375. The lower arm 378 of this bracket is turned around on its end to provide a bearing 379 for a purpose to appear. The two vertical spaced arms provide support for a bell crank type of switch arm 380 that is pivoted on a pin 381 extending between the vertical arms of the bracket 377. The switch arm 380 may be formed of stamped sheet material bent over to provide an upper cross portion having an electrical contact 382 and another cross portion 383 that can engage with an insulated stop 384 on the housing wall.

There is a snap-action arrangement for the switch arm that includes a link 386 rockable on a pivot 387 mounted in the bearing 379 of the lower horizontal arm 378 of the bracket 377. The link 386 has a hole 388 through it that clears the pin 381 so that the link 386 may rock on its pivot 387. The upper end of the link 386 receives one end of a tensioned coil spring 389, the upper end of which is attached to a pin 390 mounted in the upper part of the switch arm 380. As the spring 389 is tensioned to its maximum degree when the switch arm 380 is vertical in Figure 49, it produces a snap action in one or the other direction of rocking of the arm 380 beyond this dead-center position.

The two side members of the lower part of the switch arm 380 are shaped with extensions 392 connected by a pin 393, the arrangement forming a bell crank. The pin 393 is adapted to be engaged by two angularly spaced abutment edges 394 and 395 on a cam member 396 that is non-rotatably mounted on a shaft 397, and is formed of non-conductive material. The shaft 397 is rockable in bearings formed in the wall of the housing 375 and projects outwardly through one wall to receive an operating crank 398 attached by a pin to the shaft. The crank 398 is connected by a lengthwise adjusting device 399 to a thrust rod 400. As shown in Figure 1, the thrust rod 400 extends downwardly and outwardly through a hole 401 in the frame F, and at its lower end is pivotally attached to a crank 402 on a rock shaft 403. The crank 402 is formed as a depending arm on a plate 404, attached by a U-bolt 405 around the hub of a clutch pedal operated crank arm 406. The shaft 403 is mounted on the frame and is connected to the lower end of the arm of the clutch pedal P to be rocked when the pedal P is depressed or released.

This shaft 403 likewise has clutch operating mechanism connected to it, including the crank 406, a connecting rod 407 of adjustable length, and a crank 408 pivoted to the frame and connected with the engine friction clutch CL to operate the same.

The bracket 377 is electrically connected with the contact 382. The associated operating parts may be insulated from the switch arm by suitable means, such as those described. The bracket 377 is connected to a terminal 410. The contact 382 is adapted to close with the contact 411 mounted on the panel 376 and associated with a terminal 412.

When the clutch pedal is in its released position, the connecting rod 400 will be in a forward position or in a leftward position, as shown by full lines in Figure 49. The cam 396 will be in the full-line position of Figure 49, so that the abutment 395 is adjacent the pin 393 and the abutment 394 is spaced therefrom. When the clutch pedal is depressed, the thrust rod 400 and the crank 398 will be moved to the dotted-line positions of Figure 49, and the cam 396 will likewise be moved to the dotted-line position of that figure.

During the initial part of the foregoing operation, the switch arm will not be moved because the abutment 394 is required to move a substantial angular distance before it engages the pin 393. In other words, only after a predetermined depression of the clutch pedal will the abutment 394 engage the pin and rock the switch arm 380 to just beyond a dead-center position. Thereafter the spring 389 will rapidly complete the closing of the switch, moving the pin 393 in advance of the abutment 394. However, upon completion of the clutch disengaging operation, by full depression of the clutch pedal, the abutment 394 will be brought close again to the pin 393.

Upon subsequent release of the clutch pedal, the connecting rod 400 will again be moved to the left in Figure 49. The early part of this movement will not displace the switch arm 380 from its contact closing position, but will be required to bring the abutment 395 to adjacent the pin 393. After a predetermined releasing movement of the clutch pedal P, the abutment 395 will engage the pin 393 so that further releasing movement of the clutch pedal will displace the switch arm 380 to just beyond dead-center position, after which the spring 389 will complete the opening movement. Upon final release of the clutch pedal P, the parts will resume the positions shown in Figure 49. By this arrangement, when the clutch pedal is released, the contacts 382 and 411 of the interrupter switch IS will be open. After predetermined depression of the pedal P, the contacts will be closed. They will remain closed during remaining travel of the clutch pedal toward the floor, and during a predetermined part of the releasing movement of the pedal. Thus they will remain closed for a substantial period of time during the clutch pedal operating cycle.

Overdrive limit switches

There are two limit switches, one operated by movement of the overdrive unit into each of its extreme positions. These switches appear in Figure 1 and Figures 2, 3, 4 and 5, and Figures 36 and 37. The overdrive limit switch is designated LS1, and the direct drive limit switch is designated LS2. They are identical. Reference to the drawings, and particularly to Figure 3 will show that these two switches are mounted upon the overdrive housing but are axially displaced relative to the collar 107 of the overdrive mechanism.

Referring to Figure 3, which shows the standard ratio limit switch LS2, it will be seen that there is a switch casing 418 with an extension threaded through the overdrive housing to attach the switch thereto. An insulative cap 420 closes the switch case 418.

The projection 419 is tubular and receives a ball 421 that is backed by a cylindrical plug 422. This plug engages a disc 423 of insulating material, which disc is normally held downwardly by a coil spring 424, the upper end of which spring engages the insulative cap 420. The disc 423 has a pin 425 fixed thereto, which pin at its upper end carries a contact armature 426. This armature has contacts that are adapted to connect two fixed contacts 427 and 428. The contact 427 is mounted upon a conducting bracket 429 that, in turn, is attached to a conducting socket 430 mounted in the cap 420. In like fashion, the contact 428 is mounted upon a bracket 431 attached to a socket 432 in the cap 420. These sockets are adapted removably to receive plugs that constitute part of terminals 433 and 434, respectively, for electrical connections.

In like fashion, the limit switch LS1 has terminals 435 and 436 that are adapted to be connected by an armature identical to the armature 426 of the limit switch LS2. The limit switch LS1 also has an actuating ball 437 that corresponds to the ball 421 of the limit switch LS2.

From the foregoing, it will be seen that, when the ball 421 is projected outward by the spring 424, the terminals 433 and 434 are electrically connected. When the ball 421 is forced inwardly of the switch casing 418, the armature 426 is separated from the contacts 427 and 428, so that the terminals 433 and 434 are electrically separated. Similarly, when the ball 437 is outwardly of the switch LS1, the two terminals 435 and 436 are electrically connected, but when the ball is forced inwardly the two terminals are electrically separated.

These two switches are actuated from the collar 107 of the overdrive mechanism. This collar has a clutch groove 145 previously described. There is a limit switch actuating shoe 440 (Figure 37) that is engaged in this groove 145, and which forms a projection of a spool type sleeve 445. This sleeve 445 is slidable on a fixed pin 446, which pin has a flange 447 and a threaded projection 448. The threaded projection passes through the wall of the overdrive casing to abut the flange 447 against the inner side of the wall, and a nut 449 is threaded over the outer end of the projection 448 to secure the pin 446 rigidly in place.

The spool 445 has an enlargement at its left end forming an annular beveled shoulder 450 adapted to operate the limit switch LS1, and a similar axially spaced confronting beveled shoulder 452 at its enlarged right end for operating the limit switch LS2. These beveled shoulders engage and displace the balls 437 and 421 inwardly of these switches, respectively.

As shown in Figure 2, wherein overdrive is fully established, the shoulder 450 has actuated the switch LS1 to open position. Comparison of this figure with Figure 3 shows that the switch LS2 is to the right of the switch LS1, so that the shoulder 450 does not reach it, and it remains closed during overdrive operation. When direct drive is established fully, as shown in Figure 5, the shoulder 452 is close to the ball 437 of the limit switch LS1, but does not actuate the same. Comparison with Figure 3 shows that the limit switch LS2, being slightly to the right of the limit switch LS1, is opened by the shoulder 452 when the shoulder 452 occupies the position of Figure 6.

When the shifting mechanism is in any position except an extreme position, both limit switches are closed. When the mechanism is fully in direct drive, the limit switch LS2 is opened and the switch LS1 is closed. When the mechanism is fully in overdrive, the limit switch LS1 is opened and the limit switch LS2 is closed.

*The accelerator switch*

The accelerator switch AS is shown in Figure 1, and also in Figures 26–30 and Figures 38–44 inclusively.

Figure 1 shows the accelerator switch AS supported on a bracket on the firewall of the vehicle, this being a convenient but not necessary point of mounting. The switch includes a casing 460 that is closed on one side by an insulative panel 461. On the inner surface of the panel 461, adjacent the top thereof, there are two brackets 462, each having a U-shaped cross section, and each being designed pivotally to hold two switch arms.

The two brackets 462 are riveted to the panel 461, with a conductor plate 463 interposed between them and the panel. The plate 463 establishes electrical communication to both brackets 462. Each bracket 462 supports a switch blade that is rockable on a pin 464. The two switch blade members are indicated at 466 and 467.

Reference to the figures will show that the switch blades are formed from conductive sheet metal. Each has two upstanding parallel pivot pin holding arms, perpendicular to the back panel 461, and through which the pin 464 passes. Below these upwardly extending pivot arms, there is in each switch arm a connecting portion 468 joining the two pivot arms. There are also two back flanges 469. This arrangement of the front portion 468, sides, and back flanges 469 provides a channel to receive an insulative element 470 that projects from the lower end of each of the switch arms. Each of the connecting front portions 468 of the metal parts of the switch arms is provided with a contact, there being such a contact 471 for the switch arm 466 and 472 for the switch arm 467.

There is a torsion spring 474 surrounding the pin 464 for each of the switch arms. One end of each torsion spring extends downwardly to engage the connecting portion 468 of each U-shaped switch arm, and the other end of each torsion spring is inserted and held in an opening 475 formed by stamping out a small portion of the metal forming each bracket 462. The torsion springs urge the switch arms counterclockwise in Figures 39 through 41. That is to say, the lower ends of the switch arms are urged away from the panel 461.

There are contact brackets, each generally U-shaped and attached to the panel 461 of the housing for cooperation with the contacts 471 and 472. There is such a contact bracket 478 attached to the panel 461 and extending around to the opposite side of the switch blade 466 whereat it has a contact for engagement with the contact 471. Similarly, a bracket 479 extends around from the panel 461 to the other side of the arm 467, and has a contact for engagement with its contact 472. It will be seen that the two torsion springs 474 normally urge the switch blades so that these several contacts will be closed.

There is an incoming electrical terminal 480 that is connected to the conductor plate 463 and hence to the upper bracket 462, and thereby connected to both of the contacts 471 and 472 of the switch. These is a lower terminal 481 that connects with the bracket 478, and another lower terminal 482 that connects with the bracket 479.

The two switch elements are operated by a cam device that is engageable with the depending insulative portions 470 of the two switch arms 466 and 467. This cam device includes a shaft 485, shown in perspective in Figure 44, and which extends between the side walls of the casing 460, wherein it has bearing support and which also extends beyond one of the side walls for actuating connections as will appear.

This shaft 485 has two flattened sections 487 and 488, the flattened section 487 being disposed to coact with the arm 466, and the section 488 being disposed to coact with the arm 467. It will be seen that there is one continuous edge 489 that extends from one side of one of the flat portions to the other side of the other flat portion, and provides a point 490 that is common to both flat portions. The two flattened portions are roughly 90 degrees apart.

On the extending end of the shaft 485, there is a crank arm 492 that is disposed outside of the switch casing 460. This crank arm is adapted to be oscillated from an extreme upper position, indicated in Figures 38, 39 and 42, to to an extreme lower position, indicated in Figure 41 and also in Figure 29. As will appear the released position of the crank arm is the one in which it is upward, as shown in Figures 38 and 39.

In this upper position, the flattened portion 488 is disposed opposite the switch blade 467, so that that switch blade may swing toward the center of the shaft in such wise as to close its contacts 472 and 479. However, in this same position, as indicated in Figure 42, the round portion of the shaft 485 is against the switch blade 466 so that its contacts are held separated.

In the position of Figure 39, it will be seen that the lower end of the arm 467 is not against the flat portion 488, so that there must be some substantial angular movement of the crank arm 492 before the edge 489 of the shaft 485 engages the arm 467 to displace it. However, by the time the position of Figure 40 is reached, the common edge 489 of the two flat portions 487 and 488 is disposed opposite both switch arms 466 and 467 so that both are open. The sequence of this operation is that the switch arm 467 is moved from closed to open position, and the other switch 466 is held in open position.

As the rocking of the crank 492 continues from the position of Figure 40 to the position of Figure 41, the other flat portion 487 is introduced opposite the other switch arm 466, so that that switch arm may move to a position to close its contacts. However, the other switch arm 467 remains open because it is against a full round portion of the shaft 485.

Upon reversal of the oscillating movement of the crank arm 492, the switch 466 will again be opened, and, after it has been opened and further movement of the crank arm 485 has occurred the switch 467 will reclose.

*Accelerator pedal control*

The accelerator pedal AP (Figures 26–29) is shown as attached in a conventional manner by a pivot 496 to the floor board of the vehicle. It is also connected by a link 497, that passes through the floor board, with a bell crank lever 498 that, in turn, is pivoted at 499 to a bracket 500 secured to the firewall of the vehicle. A coil spring 501 normally urges the bell crank lever 498 in a counterclockwise direction in the drawings to urge the accelerator pedal into its upper position.

The bell crank lever is connected by a link 502 to the crank 492 of the accelerator switch AS. The upward movement of the link 502 caused by the spring 501 normally urges the crank 492 to an upper position, the limit of which is determined by an abutment 503. By the foregoing means, the operation of the accelerator pedal between its several positions actuates the accelerator switch as aforesaid.

In addition to operation of the accelerator switch, the accelerator pedal operates the conventional butterfly valve of the carburetor. However, there is a unique operation of this butterfly valve provided for securing the highest degree of control of the overdrive unit.

In Figures 26 through 30, the carburetor is shown at C, and it has a butterfly valve 506 that is pivoted to a shaft 507 (Figure 30). The shaft 507 extends outwardly from the carburetor to be actuated by a linkage connected to the accelerator pedal. To this end, there is a crank arm 508 that is attached between its ends to the shaft 507. An adjustable stop 509 limits the rocking of the crank 508 in a clockwise direction in the views, to regulate idling of the engine.

The crank 508 is actuated by a mechanism interposed between the accelerator pedal and the crank. Returning to the bell crank 498 beneath the accelerator pedal, it will be seen that there is a link 510 connecting the bell crank 498 with a second bell crank 511 that is pivoted at 512 to the bracket 500. The upper end of the bell crank 511 is attached to a rod 513, by a pivotal connection. This rod 513 has attached to it a tubular element 514 that slidably surrounds a rod 515, the outer end of the tube 514 being formed into a slide bearing. The rod 515 is pivotally connected to the crank 508 of the butterfly valve of the carburetor.

The rod 515 has a head 516 that is slidably mounted within the tube 514 to provide a telescopic arrangement. A coil spring 518 acts to urge the head 516 to the right end of the tube 514.

The tube 514, at its left end in the views, is provided with pivot supporting ears 520, in which a slotted link 521 is mounted for pivotal movement. The link 521 has an elongated slot 522 that is slidable on the shaft 507. At its outer end, there is an overhanging ledge portion 523 on the link 521.

It may be seen that, when the accelerator pedal occupies the position of Figure 26, the bell crank 498 is in an extreme clockwise position, under the influence of the spring 501; and the second bell crank lever is likewise in an extreme clockwise position, so that the rod 513 is disposed toward the left in the views. The coil spring 518, acting upon the head 516 of the rod 515, draws the crank 508 of the butterfly valve clockwise, so that that valve is closed. The slotted link 521 is forced leftward to bring the right end of the slot 522 near the end of the shaft 507.

As the accelerator pedal AP is partially depressed, such as to a middle position as shown in Figure 27, the first bell crank lever 498 is rocked counterclockwise, and likewise the second bell crank lever 511 is similarly so rocked. There is no change in the relative positions of the rods 515 and 513; and the crank 508 on the butterfly valve moves that valve to an intermediate and partially open position. During this movement, the link 521 is drawn to the right with the slot 522 sliding over the shaft 507.

Just prior to the time the accelerator pedal reaches its most depressed position, which is a relationship indicated in Figure 28, the link 521 will be drawn so far to the right that the ledge 523 will strike the upper end 524 of the crank 508 of the butterfly valve. At this position, the butterfly valve is wide open.

If the accelerator pedal is further depressed to its lowermost position, as indicated in Figure 29, such movement will draw the tubular portion 514 to the right, and with it the link 521 will be drawn to the right, with the ledge 523 thereon abutting against the upper arm 524 of the butterfly crank 508. Such action, which takes place with a considerable mechanical disadvantage, will nevertheless cause the butterfly valve crank 508 to be moved in a clockwise direction, opposite to the direction of its previously described movement. Such action can take place because the tubular member 514 is then telescoped on the head 516 of the connecting rod 516, compressing the spring 518.

As a result of the foregoing, the final depressing movement of the accelerator pedal will take place against not only the return spring 501, but also the telescoping coil spring 518, the latter with considerable mechanical disadvantage. This final movement will return the butterfly valve 506 to its closed position, which corresponds to the position normally indicated in Figure 26 when the accelerator pedal is fully released.

In other words, there is a normal accelerating range of movement of the accelerator pedal from an idling position, indicated in Figure 26, to a wide-open position, indicated in Figure 28; and thence, with sharply defined increase of resistance, to a reclosed position, indicated in Figure 29. If the accelerator pedal is released from the position of Figure 29 to the position of Figure 28, the butterfly valve will rapidly reopen to its fully open position; and then, upon subsequent release of the accelerator pedal, it will reclose in the normal manner and continue to function in unison with the normal throttle operation of the accelerator pedal.

Thus, the operation of the accelerator pedal AP controls both the butterfly valve and the accelerator switch AS. In the previously described positions of the accelerator pedal in Figures 25 through 29, the accelerator switch moves from the position indicated in Figure 39 and corresponding to Figure 26, wherein the switch 467 is closed and the switch 466 is open, to the position of Figures 40 and 27, wherein the butterfly valve is at a mid position, and both of the switches 466 and 467 are open, and thence to the position of Figure 28, wherein the butterfly valve 506 is wide open, and wherein the switch 467 is held open and the switch 466 is closed, and finally to the extreme depressed position of Figures 29 and 41, wherein the butterfly valve is reclosed, and the switch 466 remains closed, while the switch 467 continues open.

When the butterfly valve 506 is fully closed, as in Figures 26 and 29, there is a maximum vacuum pull into the line 243 that is connected into the vacuum tank VT.

*The governor*

The governor G is a speed control mechanism, operating a switch, and is shown in Figure 1, and Figures 31-36. This governor is interposed in the speedometer cable 530 to be driven thereby, although it will be understood that other drive means may be used. The cable 530 is connected into the driven shaft immediately back of the transmission T, although again this is subject to variation.

As shown in Figure 35, the cable 530 connects into a housing 531 that is formed on the side of the torque tube 532. A worm gear 533 is splined to the propeller shaft PS of the vehicle. This worm gear meshes with a pinion 534 that rotates the flexible shaft 535 of the cable 530, so that, when the propeller shaft rotates, the shaft 535 will rotate at a speed that is related thereto.

The governor proper may preferably be attached to the frame F of the vehicle by means such as the screws 537. The portion thus attached directly consists of a lower housing portion 538 that has an offset transverse opening 539 therethrough. This opening receives a cross shaft 540 that is releasably connected at one end to the flexible cable 535, within the cable 530, the sheath of the cable being attached to a cap 541, threadedly connected to the housing 538. A suitable releasable coupling between the shaft 535 and the shaft 540 may be made when the cap 541 is removed. In similar fashion, the shaft 540 is connected to a flexible shaft extension 543 within a cable 544, this cable extending to the speedometer as will later appear. The shaft 540 may bear in bushings 545, and between the bushings there is mounted a driving pinion 546 attached to the shaft. As appears particularly in Figures 31 and 34, the shaft passes through the offset portion of the housing 538.

Within the main body of the housing, there is a gear 547 (Figure 34) that meshes with the gear 546, driven by the flexible shaft. The gear 547 is, in turn, mounted upon the vertical shaft 548 that is supported in a suitable bushing within the housing.

An externally and internally threaded connector 550 is secured in the top of the housing 538 concentrically with the shaft 548. It, in turn, receives a centrifugal switch housing 551 that is threaded into it for ready removal.

There is a flanged extension 552 of the shaft 548, which extension rides in a bushing 553 disposed within the lower part of the casing 551, its flange resting upon a cup-shaped upper portion of the bushing. This shaft 552 has secured thereto a centrifugal weight holder 554. Two centrifugal weights 555 are pivotally mounted to the weight holder 554, so that they will be rotated by rotation of the shaft 552. As they rotate, their upper ends swing outwardly. These two weights are notched adjacent their lower inner ends to engage a flange on a cam holding cap member 556. Consequently, as the weights 555 swing outwardly, they will elevate the cam holding collar cap 556.

There is a circular cam eccentrically mounted on the upper end of the cap 556. Above the cam, the cap 556 projects upwardly to be engaged by a button 559 that is urged downwardly by a spring 560. These last-named parts are mounted in an insulative cap 561 on the housing 551, and are rendered accessible by a removable plug 562. This spring 560 opposes the upward movement of the cap 556 with its cam 567, and thereby opposes the outward swinging of the weights. Adjustment of the plug 562 may adjust the force of the spring, and thereby set the speed of operation of the switch that will now be described.

Attached to the under side of the cap 561 is a switch plate 565. The plate is pivoted at 566, the pivot pin passing through the cap 561 and being provided with a spacer to properly position the plate 565 below the cap 561. This plate has an opening 567 that receives the cap 556 and accommodates the plate to rock with respect to the extension of the cap 556.

At its end opposite the pivot 566, the plate has two upstanding contact ears 568 and 569. These ears contain electrical contacts and are adapted to move back and forth between two fixed contact elements 570 and 571 that are attached to and depend from the lower surface of the cap 561.

There is a coil spring 572 that is attached at one end, as at 573, to the casing 551. At its other end, it is attached to a lug depending from below the plate 565. The alignment of the two ends of the spring and the center of the pivot 566 show that this spring is an over-center spring, and will complete the movement of the switch lever 565 in either direction, once it has been moved beyond dead center.

The switch plate 565 has a depending extension 575 projecting from one side thereof, the bottom end of the extension being inturned to form a ledge to support an upright pin 574, adapted to be engaged by the cam 557 when the weights are in and the cap 556 is down. On the opposite side of the switch plate 565, and projecting downwardly from the under surface thereof, there is another pin 577.

When the weights 555 are inwardly and the cam 557 is downwardly, it will rotate at an elevation where it may engage the pin 574. If it does so, it will push the switch plate over center in a downward direction in Figure 33, whereupon the spring 572 will cause the plate 565 to move to such a position that the contact 569 engages the contact 571. As the shafts increase in speed and the upper ends of the weights 555 swing outwardly, they will elevate the cap 556 and move the cam 557 upwardly within an elevation where it may engage the pin 577. As the eccentric 557 is relatively narrow on one side, it can fit between the pins 574 and 577 and the center of the shaft, so as to selectively engage its edge against them to displace them. When the cam 557 reaches an upper position, it will engage the pin 577 to move the plate 565 over center in the other direction, whereupon the spring 572 will complete the movement to bring the contacts 568 and 570 together.

Thus it will be seen that, at a certain critical speed, the switch plate 565 will be moved from one to the other of its positions, but, when it does move to such position, it thereafter remains out of contact with the eccentric until the speed again passes across the critical value.

Electrical wiring diagrams

Referring to Figures 1 and 71, it will be seen that the battery B is grounded as at 580. The other side of the battery is connected through a switch 581 and by a line 582 to the lower terminal 410 of the interrupter switch IS. From this terminal, a continuously connected line 583 is connected to the terminal 366 (Figure 19) of the selector switch on the overdrive side. The other terminal 367 of this overdrive switch is connected by a line 584 to the terminal 578 of the governor G. The other terminal 579 of the governor is connected by a line 585 to the upper terminal 480 (Figure 43) of the accelerator switch. The lower terminal 482 of the overdrive side 497 of the accelerator switch is connected by a line 587 to the terminal 435 of the limit switch LS1 (Figure 5). The other terminal 436 of this limit switch is connected by a line 588 that connects to the terminal 286 (Figure 45) of the coil 266 on the overdrive side of the selector valve SV. The other side of this coil is grounded at 589.

Returning to the accelerator switch AS, the other lower terminal 481 (Figure 43) is connected by a line 592, that leads to the terminal 434 of the limit switch LS2 (Figure 3 and Figure 36). From the other terminal 433 of this limit switch, a line 593 leads to the terminal 287 (Figure 45) of the coil 269 on the direct drive side of the selector valve SV. The other end of this coil is grounded at 594.

Returning to the interrupter switch IS, Figure 1 shows the upper terminal 412 thereof connected by a line 596 to the direct drive terminal 364 of the selector switch SW. The other direct drive terminal 365 of the selector switch SV is connected by a line 597 interconnected into the line 592.

The speedometer control

As previously noted, the flexible cable 530 that leads into the governor housing emanates therefrom in a continuation 544. This extension is for driving the speedometer. In view of the fact that the overdrive is located in a position subsequent to the speedometer take-off, it is necessary to change the gearing ratio (drive) of the speedometer when overdrive is engaged. In order to accomplish this, the cable 544 enters a speedometer control SPC, and from it an extension of this cable 545 continues to the speedometer SP.

It is not necessary to describe the speedometer control in detail. It is indicated in Figure 1 as including two opposite diaphragm power chambers 600 and 601 that operate a shifter element 602. This shifter element shifts a gearing in the speedometer control to provide one speed drive between the cables 544 and 545 for direct drive, and a different one for overdrive.

As already indicated, the two vacuum pipes 284 and 285 are connected into the two annular valve chambers 263 and 264 of the selector valve SV, as shown in Figures 45-48.

When the direct drive vacuum chamber is open to vacuum, this vacuum will draw through the pipe 285 and operate the diaphragm power motor 601, to shift the shifter element 602 to the right, establishing the proper speedometer drive for direct drive. When, however, the overdrive vacuum 263 of the selector valve SV is open to vacuum, the other power diaphragm motor 601 will be energized to draw the shifter element 602 of the speedometer control SPC to the left, its position in Figure 1, to establish the proper speedometer drive during overdrive.

Operation

At the start of the vehicle, it will be assumed that the transmission is in neutral, the clutch pedal P released, and the accelerator pedal AP also released. As the clutch pedal P is in released position, the interrupter switch IS is open.

The accelerator switch AS is in the position of Figure 1 and of Figures 38 and 39 wherein the switch 467 is closed and the switch 466 is open. The butterfly valve 506 on the carburetor is closed to idling position. The piston 133 is normally in its upper position, so that standard drive is engaged.

In a normal start, some manually-operated switch corresponding to the switch 581 is closed, which introduces power from the battery through the line 582 to the interrupter switch and to the lower overdrive contacts of the selector switch. The interrupter switch, however, is open because the clutch pedal P is released, although the timing of depression of the clutch pedal P is not critical in this respect, as will appear. Likewise, the selector switch contact plate 356 is in its upper position on the direct drive contacts, because the transmission is in the neutral position. As indicated in Figure 15, assuming the handle 168 to be released, the notch 338 is angularly displaced from the pin 335, and the lower edge of the shaft 167 is bearing against that pin. Thus the power from the battery is not introduced into any of the control elements beyond the interrupter switch IS and the selector switch SW.

When the engine is started, vacuum is produced in the engine intake manifold. With the accelerator pedal released and the butterfly valve 506 closed to engine idling position, a relatively large vacuum will be drawn in the pipe 248 that is connected to the vacuum tank. If the vacuum tank has been drained of vacuum, that is to say, the pressure therein has risen toward atmosphere, then, when vacuum is drawn into the manifold, reducing the pressure in the pipe 248 to substantially below atmosphere, the pressure conditions acting upon the diaphragm 302 of the vacuum tank (Figures 52 and 53) will consist of a relatively high pressure below the diaphragm and a relatively low pressure in the chamber 304 above the diaphragm, so that the diaphragm will be lifted and the valve 315 opened. This will draw a vacuum within the vacuum tank VT until the pressure within the tank 301 is reduced to the value of the pressure in the upper pressure chamber 304, plus the effect of gravity and the spring 324, whereupon the valve 315 will again close to retain this vacuum condition within the tank 301. During any normal start, there is at least a time when this vacuum can be built up, before the accelerator pedal AP is depressed, substantially opening the butterfly valve.

With the selector valves both released, as indicated in full lines in Figure 45, vacuum will be drawn in the vacuum chamber 257 of the selector valve, but it cannot be drawn beyond the two valves 265 and 268 so long as they are both closed. Hence, at the start of an operating cycle of the vehicle, the vacuum will be built up and stored in the vacuum tank VT for future use.

If during this initial starting of the engine the operator depresses the accelerator pedal AP, so as to operate the accelerator switch AS, nothing will happen because the circuits to the accelerator switches depend upon either the closure of the governor switch or the closure of the interrupter switch, as is apparent from Figures 1 and 71.

The next operation in starting the vehicle is to depress the clutch pedal P and operate the handle 168 into first speed ratio, after which the clutch pedal P is released, usually accompanied by a depression of the accelerator pedal so that the engine can then move the vehicle forward.

When the clutch pedal P is depressed, it rocks the crank arm 402 and pulls the connecting rod 400 to the right in Figure 1. Reference to Figures 49–51 inclusive will show that this operation, after a predetermined amount of depression of the clutch pedal, causes the crank 398 to turn the cam element 396 sufficiently to bring the abutment 394 against the pin 393, and to rock the switch arm 380. When the switch arm has been rocked to center position, the spring 389 will snap it into the dotted-line position of Figure 49 to close the contacts 382 and 411, and thus close the interrupter switch. This closure may take place after approximately one-half of the depressing movement of the clutch pedal P, and the switch will remain closed during the remainder of the depression of the pedal.

After the pedal is thus depressed to disengage the engine friction clutch, the handle 168 is moved into first gear position. As previously noted, this operation takes place with the shaft 167 (Figures 13–15) drawn upwardly away from the limiting pin 335, so that the operating pin 340 of the selector switch is freely displaced by the coil spring 355 to its upper position, maintaining closed the direct drive contacts 358 and 359.

With the interrupter switch IS closed, and the direct-drive contacts of the selector switch SW closed, power may then flow from the battery line 582 through the interrupter switch to the line 596, thence through the upper direct drive contacts of the selector switch SW, by the way of the line 597 to the line 592 and to the limit switch LS2.

If the overdrive has stopped in direct drive transmitting position, the limit switch LS2 will be opened by the shoulder 452 on the sleeve 445. However, if for some abnormal reason the vehicle was stopped with the overdrive engaged, or with the shift in some intermediate position short of full engagement of direct drive, then the limit switch LS2 will be closed. If the switch LS2, therefore, is closed at the initial depression of the clutch pedal, the power will continue from the line 592 through the switch LS2, and then by way of the line 593 into the right-hand or direct drive solenoid coil 269 of the selector valve SV, as shown in Figure 1 and Figure 45.

Upon energization of the coil 269, the valve 268 will be drawn to the right in Figure 45 to close the seat 262 and to open from the valve seat 259. Under such circumstances, vacuum from the medial vacuum chamber 257 is drawn past the valve seat 259 and from the pipe 251 into the upper end of the overdrive cylinder ODC. With the valve 265 of the selector valve in its closed position, atmosphere can enter the atmospheric port 279 and thence, by way of the passage 280, into the two end atmospheric chambers 267 and 273, which are always open to atmosphere. This atmospheric pressure may be delivered past the open valve seat 261 into the annular valve chamber 263 on the overdrive side of the selector valve SV. Thence it may enter the other pipe 250 to the bottom of the cylinder ODC on the overdrive, producing a pressure differential that drives the piston 133 up in Figure 1. As previously described in connection with the overdrive, this operation will insure the shift of the overdrive mechanism into direct drive position. The operation will also assure that direct drive is completely engaged. Complete engagement of direct drive opens the limit switch LS2. When the limit switch LS2 is open, the circuit to the coil 269 is broken, so that the valve 268 again seats on the seat 259, cutting the vacuum off of the cylinder ODC and leaving atmosphere on both sides of the piston 133. Thus the piston is stabilized, and the consumption of electric energy is stopped.

A clutch operation, accompanied by a positioning of the hand lever 168 in one of the normal forward speed drive positions, in neutral, or in reverse, is always attended by whatever selector valve operation is necessary to insure that the overdrive mechanism is in direct drive transmitting position.

When the clutch pedal P is subsequently released, after engagement of the transmission into first speed drive, the thrust or connecting rod 400 moves again to the left in Figures 1 and 49–51. In this withdrawal of the clutch pedal, and consequent movement of the connecting rod 400, the cam 396 moves a substantial angular distance before it engages the abutment 395 against the pin 393 of the switch arm 380, to displace the arm 380 past dead-center position in an opening direction. This assures a substantial time interval of closure of the interrupter switch during each clutch pedal cycle, so that the operations dependent upon closure of the interrupter switch may be completely performed.

It will be understood that the shift into reverse ratio drive will be similar in cycle to the first gear cycle. The only difference will be that the notch 338 (Figure 15) on the end of the shaft 167 will be moved further away angularly from the pin 335, when reverse position of the handle 168 is attained.

When the driver shifts to second gear, he releases the accelerator pedal AP, depresses the clutch pedal P, throws the handle 168 counterclockwise to the neutral slot position, and releases it so that the spring 175 will force the shifter shaft 167 downwardly, causing the pin 202 to move to the dotted-line position of Figure 15. This brings the lower end of the shaft 167 against the pin 335, but with the notch 338 angularly displaced from the pin to the degree shown in Figure 15. From this lower neutral position, the driver then moves the handle 168 and the shaft 167 in a counterclockwise direction to second speed position. This turns the shaft 167 to remove the notch 338 a greater angular distance from the pin 335, the action taking place with the end of the shaft 167 abutting the upper face of the pin 335. Consequently, the selector switch remains in direct drive position. Normally, for reasons previously described, the limit switch LS2 will remain open because the overdrive is fully in direct position. Consequently, no circuits are completed, although the accelerator switch AS is closed on the overdrive side. However, if the overdrive for some reason is out of its full direct drive position, the piston 133 will be moved to restore direct drive position in the same manner described in connection with establishment of first speed drive.

When the driver then desires to establish third speed drive, he releases the accelerator pedal AP, depresses the clutch pedal P, operating the interrupter switch as aforesaid, and then draws the handle 168 clockwise through neutral and down into its third gear position. This position is indicated in Figure 14. As is evident, this operates the arm 193 to shift the synchronizer blocker 214 of the transmission into direct-drive position.

With the present arrangement, it is preferred that the driver maintain the handle 168 the same distance from the steering wheel that it occupied in moving from neutral into third speed position, which is easy to do because an upward pressure on the handle after neutral is passed brings the pin 202 against the end of the hub 199 of the other shifter arm, as is indicated in Figure 14, giving a "feel" to the operation. This position of the handle should be maintained as long as the accelerator pedal is in its released position. Such will maintain the shaft 167 upward, so that it does not abut the switch actuating pin 340 of the selector switch, but rather leaves that switch in its direct drive position.

As the clutch pedal is released, the operator depresses the accelerator pedal AP to a mid position to maintain speed. This action reopens the overdrive switch 467 of the accelerator switch AS, an action that may take place at some convenient and usual speed for third gear operation, such as 15-18 M. P. H. Hence, when the vehicle is established in third speed operation, the circuits are opened.

After third speed is duly established, the operator may immediately release the handle 168. Thereupon the spring 175 will force the shaft 167 downwardly from the position of Figure 14, that illustrates the position corresponding to third speed. As the notch 338 is aligned with the fixed pin 335, the shaft 167 is released to move a greater distance axially downwardly than from any other of its positions. In such movement, after the notch 338 has slightly received the pin 335, the plug 203 will engage the switch pin 340 of the selector switch, moving it axially downwardly. This action is transmitted to the plug 348 and the pin 353. The force of the spring 175 is enough to overcome the spring 355, so that the spring 175 forces the contact plate 356 away from the direct-drive contacts 358 and 359 and into engagement with the overdrive contacts 360 and 361. Any overtravel of the plug 348 is taken care of by the compression of the spring 357, which prevents straining of the switch contact parts.

The foregoing shows that, when the handle 168 is released, after an establishment of third speed drive, the selector switch SW is preselected into an overdrive position. This bypasses the interrupter switch IS, and closes the circuit through the line 584 to the governor G.

The governor switch will close its contacts 568 and 570 at some suitable speed, such as approximately 25 miles an hour, and, when this occurs, the foregoing circuit is completed further through the line 585 to the accelerator switch. However, at such time in the usual course of driving, the accelerator switch is in a mid position wherein both of the switch elements 466 and 467 are open. Consequently, the vehicle remains in third speed.

If, after attaining the critical speed set by the governor so that the governor switch is snapped to closed position, the driver desires to establish overdrive, he merely releases the accelerator pedal AP in the direction of the arrow to its dashed line engine idling position depicted in Figure 71 corresponding to its full-line position in Figure 1. In this operation, the cam 485 moves from a position typified by Figure 40 toward the position of Figure 39. Prior to the fully released position of the pedal AP, the cam 485 introduces the flat portion 488 to the switch blade 467, closing its contacts, while retaining the switch 466 in open position. Thereupon, the switch 467 completes the circuit from the line 585 through the switch 467, and thence, by way of the line 587, to the limit switch LS1. This switch is closed at this time because overdrive is not engaged. Hence the circuit continues through the line 588 to the solenoid coil 266 of the selector valve SV, and thence to ground, as indicated in Figure 45, to thus preenergize the vacuum power to establish overdrive ratio upon interruption of torque at full released position of the accelerator pedal AP. It is important to note here that Figure 71 illustrates the initial phase of the power-shift to overdrive, in which the power cylinder ODC is energized to complete the shift upon release of the accelerator pedal AP to the dashed line position.

When the coil 266 is energized, it draws the valve 265 to the left in Figures 45 and 71, so that the latter cuts off the atmospheric port 261 and opens the vacuum port 258, introducing vacuum from the vacuum chamber 257 to the annular valve chamber 263, and thence draws the vacuum through the pipe 259 that leads into the bottom of the overdrive cylinder ODC. As atmosphere, for reasons already noted, is ported through the pipe 251 to the top of the cylinder ODC, the drawing of vacuum from the other side of the piston 133 will cause the same to move to the position shown in Figures 3 and 4.

As described in connection with operation of the overdrive, the piston 133 will stop in the position of Figure 3 because the transmission of torque through the overdrive mechanism causes a locking of the collar 107 with the ring 123. It is preferable to form the flat 488 on the cam so that the accelerator switch 467 for overdrive will close, and the sequential operations up to initial displacement of the piston 133 will be initiated prior to the time the accelerator pedal is fully released. By this means, the torque interruption that is normally necessary for full shift of the overdrive will not occur prior to the time the vacuum is ready to perform the shift. Indeed, it is desirable to have the operations just described act as a preliminary to the torque interruption— a simulated preselective operation that is not dissimilar to the preselective manual switch and correlated clutch pedal switch that now characterize certain overdrive power shifters.

When the torque is relieved by release of the accelerator pedal AP, the lever 137 moves rapidly counterclockwise to withdraw the collar 107, disengaging the lugs 110 and 115, and forcing the lever to its extreme counterclockwise position, shown in Figure 2. If toward the end of this movement of the lever 137 the lugs 118 (Figure 8) abut the face of the annular plate 123, preventing full rightward movement of the collar movement, the piston 133 may nevertheless complete its cycle rapidly because the secondary lever 140 will be rocked to a disaligned position, further compressing the spring 158. Thereafter, when the lugs 118 are aligned with the notch 124 or 125, the action of the overdrive shift will be completed in its final movements by the influence of the spring 158 in a quick and noiseless manner already described.

By the foregoing arrangement, the piston 133 can be caused to complete its stroke rapidly upon release of the accelerator pedal, so that the pedal can be again depressed and can perform its full overdrive shifting cycle in a very brief time. Furthermore, the rapidity of the shift is increased by the presence of the stored vacuum in the vacuum tank VT. It may be noted that the governor G applies adequate differential between closing of its switch and reopening of the same to prevent break in the circuit for the overdrive, by slowing of the vehicle, during the shifting cycle.

When the accelerator pedal AP is again depressed to some mid position that would correspond to the speed of the vehicle for operating in overdrive, both switches 466 and 467 are again open, deenergizing both of the coils of the selector valve SV and admitting atmosphere to both sides of the piston 133. Furthermore, if the accelerator pedal is not depressed instantaneously, but is left in its released position, the movement of the collar 107 to its full overdrive position will open the limit switch LS1, which is in series with the circuit of the overdrive coil of the selector valve SV. Consequently, the circuit to the selector valve is automatically opened when the corresponding shift has been completed.

Thereafter the normal operation of the vehicle will maintain the overdrive in engagement irrespective of the position of the accelerator pedal within the normal range of operation thereof for conventional carburetor control. If the vehicle slows down so that the governor switch G opens, there will not be any return to direct drive position of the overdrive without the performance of certain other actions. If the clutch pedal P is depressed, and the car is coasted to a stop, the piston 133 will nevertheless remain in overdrive position, provided the handle 168 is not moved from its overdrive position.

At any time it is desired to return from overdrive to direct drive position, this may be accomplished by a return of the handle 168, as will later be explained, but it also may be accomplished solely by an operation of the accelerator pedal AP. This operation gives what amounts to an acceleration gear for quick acceleration when it is necessary to have greater power than overdrive provides. With the operation in overdrive, and the car proceeding, the operator may completely depress the accelerator pedal AP to the floor. The normal speed regulating range of the accelerator pedal is from the position of Figure 26 to the position of Figure 28. However, if the operator depresses the pedal AP fully to the position of Figure 29, this will operate the accelerator switch to the position of Figure 41 on the same sheet, which closes the switch 466 by introducing the flat portion 487 of the cam 485 to it. At this time, the round portion is opposite the other switch blade 467, which therefore remains open. When this occurs, at a position above the governor speed wherein the governor switch is closed, a circuit is completely through the line 582 from the battery and the line 583, through the governor switch, and by way of the line 585 to the accelerator switch AS. Thence, with the switch 466 closed, the circuit continues through the line 592 to the limit switch LS2. From the limit switch LS2, the circuit continues through the line 593 to the direct drive solenoid coil 269 of the selector valve SV, as shown in Figure 45. As previously explained, the energization of this coil will establish the vacuum conditions to return the overdrive mechanism to direct drive position, following substantially half open throttle but prior to full depressed position of the accelerator pedal AP to interrupt torque, so that the pre-energized shift will occur. The limit switch LS2 is closed, except when the overdrive is in direct drive position, and, even if the accelerator pedal is maintained in depressed position, so that the switch 466 of the accelerator switch AS is closed, the limit switch LS2 will immediately break the circuit as soon as direct drive is fully established. However, only a brief operation of the accelerator pedal is required for this function because of the spring energized arrangement of the levers 137 and 140 in the overdrive shift, which levers accommodate a full cycle of the piston, despite the fact that the overdrive shift itself may be delayed before it is completed.

Thereupon the release of the accelerator pedal AP from its extreme position back to some intermediate position will restore the operation of the vehicle in direct drive, and the necessary acceleration can be obtained by the added power of third speed drive.

In order to insure ample vacuum for the shift back of the acceleration arrangement just described, the butterfly valve of the carburetor is momentarily closed when the accelerator pedal AP is depressed to the position of Figure 29. As previously described, the movement of the tube 514 to this extreme position draws the slotted link 521 over to such an extent that it acts on the upper end of the butterfly valve crank 508 and closes the butterfly valve while the accelerator pedal is thus fully depressed. However, as the vacuum can be then restored immediately, and particularly because of the relatively high speed of the engine, the accelerator pedal can be released immediately, and there will be adequate vacuum in the tank to complete the shift. It is desirable to have this added feature of vacuum restoration to insure the presence of a full amount of vacuum to effect the shift. When the engine has been running at a relatively high speed, the vacuum drawn in the pipe 248 is much reduced because of the wide open condition of the butterfly valve, which tends to short circuit the pipe 248. Consequently, the momentary closing of the butterfly valve at the high engine speed is desirable to cause an immediate recharging of the vacuum tank VT, which vacuum tank will retain such high charge quite an adequate length of time to complete the next shift.

Upon restoration of direct drive by the acceleration shift aforesaid, the overdrive will remain in such position until intentionally removed therefrom. Assuming that the governor switch remains closed, overdrive may again be restored by the simple expedient of releasing the accelerator pedal to its position where it will again close the switch 467, such position being indicated in Figure 39. This will thereupon complete again the previously described circuit that passes through the switch LS1 and energizes the coil 266 of the overdrive valve on the selector valve SV.

Thus it may be seen that, when the overdrive is established, an operation taking place above the critical speed at which the governor G is set to operate its switch, the selection of overdrive or direct drive is merely a matter of whether the accelerator pedal is fully released or fully depressed. The driver need do no more than move the accelerator pedal to one of these two positions in order to obtain the desired speed drive through the overdrive. And these cycles of the accelerator pedal can be performed rapidly because, in each of them, the vacuum in the pipe 248 is built up rapidly to recharge the vacuum tank, which will retain the adequate amount of vacuum to restore a complete operation of the piston 133 independently of any available vacuum from the engine intake manifold. Also, it will be noted that, whenever shift to either overdrive or direct drive is effected completely, the battery is cut off by the limit switches, so that undue drain cannot be put thereon in the event the accelerator pedal is operated to hold its respective switch closed longer than necessary to perform the selected shifting operation.

In addition to the above, the operation of the handle 168 to direct drive position will insure the restoration of the overdrive to direct position. By means of this arrangement, it is impossible to superpose overdrive on one of the other speed drives.

Whenever the handle 168 is withdrawn from overdrive position into third gear position or into any of the other conventional gear ratio positions except overdrive, the pin 340 is released so that the spring 355 can return the selector switch armature plate 356 to direct drive position. This switch SW will remain in direct drive position at all positions of the handle except the overdrive position, and thus will preselect the overdrive for its direct drive position. If the selector switch SW is positioned in direct drive, and the overdrive is in overdrive position, any subsequent depression of the clutch pedal P, accompanied by closure of the interrupter switch IS will complete the circuit from the battery line 582 through the interruper switch IS, the line 596, the direct drive contacts of the selector switch SW, the line 597, and the line 592, to the limit switch LS2, which is closed because overdrive is engaged, thence through the line 593 to the direct drive coil of the selector valve SV. By a cycle previously described, this will forthwith reestablish direct drive. As shifts of the conventional three-speed transmission are not obtained without declutching, automatically or otherwise, and also by a disposition of the hand lever 168 into one of its direct drive positions, it will be seen that any normal shifting operation to a direct drive speed will fulfill the necessary operations required to restore the overdrive to direct drive. Also, as already noted, if the vehicle is stopped without a return to overdrive position, as when the engine is turned off with the overdrive engaged, nevertheless the next time the engine is started, with the normal operations of the handle 168 and the clutch pedal P, direct drive will be forthwith reestablished.

Thus it will be seen that the present control does not interfere with the normal operation of the transmission into its regular speed drives. It preselects overdrive from third speed whenever the handle 168 is released with third speed engaged. Overdrive can then be completed only by the described sequence when the accelerator pedal is released, while the handle 168 is in its released position after the establishment of third speed, and after the governor has closed its switch because the vehicle has attained the critical speed, and after torque release. However, as a practical matter, this means that overdrive can at any time be established above the critical speed by the simple expedient of releasing the accelerator pedal instantaneously after third speed has been engaged. Subsequently thereto direct drive can be reestablished by depressing the accelerator pedal substantially to the floor for an instant. Hence, at any speeds above the critical speed of the governor, the choice of overdrive or direct drive is merely a matter of operating the accelerator to its two extremes.

Yet direct drive is always automatically reestablished when the operator steps down to a lower speed, as such step down is always accompanied by a cycle of operation of the clutch pedal P and a shifting of the handle 168.

In the foregoing description of mechanism and operation, this invention has been related to an overdrive which is typically something separate and supplementary to the ordinary transmission. It has especial value in connection therewith. It may be seen, however, that overdrive constitutes an additional speed drive; and it may be an additional drive that is built as part and parcel of the transmission T in one of the manners well known in the art. The control of the present invention in such aspect consists of one wherein there is a power shift between two different speed drives, which power-shift is selectively operated by the cycles aforesaid.

Furthermore, certain elements of this control may be replaced by other similar controls known in the art. It is fully evident that a power-operated clutch could be employed in place of the personally-controlled clutch pedal P illustrated. Also, the pedal P does not necessarily have to operate the clutch in conjunction with the operation of the interrupter switch IS, although this combination is highly desirable for obvious reasons. The accelerator pedal AP represents a primary personally-operable control. It is highly desirable to combine a shifting control with the accelerator operation, but again it may be said that this primary personally-operable control need not be specifically interconnected with regulation of the carburetor.

It likewise is evident that the manual shifting means 168 typifies a presetting device, movable to positions that accord with the various speed drives of the transmission T. There is a combination present between the manual shift lever 168 and the other parts of the control. However, it will be understood that the selector switch SW typifies a control having one position for speeds other than a final power-operated speed, and another position for that final speed. Thus, if it be desired to superpose what amounts to a semi-automatic shift between two certain speed drives of a transmission that otherwise may be either automatic or manual, this can be done by operation of a selector switch, such as the switch SW, that has one position attained only after attainment of the gear shifting position to which the final shift is to be superposed.

The governor G and its associated switch are highly desirable to prevent the effecting of overdrive at speeds too low to give adequate power therefor. Under certain circumstances, however, the governor switch may be dispensed with. Normally, without the governor, a conventional shift from second speed to third speed would produce a jumping of third speed and a shift from second to overdrive. This is a satisfactory arrangement under many conditions, because, when it is desired to have the power of the third speed, it can be readily obtained by suitable operation of the accelerator pedal, either in connection with the shift from second speed or by operation of the accelerator pedal substantially to the floor after overdrive has been established. In other words, with the governor omitted, there would be normally a shift from second to fourth for overdrive, with third available only as a drive of added power where necessary.

*Modified embodiment (Figures 56 to 70 and 72)*

In the modification of Figures 56–70, inclusive, the handle 168 operates the shift control shaft 167 on the steering column in the manner previously described in connection with the principal form of the invention. The mounting of the cross pin 202 in the plug 203 within the shaft 167 is the same as before. The end of the shaft 167 has the same notch 338. The actual selector switch SW is the same as before, it having the switch contact plate 356 that operates a lower set of overdrive contacts 360 and 361, and a set of direct drive contacts 358 and 359, the switch being operated by the pin 340 that is the same in this arragnement as in the previous one.

The manner of accommodating the downward axial movement of the shift control shaft 167 is different in this modification, with particular reference to the limit pin. In this modification, the limit pin is shown at 625 (Figures 58–64). It is slidably disposed in a hole through the bearing bracket 330. It has a lower projecting tongue 626 that preferably is rectangular in a direction axially of the shaft 167, so that it may engage, under certain conditions, within the notch 338. The pin 625 also has a reduced portion 627 that extends upwardly through the top of the bearing portion 330 and through the cap 346. The cap acts as one constraining means for a compression spring 628 surrounding the reduced portion 627, that normally urges the pin 625 downwardly. The upper end of the projection 627 is forked to pivotally receive one arm 629 of a bell crank lever 630 that is pivotally supported at its midpoint on a projection formed on a bracket 631 mounted between the mounting nuts for the selector switch SW. The other arm 632 of the bell crank lever 630 extends upwardly, preferably in the manner illustrated in Figure 60. Its upper end has a notch 633, and beyond this it has a generally arcuate edge 634.

Normally, the spring 628 urges the pin 625 downwardly, so that the main portion of the pin is in position to engage the lower edge of the shaft 167, as is shown for example in Figures 62 and 64. However, when the bell crank lever 630 is rocked counterclockwise in Figure 60, the pin may be elevated sufficiently to permit the tongue 626 to be received by the slot 338 when the hub 195 is in third speed position, whereupon the shift control shaft 167 may move downwardly in the manner of the previously described control. This downward movement shifts the selector switch SW from position to close the direct drive contacts into position to close the overdrive contacts in the same manner described in connection with the former type of control.

The accelerator pedal in this case operates a T-shaped lever 636 pivoted at 637 to the bracket 500. The lower arm 638 of this lever has a laterally extending pin 639 thereon, that is located near the notch 633 on the bell crank lever 630.

When the accelerator pedal AP is in its released position, the pin 639 is rocked to a position substantially below the notch 633 on the lever 630, and hence away from the arm 632 of the lever, in such wise that the compression spring 628 may act to urge the pin 625 downwardly to the position of Figure 62, wherein it may obstruct downward axial movement of the shift control shaft 167, in the same manner as the pin 335 operates in the control shown in Figure 13. The lever 630 may be slightly separated from the pin 639 in this position. When the accelerator pedal AP is depressed a first amount, it will move the pin 639, in an arcuate path, up into the notch 633, as indicated in the middle dotted position of Figure 60. Thereafter, slight further depressing movement of the accelerator pedal will cause the pin 639 to rock over the upper rounded shoulder of the notch 633 and onto the concentric arcuate edge 634, so that it occupies the full-line position of Figure 60. In so doing, the pin 639 displaces the lever 630 counterclockwise, which causes the pin 625 to be lifted against the spring 628 a sufficient distance to raise the pin and dispose the tongue 626 in position to be received in the notch 338 on the shift control shaft 167. It is also to be noted that after the pin 639 enters the concentric edge 634, following the lifting operation of the pin 625 in the manner just described, further depressing movement of the accelerator pedal AP will permit the pin 625 to remain in its initial lifted position due to the concentric relation between the arcuate edge 634 and the sweep of the pin 639 actuated by the accelerator pedal AP.

The effect of this is that, when the accelerator pedal is released, the pin 625 may be in the position wherein it prevents the shifting of the selector switch; but, after the accelerator pedal has been depressed a predetermined amount, it will raise the pin so that, when the shaft 167 is in its third speed position, wherein the notch 338 is aligned with the pin 625, the selector switch SW may be shifted from the direct drive to the overdrive contacts.

The accelerator switch is operated by a link 640 that engages a crank arm 641 on the accelerator switch AS. In this modification, the crank arm 641 operates a cam shaft 642 that is similar to the previously mentioned one, but instead has a single flat portion 643 that extends far enough to operate the two switches. These switches comprise two switch elements 645 and 646 that are similar in construction to the arms previously described. However, these two switch blades are separately connected, there being terminals 647 and 648 for the switch blade 645 and terminals 649 and 650 for the switch blade 646.

As shown in Figure 66, when the crank arm 641 is in its upper position corresponding to the released position of the accelerator pedal AP, both of the switch arms 645 and 646 are in contact closing position because the flat 643 is facing both of them. However, when the accelerator pedal is partially depressed to the position shown in Figure 67, both of the two switches 645 and 646 will be opened, and will remain open during continued depression of the accelerator pedal.

The governor G in this case is the same as the governor G of the previous description, except that, in this case, both of the contacts 570 and 571 are operating contacts. The limit switches LS1 and LS2 are the same as before.

In this modification, the electrical connections (see Figure 72) from the battery include a line 655 that passes through the switch 656, and continues by a line 657 into the main terminal 579 of the governor. The slow contact 571 of the governor is connected by a line 658 that is united with the terminal 648 of the accelerator switch 645. The other terminal 647 of the accelerator switch 645 is connected by a line 660 that leads into the limit switch LS2, which is open only when direct drive is fully engaged. The other side of this switch is connected by a line 661 to the direct drive coil 269 of the selector valve SV.

The high speed contact 570 of the governor is connected by a line 663 that is attached to both of the terminals 359 and 361 of the direct and overdrive sides of the selector switch SW. The other direct drive contact 358 is connected by a line 664 that is connected into the line 658. The other contact 360 of the overdrive side of the selector switch is connected by a line 665 that leads to the upper terminal 650 of the accelerator switch 646. The upper terminal 649 of this accelerator switch is connected by a line 666 that leads to the limit switch LS1 that is opened when overdrive is fully established. The other side of the limit switch LS1 is connected by a line 667 that leads to the overdrive coil 266 of the selector valve SV.

*Operation of modified embodiment (Figures 56 to 70, and 72)*

The normal shifting of gears into first, second and third forward speeds and reverse speed may be made in the conventional manner. During such shifting, the shaft 167 is in an upper position, free of the pin 340, as in the original construction, as the end of the shaft 167 is displaced upwardly from the pin 625. In first and reverse gears, the position of the pin 625 is not critical. When the shaft 167 is in the positions of lower neutral and second gears, the end of the shaft 167 may abut the upper side of the pin 625. If the accelerator is released, the pin 625 may be so far down that the main body thereof is in position to be slidably engaged by the end of the shaft 167. If the accelerator pedal is depressed sufficiently to rock the arm 630, the tongue 626 may be slidably engaged by the end of the shaft 167. In any case, the notch 338 is angularly displaced from the tongue 626, so that axial displacement of the shaft 167 leftward from the positions indicated in Figures 62 and 63 cannot take place.

When the shaft 167 is moved by the handle 168 into third gear position, with the accelerator pedal released, so that the main body of the pin 625 is down, the result will be as indicated in Figure 62, wherein the notch 338 is angularly disposed to receive the tongue 626 but cannot do so because of the downward disposition of the enlarged main part of the pin 625. Thereafter, when the accelerator pedal is depressed to the full-line position of Figure 60, the pin is lifted until the tongue 626 is disposed in axial alignment opposite the notch 338, whereupon the upper spring 175 will cause the shaft 167 to move downwardly and axially, a movement accommodated by engagement of the notch 338 over the tongue 626 of the pin 625. The axial movement is sufficient to cause the plug 203 to engage and displace the pin 340, and thus shift the selector switch from its direct drive position, closing the contacts 358 and 359, to its overdrive position, closing the contacts 360 and 361. If, after such shift of the shaft 167 into overdrive position has been accomplished, the accelerator pedal is thereafter released, the pin 625 cannot further descend because the two shoulders formed between the main body thereof and the tongue portion 626 abut the outer surface of the shaft 167 adjacent the sides of the notch 338, so that overdrive will be maintained. However, as soon as the handle 168 is manually drawn upwardly toward third gear position, the compression spring 628 will cause the pin 625 to again descend to its normal limiting position with respect to preventing the full downward axial movement of the shifting control shaft 167. It will be noted that the pin 625 requires axial movement of the shaft 167 back to third gear position before rocking movement into the neutral position can be attained. And, when the shaft 167 is thus axially returned to third gear position, the selector switch returns from overdrive position to direct drive position, and is so held by abutment of the end of the shaft 167 against the side of the main body of the pin 625 following release of the handle 168.

At the start of any operation, it will be assumed that the engine is running, the switch 656 is closed, that any provided preliminary speed drive operations have been performed, and that the handle 168 is in its third gear position. Such movement of the handle 168 into third gear position will be preceded by depression of the clutch pedal P and normally a release of the accelerator pedal AP. When the accelerator pedal is released, both of the two accelerator pedal controlled switch elements 645 and 646 will be closed.

At the speeds normal for the shift into third gear, the governor G will still be closed to connect the contacts 569 and 571, the latter being the slow speed contact of the governor and connected to line 658. Also, normally, at the instant the handle 168 is moved into its third gear position and released, the accelerator pedal is also released, which means that the bell crank lever 630 is released and the pin 625 is in its lower position, obstructing downward axial movement of the shaft 167 and maintaining the selector switch SW in its upper and direct drive position. As a result of the foregoing, there will be a circuit completed as follows: From the battery B, through the line 655 and the switch 656, and the line 657 to the main terminal 579 of the governor.

As the slow contact 571 of the governor G is closed, this circuit continues through the line 658 to the switch 645 of the accelerator switch AS. With the accelerator pedal AP released, the switch 645 is closed, and the circuit continues through the wire 660 to the limit switch LS2. If this switch is closed, as it will be only when direct drive is not fully engaged, the circuit will continue through the line 661 to the direct drive coil of the selector valve SV, producing the previously described operation opening the switch LS2, and breaking the circuit. If direct drive was already established, the circuit will not be effective. As a matter of fact, the foregoing circuit will operate in the manner described regardless of the position of the selector switch SW, and hence irrespective of the speed drive being operated.

The operator, with third speed drive established, depresses the accelerator pedal to increase the speed of the vehicle, which opens the accelerator switches 645 and 646, breaking both circuits to the selector valve SV. At some predetermined speed, such as approximately twenty-five miles per hour, the governor G will open the slow speed contacts 569 and 571 and close the high speed contacts 568 and 570. As the accelerator switches are open, nothing will happen by the mere shifting of the governor switch, irrespective of the extent of the continued depression of the accelerator pedal AP.

If the operator desires to effect overdrive, he releases the accelerator pedal momentarily after the governor G has closed its fast contact 570. This establishes a circuit from the governor G through the line 663 to both lower contacts 359 and 361 of the selector switch SW. As the previous operations have caused shift of the selector switch plate 356 to the overdrive contacts, this circuit continues through the line 665 to the lower terminal of the overdrive accelerator switch 646. This switch is closed during the release of the accelerator pedal, and shortly before the fully released position. The circuit then continues by the line 666 to the limit switch LS1, now closed because direct ratio is engaged. From the switch LS1, the circuit passes by way of the line 667 to the overdrive coil of the selector valve SV. This coil is immediately energized, and vacuum in the vacuum tank VT draws low pressure through the pipe 249, the overdrive side of the selector valve SV, the pipe 250, to the overdrive side of the cylinder ODC, forcing the piston 133 inwardly by pressure differential, and, when torque is released, effecting a full shift to overdrive. The full shift to overdrive opens the limit switch LS1 and deenergizes the circuit. Figure 72 illustrates the final phase of the power-shift to overdrive substantially completed with the accelerator pedal AP in fully released engine idling position.

It is preferable to have the accelerator switch AS close slightly ahead of fully released position of the pedal AP, to pre-condition the mechanism for the overdrive shift, so that vacuum may be fully effective at the released position of the pedal AP, to perform the shift.

After overdrive is established, subsequent release of the accelerator pedal will not change the position of the selector switch SW, because the pin 625 cannot move fully downward to limiting position, the shoulders of which being obstructed by the shaft 167 at the notch 338.

The operator can continue operating in overdrive until two operations coincide, or until he manually withdraws the shaft 167. The two operations consist of the shift of the governor switch back to the slow speed contact 571, and the coincident withdrawal of the accelerator pedal to its almost released position, wherein the accelerator switch 645 is again closed. Thereupon the first described direct drive circuit will be energized, and will be effective to produce a shift to direct drive when torque is released. As soon as direct drive is effected, the limit switch LS2 opens, deenergizing the circuit.

The operator may thus selectively obtain overdrive or direct drive, dependent upon vehicle speed, by momentarily releasing the accelerator pedal. However, he may retain either drive irrespective of shift of the governor switches, by maintaining the accelerator pedal AP depressed beyond its position to operate the switches 645 and 646.

If the operator desires, he may lift the handle 168 back toward third or direct drive 1 to 1 ratio, and in any return to neutral or a lower drive he must do this. This will insure shift of the overdrive to direct drive whenever the accelerator pedal is released, irrespective of vehicle speed, because both of the governor switch contacts 570 and 571 are connected to the line 658 when the selector switch is in its upper position, as is apparent. This affords a means to obtain quick return to direct drive irrespective of vehicle speed, as for acceleration, and it also prevents superposition of overdrive on lower speed drives.

The foregoing modification also insures an operation in third speed drive by following normal driving routine, because initial release of the handle 168 in third speed position occurs when the accelerator pedal AP is released so that the pin 625 obstructs descent of the shaft 167 and hence shifting of the selector switch SW, to overdrive position. There must be a depression of the accelerator pedal AP to withdraw the pin 625, to accommodate shift of the switch SW, but in the preferred order this withdrawal requires greater depression of the pedal AP than is required to shift the accelerator switch AS to open position. Consequently, the selector switch moves to overdrive position at a time when the circuit to the overdrive side of the selector valve SV is otherwise broken. Therefore, some acceleration in third speed drive is a prerequisite to shifting to overdrive. By an intentional depression of the accelerator pedal AP at the time of release of the handle 168 in third speed position, followed by release of the pedal AP prior to re-engagement of the clutch, the shift from second or neutral to overdrive can be made.

This modification also operates independently of the clutch pedal, and does not require the interrupter switch that is used in the first type. The accelerator pedal acts as a torque interrupting means in this modification, as in the first type, which additionally has the clutch as a further torque interrupting means.

As in the first type, the control of this modification is especially adapted to operation of an overdrive, which is a mechanism that superposes a choice of speed drives onto an established drive, without disengaging it. However, both controls contain features applicable to a shift between any two speed drives in various types of transmissions, including the conventional sliding gear type. The art includes, for example, three speed transmissions wherein one speed is established, and additional speeds are obtained by either automatically disengaging the established speed drive, or by rendering it ineffective to interfere with higher drives by means such as an overriding clutch.

Also, the relay of the several controlling operations through a vacuum power means is desirable, but, in some instances, such as in some available overdrive mechanisms, the control operations are applied directly. Note that energizations of the coils of the selector valve SV correspond in many respects to the energizing operations in the vacuum cylinder ODC.

The precise timings of the several control devices, set forth in the description of the two types of control, are the most desirable ones. It will be understood that variations in these orders of functioning may be made, at the cost of some valuable characteristics of the cycles described.

It is also evident that variations in the details of individual control elements may be made without departing from the novel combinations of the claims appended hereafter. The details of control elements described, and the electrical wiring diagrams illustrated, are preferred forms only, that gain their described advantages, but which can be varied within the knowledge of the art and the present disclosure of objectives sought.

I claim as my invention:

1. In a control for a transmission having a neutral condition and means to establish a first and means to establish a second speed ratio, manual means including a mechanical connection accommodating a supplemental movement of said manual means without disrupting the said mechanical connection thereof movable from a neutral position to a position to operate the first speed ratio means, and movable from said first speed position to a supplemental position without return to neutral, preselection means set by said manual means in its supplemental position to preselect the second speed ratio means for operation, additional means interconnected with said preselection means, and movable between first and second positions, to render the means to establish the second speed ratio operable only when said preselection means is set by movement of the manual means to supplemental position and the additional means is in first position.

2. In a control for a transmission having means to establish two speed ratios; a manual member movable into each of two positions; means including a mechanical connection operated by positioning of the manual member in one position to establish the first of the speed ratios; means operated upon positioning of the manual member into the other position without disrupting the aforementioned mechanical connection, to operate the establishing means to render either the first or the second speed ratio effective, said last-named means including an additional personally-operable control member movable to determine whether the means will establish the first or the second speed ratio, there being an engine connected with the transmission, and the additional control member comprising the accelerator of the engine.

3. In a control, a transmission having means to establish two speed ratios, an engine having an accelerator, a personally-operable member movable into each of two positions and operatively connected to said transmission through a mechanical device whereby one of said positions is effected by rotational movement of said member and the other by axial displacement thereof without disrupting said rotational connection, means operated by positioning of the personally-operable member in one position to establish the first of the speed ratios, means operated upon positioning of the personally-operable member into the other position to operate the establishing means to render either the first or the second speed ratio effective, said last-named means including an additional control member connected with the accelerator and with it being movable to determine whether the means will establish the first or the second speed ratio, there being control means operable by a release of the accelerator to operate the establishing means to cause the second speed ratio to be effective, and control means operable by a depression of the accelerator to operate the establishing means to cause the first speed ratio to be effective.

4. In a control for a transmission having mechanism providing two speed ratios in the same direction, a first personally-operable member movable into each of two positions and operatively connected to said transmission through a mechanical device whereby one of said positions is effected by rotational movement of said member, and the other by axial displacement thereof without disrupting said rotational connection, means operated when the personally-operable member is disposed in its first position, and responsive directly to the disposition of said manual member in that position, to operate the transmission to establish the first of said two speed ratios, pre-conditioning mechanism actuated when the first personally-operable member is disposed in second position, a second personally-operable member movable in a predetermined manner, additional control mechanism operated by said second personally-operated member in its predetermined movement, and means to operate the transmission to establish the second speed ratio only when the pre-conditioning mechanism has been actuated as aforesaid and the additional control mechanism has been operated as aforesaid.

5. In a control for a transmission having mechanism providing two speed ratios in the same direction, power-operated mechanism for changing from either speed ratio to the other, control mechanism for said power-operated mechanism including a plurality of control means arranged in series so that all must be operated to operate the power mechanism, one of said control means including a first member operatively connected with said transmission and operable to a first position corresponding to first speed ratio, and displaceable to a second position corresponding to the second speed ratio without disrupting the aforementioned operative connection, mechanism to establish the first speed ratio responsive to disposition of the first member in its first position; another of said control means including a second member operated in predetermined manner from a first position to a second position corresponding to the second speed ratio, and a third control means including mechanism operated when the speed of a transmission shaft exceeds a predetermined value, and connections between the first control in second position, the second control in second position, and the third control mechanism in operated position, and the power operated means to establish second speed ratio upon operation of the three control means as aforesaid.

6. In a control for a transmission having mechanism providing two unidirectional speed ratios, means including a first personally-operable member operated from an initial to a first position to establish the first speed ratio, power means energizable to change from either speed ratio to the other, control mechanism for controlling operation of the power means, including first control means having selector means operated to position corresponding to first speed ratio by disposition of the first personally-operable member to its first position and operated to a second pre-conditioning position upon disposition of the first personally-operable member to its second position, a second personally-operable member, second control means operated by movement of the second personally-operable member to a predetermined operating position, the control mechanism being adapted to cause the power operated means to establish second speed ratio only when the selector means and second control means are operated as aforesaid, and third control means operable, with the selector means in position corresponding to first speed ratio, to cause the power means to establish first speed ratio.

7. In a control for a transmission having mechanism providing two forward speed ratios between an input shaft and an output shaft; a manual member operatively connected with said transmission and movable rotationally to a first position and axially to a second position without disrupting said connection; power means to change the transmission from either ratio to the other; control mechanism for the power means, including means operated by movement of the manual member to first position to establish first speed ratio; speed-responsive control means responsive to speed of a transmission shaft; means operated by movement of the manual member to second position to pre-condition the control mechanism for second speed ratio, the speed-responsive control means being adapted to further pre-condition the control mechanism for second speed ratio when the shaft speed exceeds a predetermined value, said two pre-conditioning means being incapable of finally causing the control mechanism to establish second speed ratio; and additional control means to cooperate with the pre-conditioning means to cause the control mechanism to operate the power means for second speed ratio.

8. In a shifter control for use with transmissions having manual means to provide a primary speed ratio and wherein said manual means is operatively connected with said transmission for movement to two positions without disrupting said connection, means to provide an additional speed ratio in the same direction, mechanism to operate the primary speed ratio means to effect that ratio upon movement of said manual means into one of its two positions, and power operated means to operate the additional speed ratio means, means movable to release the torque through said transmission including a second personally-operable element, control means operable to energize the power means for operation of the additional speed ratio means, including conditioning means movable by moving said manual means into its other position to a position prerequisite to energization of the power means, and means operated by the second personally operable element, to effect said energization of said power means as the second personally-operable element is moved to release the torque when the conditioning means is in said position, whereby the power means will be energized when the torque is released.

9. In a shifter control, an engine and an accelerator therefor, a transmission having manual means to provide a primary speed ratio and wherein said manual means is operatively connected with said transmission for movement to two positions without disrupting said connection, means to provide an additional speed ratio in the same direction, mechanism to operate the primary speed ratio means to effect that ratio upon movement of said manual means into one of its two positions, and power operated means to operate the transmission to the additional speed ratio, means movable to release the torque through said transmission including a second personally-operable element, control means operable to energize the power means for operation of the transmission to said additional speed ratio, including conditioning means movable by moving said manual means into its other position to actuating position, and means operated by the second personally-operable element to effect said energization of said power means as the second personally-operable element is moved to release the torque when the conditioning means is in actuated position, whereby the power means will be energized when the torque is released, said personally-operable element comprising the accelerator, said control means being connected thereto for operation as aforesaid, to energize the power operated means when the accelerator is moved toward released position.

10. In a shifter control, an engine and an accelerator therefor, a transmission having mechanism providing a primary speed ratio means to provide an additional speed ratio in the same vehicular drive direction, mechanism to operate the primary speed ratio means to effect that ratio, manually-operated means operatively connected to the primary speed ratio mechanism to effect said primary speed ratio, when operated to a predetermined position, said operative connection adapted to accommodate a different operated movement of said manually-operated means without disrupting said operative connection, to cause said additional speed ratio to be effective, and power-operated means to operate the transmission to the additional speed ratio, means movable to release the torque through said transmission including a pedally-operable element, control means operable to energize the power means for operation of the transmission to said additional speed ratio, including conditioning means movable to actuating position and means operated by said pedally-operable element to effect said energization of said power means as the pedally-operable element is moved to release the torque when the conditioning means is in actuated position, whereby the power means will be energized when the torque is released, said personally-operable element comprising the accelerator, said control means being connected thereto for operation as aforesaid, to energize the power-operated means when the accelerator is moved toward released position, said connections between the accelerator and power-operated means being adapted to energize the power-operated means prior to fully released position of the accelerator.

11. In a control for a transmission having means providing two speed ratios, means to change the transmission from one ratio to the other, including presettable means controlling the changing means, and means to actuate the presettable means to cause change in speed of said transmission, said actuating means being operatively connected with said transmission to accommodate two-directional movement thereof without disrupting said connection, means movable to reduce the torque through the transmission, control mechanism operated by the movable means also controlling the changing means, and means operable upon reduction of the torque by movement of said movable means, accompanied by actuation of the presettable means in one direction of movement and operation of the control mechanism, to cause the changing means to complete the change, and means to change the transmission back to its other ratio without changing the aforesaid actuation of the presettable means.

12. In a control for transmissions having a first and a second speed ratio means, a first member movable to operate the means to establish first speed ratio, said member being operatively connected with said transmission to provide first and second positions therefor without disrupting said connection, power means operable between first and second positions, to operate the means to establish the second speed ratio when in second position and to return the first speed ratio means into operation when in first position, and control mechanism, the control mechanism including a conditioning member movable from an initial to a second speed ratio conditioning position in response to movement of the first member from first position wherein first speed ratio is established to second position without disestablishing the first speed ratio, a torque relieving member operable to relieve torque through the transmission, by movement to a torque relieving position, and a control means operable upon such movement of the torque relieving member, the control mechanism being rendered operable to energize the power means to operate the means to establish the second speed ratio only after the conditioning member is in its second position and the torque relieving member is in torque relieving position.

13. In a control for transmissions having a first and a second speed ratio means, a first member movable to operate the means to establish first speed ratio, said member being operatively connected with said transmission to provide first and second positions therefor without disrupting said connection, power means operable between first and second positions, to operate the means to establish the second speed ratio when in second position and to return the first speed ratio means into operation when in first position, and control mechanism, the control mechanism including a conditioning member movable from an initial to a second speed ratio conditioning position in response to movement of the first member from first position wherein first speed ratio is established to second position without disestablishing the first speed ratio, a torque relieving member operable to relieve torque through the transmission, by movement to a torque relieving position, and a control means operable upon such movement of the torque relieving member, the control mechanism being rendered operable to energize the power means to operate the means to establish the second speed ratio only after the conditioning member is in its second position and the torque relieving member is in torque relieving position, and the control mechanism being rendered operable to energize the power means to effect return first speed ratio, when subsequently the conditioning member is returned to its initial position, and the torque relieving member is moved to torque relieving position.

14. In a control for transmissions having a first and a second speed ratio means, a first member movable to operate the means to establish first speed ratio, said member being operatively connected with said transmission to provide first and second positions therefor without disrupting said connection, power means operable between first and second positions, to operate the means to establish the second speed ratio when in second position and to return the first speed ratio means into operation when in first position, and control mechanism, the control mechanism including a conditioning member movable from an initial to a second speed ratio conditioning position in response to movement of the first member from first position wherein first speed ratio is established to second position without disestablishing the first speed ratio, a torque relieving member operable to relieve torque through the transmission, by movement to a torque relieving position, and a control means operable upon such movement of the torque relieving member, the control mechanism being rendered operable to energize the power means to operate the means to establish the second speed ratio only after the conditioning member is in its second position and the torque relieving member is in torque relieving position, and the control mechanism being rendered operable to energize the power means to effect return to first speed ratio, when subsequently the conditioning member is returned to its initial position, and the torque relieving member is moved to torque relieving position, there being an engine connected with the transmission, with an accelerator and the torque relieving member comprising the throttle.

15. In a control for transmissions having a first and a second speed ratio means, a first member movable to operate the means to establish first speed ratio, said member being operatively connected with said transmission to provide first and second positions therefor without disrupting said connection, power means operable between first and second positions, to operate the means to establish the second speed ratio when in second position and to return the first speed ratio means into operation when in first position, and control mechanism, the control mechanism including a conditioning member movable from an initial to a second speed ratio conditioning position in response to movement of the first member from first position wherein first speed ratio is established to second position without disestablishing the first speed ratio, a torque relieving member operable to relieve torque through the transmission, by movement to a torque relieving position, and a control means operable upon such movement of the torque relieving member, the control mechanism being rendered operable to energize the power means to operate the means to establish the second speed ratio only after the conditioning member is in its second position and the torque relieving member is in torque relieving position, and the control mechanism being rendered operable to energize the power means to effect return to first speed ratio, when subsequently the conditioning member is returned to its initial position, and the torque relieving member is moved to torque relieving position, there being an engine, and a clutch connecting the engine and the transmission, the torque relieving member comprising a portion of the clutch associated with the engine.

16. In a control for transmissions having a first and a second speed ratio means, a first member movable to operate the means through a torque-transmitting mechanical connection to establish first speed ratio, said mechanical connection being adapted to accommodate movement of said first member in a different direction to a supplemental position without disrupting the torque-transmitting relation of said connection power means operable between first and second positions, to operate the means to establish the second speed ratio when in second position and to return the first speed ratio means into operation when in first position, and control mechanism, the control mechanism including a conditioning member movable from an initial to a second speed ratio conditioning position only after the first member has been moved to first speed ratio position and thence to its aforesaid supplemental position, a torque relieving member operable to relieve torque through the transmission, by movement to a torque relieving position, and a control means operable upon such movement of the torque relieving member, the control mechanism being rendered operable to energize the power means to operate the means to establish the second speed ratio only after the conditioning member is in its second position and the torque relieving member is in torque relieving position, and the control mechanism being rendered operable to energize the power means to effect return to first speed ratio, when subsequently the conditioning member is returned to its initial position, and the torque relieving member is moved to torque relieving position, there being an engine connected with the transmission, and a throttle for the engine, the torque relieving member comprising the throttle, and the throttle being movable beyond the torque relieving position to an idling position, whereby the power means may be energized before the throttle reaches the limit of its movement.

17. In a control for transmissions having means to provide a first and a second speed ratio, control mechanism including a member movable from a first to a second position, first control means to be operated thereby, and means to reduce torque transmitted through the transmission including a member movable from a first to a second and torque reducing position, additional control means to be operated thereby, and power means to cause the transmission to change from first to second speed ratio, said power means being interconnected with said control mechanism to be operated when both of said control means are operated coincidently, the connections of said torque reducing member and said additional means including means to operate the additional control means during movement of said member toward second position, and subsequently prior to second position, to aid coincident operation aforesaid.

18. In a control for transmissions having means to provide a first and a second speed ratio, control mechanism including a member movable from a first to a second position, first control means to be operated thereby, and means to reduce torque transmitted through the transmission including a member movable from a first to a second and torque reducing position, additional control means to be operated thereby, and power means to cause the transmission to change from first to second speed ratio, said power means being interconnected with said control mechanism to be operated when both of said control means are operated coincidently, the connections of said torque reducing member and said additional control means including means to operate the additional control means during movement of said member toward second position, and subsequently prior to second position, to aid coincident operation aforesaid, the power means comprising a fluid pressure operated power device, and the control mechanism including valve means for regulating admission and withdrawal of fluid pressure to the power device.

19. In a control, a changeable-speed drive transmission having mechanism providing two forward speed drives, an engine having an accelerated pedal; power-operated means to change the transmission from one speed drive to the other, control mechanism for the power-operated means including a source of power therefor; selector means manually operable to first and second positions said selector means being operatively connected with said transmission whereby the aforementioned positions thereof are effected without disrupting said connection; means operatively connected with the selector means to manually establish one speed drive coordinately with disposition of the selector means in its first position; additional control means operable from first to second positions; connections to the additional control means for its operation by movement of the accelerator pedal, said control mechanism being adapted to energize the power-operated means for change to second speed drive from the first only when the selector means and additional control means are in their second positions.

20. In a control, a changeable-speed drive transmission having mechanism providing two forward speed drives, an engine having an accelerator pedal; power-operated means to change the transmission from one speed drive to the other, control mechanism for the power-operated means including a source of power therefor; selector means manually operable to first and second positions said selector means being operatively connected with said transmission whereby the aforementioned positions thereof are effected without disrupting said connection; means connected with the selector means to manually establish one speed drive coordinately with disposition of the selector means in its first position; additional control means operable from first to second positions; connections to the additional control means for its operation by movement of the accelerator pedal, said control mechanism being adapted to energize the power-operated means for change to second speed drive from the first only when the selector means and additional control means are in their second positions, means responsive to the speed of a transmission shaft, including a control device operated when the speed is beyond a predetermined value, said speed responsive control device being interposed in the control mechanism to prevent operation of the power means to obtain change of speed ratio, when such speed responsive control device is not operated.

21. In a control, a transmission having means to provide two speed ratios and manually-operated means operatively connected with the speed ratio means and movable to establish a first speed ratio, said connection being adapted to accommodate additional movement of said manually-operated means without disrupting the operative relation thereof; selector means movable to first and second positions, connections between the selector means and the manually-operated means for disposing the selector means in its first position when the manually-operated means moves to establish the first speed ratio, means to move the selector means to second position from first position in response to the aforementioned additional movement of said manually-operated means, mechanism including a member normally movable to and from a predetermined position as an incident to manual establishment of first ratio, power means to change the speed ratio means of the transmission in either direction to establish first or second speed ratio from the other, means to energize the power means in a manner to establish first speed ratio when it is not established, whenever the selector means is in first position and the movable member is in its predetermined position, mechanism to energize the power means to establish second speed ratio from a first speed ratio including the selector means in second position, and including an additional movable control member that is movable from a first to a second position, in second position.

22. In a control, a transmission having means to provide two speed ratios and manually-operated means operatively connected with the speed ratio means and movable to establish a first speed ratio, said connection being adapted to accommodate additional movement of said manually-operated means without disrupting the operative relation thereof; selector means movable to first and second positions, connections between the selector means and the manually-operated means for disposing the selector means in its first position when the manually-operated means moves to establish the first speed ratio, means to move the selector means to second position from first position in response to the aforementioned additional movement of said manually-operated means, mechanism including a member normally movable to and from a predetermined position as an incident to manual establishment of first ratio, power means to change the speed ratio means of the transmission in either direction to establish first or second speed ratio from the other, means to energize the power means in a manner to establish first speed ratio when it is not established, whenever the selector means is in first position and the movable member is in its predetermined position, mechanism to energize the power means to establish second speed ratio from first speed ratio including the selector means in second position, and including an additional movable control member that is movable from a first to a second position, in second position, there being an engine connected with the transmission, it having an accelerator pedal, said additional movable control member having connections for movement by the accelerator pedal.

23. In a control, an engine driven transmission having mechanism providing two forward speed ratios, a manually movable member operatively connected with said transmission mechanism for establishing and disestablishing one of them, said connection providing an additional movement of said manual member while one of said speed ratios is established to accommodate establishment of the other speed ratio without disrupting said operative relation thereof, and an accelerator pedal for controlling the engine: power means for changing the transmission from either speed ratio to the other, control mechanism including a selector means movable from a first position to a second, connections for operation of the selector means to its two positions in response to the aforementioned movements of the manually movable member, additional control means movable to operating position, connections for the control means for movement thereof upon predetermined movement of the accelerator pedal, mechanism to energize the power means to change from first to second speed ratio, including the selector means in second position and the additional control means in operating position, and means to insure establishment of the first speed ratio and insure against establishment of second speed ratio as an incident to normal establishing of first speed ratio from disestablished condition.

24. In a control for an engine driven transmission having means to provide two speed ratios and manually movable means movable from an initial position to a first position to establish first speed ratio, and movable from the first position to a position supplemental to the first position, without return to the inital position, and the engine having an accelerator pedal: power means movable for shifting from either speed ratio to the other, selector means movable from a first to a second position, connections to the selector means for interconnection with the manually movable means to cause the selector means to be in its first position when the manually movable means is in its first position, and to cause the selector means to be in its second position when the manually movable means is in its supplemental position, means including the selector means in first position to energize the power means to establish first speed ratio, additional control means movable to an operating position, connections from the additional control for connection with the accelerator pedal for movement of the control means to its operating position upon movement of the accelerator pedal to a predetermined position, and control mechanism including the selector means in second position and the additional control means in operating position, to energize the power means to establish second speed ratio.

25. In a control for an engine driven transmission having means to provide two speed ratios and manually movable means movable from an initial position to a first position to establish first speed ratio, and movable from the first position to a position supplemental to the first position, without return to the initial position, and the engine having an accelerator pedal: power means movable for shifting from either speed ratio to the other, selector means movable from a first to a second position, connections to the selector means for interconnection with the manually movable means to cause the selector means to be in its first position when the manually movable means is in its first position, and to cause the selector means to be in its second position when the manually movable means is in its supplemental position, means including the selector means in first position to energize the power means to establish first speed ratio, additional control means movable to an operating position, connections from the additional control for connection with the accelerator pedal for movement of the control means to its operating position upon movement of the accelerator pedal to a predetermined position, and control mechanism including the selector means in second position and the additional control means in operating position, to energize the power means to establish second speed ratio, the manually operable member including means to displace it from first to supplemental position upon manual release of it in its first position.

26. In a control for a transmission having means providing first and second forward speed drives; means to establish first speed drive including a member manually movable to a first position, power means to change from first speed drive to second speed drive, and control mechanism for energizing the same, means operated upon manual release of the manually operable member in said first position, to pre-condition the control mechanism for energizing the power means, and additional control means in the control mechanism to complete the energization of the power mechanism, said additional control means including a separate personally-operable means, movable to operating position at the will of the operator.

27. In a control for a transmission having means providing first and second forward speed drives, an engine having an accelerator pedal, means to establish first speed drive including a member manually movable to a first position, power means to change from first speed drive to second speed drive, and control mechanism for energizing the same, means operated upon manual release of the manually operable member in said first position, to pre-condition the control mechanism for energizing the power means, and additional control means in the control mechanism to complete the energization of the power mechanism, said additional control means including an operating means for the additional control means interconnected with the accelerator pedal, for operation of the control means by predetermined movement of the accelerator pedal.

28. In a control for a transmission having means to provide first and second forward speed drives, means to operate the transmission to establish first speed drive including a member manually movable to a first position, power means to change from first speed drive to second speed drive, and control mechanism for energizing the same, means operated upon manual release of the manually operable member in said first position, to pre-condition the control mechanism for energizing the power means, and additional control means in the control mechanism to complete the energization of the power mechanism, said additional control means including a separate operating device, and other control mechanism for energizing the power means for return to first speed drive, including the selector means in first position, and further control means to complete energization of the power means for return to first speed drive, said further control means being movable from inoperative to operating position, and preventing return to first speed drive by mere return of the manually movable member from supplemental to first position.

29. In a control for a transmission having means to provide first and second forward speed drives, means to establish first speed drive including a member manually movable to a first position, power means to change from first speed drive to second speed drive, and control mechanism for energizing the same, means operated upon manual release of the manually operable member in said first position, to pre-condition the control mechanism for energizing the power means, and additional control means in the control mechanism to complete the energization of the power mechanism, said additional control means including a separate operating device, and other control mechanism for energizing the power means for return to first speed drive, including the selector means in first position, and further control means to complete energization of the power means for return to first speed drive, said further control means being movable from inoperative to operating position, and preventing return to first speed drive by mere return of the manually movable member from supplemental to first position, and means subject to manual operation, for movement of the further control means to operating position.

30. In a control for a transmission having means to provide first and second forward speed drives, associated with a clutch, means to operate the transmission to establish first speed drive including a member manually movable to a first position, power means to change from first speed drive to second speed drive, and control mechanism for energizing the same, means operated upon manual release of the manually operable member in said first position, to pre-condition the control mechanism for energizing the power means, and additional control means in the control mechanism to complete the energization of the power mechanism, said additional control means including a separate operating device, and other control mechanism for energizing the power means for return to first speed drive, including the selector means in first position, and further control means to complete energization of the power means for return to first speed drive, said further control means being movable from inoperative to operating position, and preventing return to first speed drive by mere return of the manually movable member from supplemental to first position, said further control means being interconnected with the clutch operating means for movement to operating position upon release of the clutch.

31. In combination, an engine having an accelerator pedal, a transmission having a preliminary condition and two forward speed ratios, manual means operatively connected with said transmission for movement to an initial position to establish said preliminary condition, for movement to a first position to establish the first speed ratio, and for movement to a supplemental position without disrupting said connection, power means to change the transmission from first to second speed ratio, speed-responsive control means responsive to the speed of a shaft connectable with the transmission to move to operating position when said speed reaches a critical value, selector means operated from a first to a second position by movement of the manual means to supplemental position, additional control means, mechanism to energize the power means to change to second speed ratio including the speed-responsive control means in operating position, the selector means in second position, and the additional control means.

32. In combination, an engine having an accelerator pedal, a transmission having a preliminary condition and two forward speed ratios, manual means operatively connected with said transmission for movement to an initial position to establish said preliminary condition, for movement to a first position to establish the first speed ratio, and for movement to a supplemental position without disrupting said connection, power means to change the transmission from first to second speed ratio, speed-responsive control means responsive to the speed of a shaft connectable with the transmission to move to operating position when said speed reaches a critical value, selector means operated from a first to a second position by movement of the manual means to supplemental position, additional control means, mechanism to energize the power means to change to second speed ratio including the speed-responsive control means in operating position, the selector means in second position, and the additional control means, said additional control means being connected with the accelerator pedal for operation by pedal operation thereof.

33. In combination, an engine having an accelerator pedal movable into different positions from a predetermined position; a transmission having mechanism to provide a preliminary condition with respect to the delivery of torque through the transmission and two speed drives, manual means operatively connected with said transmission for movement to an initial position to establish said preliminary condition, for movement to a first position to establish the first speed drive, and for movement to a supplemental position without disrupting said connection; power means to change the transmission from first to second speed ratio, speed-responsive control means responsive to the speed of a shaft connectable with the transmission to move to operating position when said speed reaches a critical value, selector means operated from a first to a second position by movement of the manual means to supplemental position, pedally-operable control means; mechanism to energize the power means to change to second speed drive including the speed-responsive control means in operating position, the selector means in second position, and the pedally-operable control means, said pedally-operable control means being interconnected with the accelerator pedal for operation thereby, into its predetermined position; and means to energize the power means for return to first speed drive, including means operable by the accelerator pedal when moved into a different position.

34. In combination, an engine having an accelerator pedal movable into different depressed positions from a fully released position; a transmission having mechanism to provide a preliminary condition with respect to the delivery of torque through the transmission and two speed drives, manual means movable to an initial position to establish said preliminary condition, movable to a first position to establish said the first speed drive, and movable to a supplemental position, power means to change the transmission from first to second speed drive, speed-responsive control means responsive to the speed of a shaft connectable with the transmission to move to operating position when said speed reaches a critical value; selector means operated from a first to a second position by movement of the manual means to supplemental position; additional control means; mechanism to energize the power means to change the second speed drive including the speed-responsive control means in operating position, the selector means in second position, and the additional control means, said additional control means comprising control means, connections between the control means and the accelerator pedal, said connections rendering the control means inoperative at a partially depressed position of the accelerator pedal and operative at a less depressed position of the accelerator pedal which latter position is substantially closer released position of the said pedal.

35. In a transmission having mechanism to provide two speed ratios, associated with an engine having an accelerator pedal, power means to change the transmission from one ratio to another, control mechanism for the power means, and including means pre-settable to condition the control mechanism to operate the power means, control means, operating means connected with the accelerator pedal for operating the control means upon movement of the accelerator pedal to reduce torque transmitted through the transmission, the operating means being adapted to operate the control means at a partially depressed position of the accelerator pedal prior to movement thereof to extreme position so that, when the pre-settable means is set, the control mechanism may be arranged to operate the power means when the torque is reduced by the pedal.

36. In a transmission for transmitting torque, an engine and a driven shaft, the transmission having means providing two speed ratios with a member displaceable to change ratio, which member is constrained into ratio holding position by torque transmitted through the transmission and relieved for displacement upon predetermined reduction of torque, the engine having an accelerator pedal, power means for shifting the displaceable member, control mechanism for the power means, said control mechanism including control means operatively connected with the accelerator pedal, to be operated by torque releasing movement of the accelerator pedal, said pedal being adapted to operate the control means prior to full movement of the accelerator pedal to an extreme position, whereby the control mechanism may initiate energization of the power means prior to such full movement of the pedal.

37. In a transmission for transmitting torque, an engine and a driven shaft, the transmission having means providing two speed ratios with a member displaceable to change ratio, which member is constrained into ratio holding position by torque transmitted through the transmission and relieved for displacement upon predetermined reduction of torque, the engine having an accelerator pedal, power means for shifting the displaceable member, control mechanism for the power means, said control mechanism including control means operatively connected with the accelerator pedal, to be operated by torque releasing movement of the accelerator pedal, said pedal being adapted to operate the control means prior to full movement of the accelerator pedal to either of its extreme positions, whereby control mechanism may initiate energization of the power means prior to said movements of the pedal.

38. In a transmission for transmitting torque, an engine and a driven shaft, the transmission having means providing two speed ratios with a member displaceable to change ratio, which member is constrained into ratio holding position by torque transmitted through the transmission and relieved for displacement upon predetermined reduction of torque, the engine having an accelerator pedal, power means for shifting the displaceable member, control mechanism for the power means, said control mechanism including control means operatively connected with the accelerator pedal, to be operated by torque releasing movement of the accelerator pedal, said pedal being adapted to operate the control means prior to full movement of the accelerator pedal to an extreme position, whereby the control mechanism may initiate energization of the power means prior to such full movement of the pedal, said power means comprising vacuum operated apparatus empowered from the engine manifold.

39. In a transmission for transmitting torque, an engine and a driven shaft, the transmission having means providing two speed ratios with a member displaceable to change ratio, which member is constrained into ratio holding position by torque transmitted through the transmission and relieved for displacement upon predetermined reduction of torque, the engine having an accelerator pedal, power means for shifting the displaceable member, control mechanism for the power means, said control mechanism including control means operatively connected with the accelerator pedal, to be operated by torque releasing movement of the accelerator pedal, said pedal being adapted to operate the control means prior to full movement of the accelerator pedal to an extreme position, whereby the control mechanism may initiate energization of the power means prior to such full movement of the pedal, said power means comprising vacuum operated apparatus empowered from the engine manifold, the apparatus including a movable wall energized by the control mechanism as aforesaid, and adapted to move the displaceable member when the vacuum power overcomes the torque generated resistance of the member.

40. In a transmission for transmitting torque, an engine and a driven shaft, the transmission having means providing two speed ratios with a member displaceable to change ratio, which member is constrained into ratio holding position by torque transmitted through the transmission and relieved for displacement upon predetermined reduction of torque, the engine having an accelerator pedal, power means for shifting the displaceable member, control mechanism for the power means, said control mechanism including control means operatively connected with the accelerator pedal, to be operated by torque releasing movement of the accelerator pedal, said pedal being adapted to operate the control means prior to full movement of the accelerator pedal to an extreme position, whereby the control mechanism may initiate energization of the power means prior to such full movement of the pedal, said power means comprising vacuum operated apparatus empowered from the engine manifold, the apparatus including a movable wall energized by the control mechanism as aforesaid, and adapted to move the displaceable member when the vacuum power overcomes the torque generated resistance of the member, and a yieldable connection between the movable wall and the displaceable member.

41. In a transmission for transmitting torque, an engine and a driven shaft, the transmission having means providing two speed ratios with a member displaceable to change ratio, which member is constrained into ratio holding position by torque transmitted through the transmission and relieved for displacement upon predetermined reduction of torque, the engine having an accelerator pedal and a throttle valve operated thereby, power means for shifting the displaceable member, control mechanism for the power means, said control mechanism including control means operatively connected with the accelerator pedal, to be operated by torque releasing movement of the accelerator pedal, said pedal being adapted to operate the control means prior to full movement of the accelerator pedal to an extreme position, whereby the control mechanism may initiate energization of the power means prior to such full movement of the pedal, said power means comprising vacuum operated apparatus empowered from the engine manifold, and means to store vacuum for operation of the apparatus, said means being operated by closing of the throttle valve connected with the accelerator pedal.

42. In a transmission for transmitting torque, an engine and a driven shaft, the transmission having means providing two speed ratios with a member displaceable to change ratio, which member is constrained into ratio holding position by torque transmitted through the transmission and relieved for displacement upon predetermined reduction of torque, the engine having an accelerator pedal, power means for shifting the displaceable member, control mechanism for the power means, said control mechanism including control means operatively connected with the accelerator pedal, to be operated by torque releasing movement of the accelerator pedal, said pedal being adapted to operate the control means prior to full movement of the accelerator pedal to an extreme position, whereby the control mechanism may initiate energization of the power means prior to such full movement of the pedal, said power means comprising vacuum operated apparatus empowered from the engine manifold, and vacuum storage means connected with the piston and the engine manifold, said storage means including a tank, and valve means operated to effect evacuation of the tank by predetermined pressure difference between the tank and the manifold, said valve means being closed when the said predetermined differential does not exist, to prevent reduction of tank vacuum when manifold pressure rises.

43. A control for an overdrive superposed on a transmission having at least two forward speed drives, which overdrive has means shiftable to establish and interrupt overdrive ratio, the control including selector means movable to render active the transmission speed drive and overdrive, means movable manually to a position to establish a transmission drive ratio, means to urge the selector means to overdrive position upon manual release of the manually movable means when it has been moved to said position, pedally-operated operable means to cause interruption of torque through the overdrive, and mechanism including said selector means in overdrive position, to effect shift of the shiftable means to overdrive ratio when torque through the overdrive is interrupted.

44. A control for an overdrive superposed on a transmission having at least two speed drives, which overdrive has means shiftable to establish and interrupt overdrive ratio, the control including selector means movable to render active the transmission speed drive and overdrive, means movable manually to a position to establish the transmission drive ratio, means to urge the selector means to overdrive position upon manual release of the manually movable means when it has been moved to said position, and mechanism including said selector means in overdrive position, and speed governor means in an operated position, to effect shift of the shiftable means to overdrive ratio, when the governor indicates a predetermined speed.

45. A control for an overdrive superposed on a transmission having at least two speed drives, which overdrive has means shiftable to establish and interrupt overdrive ratio, the control including selector means movable to render active a transmission speed drive and overdrive, means movable manually to a position to establish a transmission drive ratio, means to urge the selector means to overdrive position upon manual release of the manually movable means when it has been moved to said position, an engine, an accelerator pedal for the engine and control means rendered operative upon movement of the pedal to a torque reducing position, and mechanism including the said control means and the selector means in overdrive position, to effect shift of the shiftable means.

46. A control for an overdrive superposed on a transmission having at least two forward speed drives, which overdrive has means shiftable to establish and interrupt overdrive ratio, the control including selector means movable to render active a transmission speed drive and overdrive, means movable manually to a position to establish a transmission drive speed, means to urge the selector means to overdrive position upon manual release of the manually movable means when it has been moved to said position, pedally-operable means to cause interruption of torque through the overdrive, and mechanism including said selector means in overdrive position, to effect shift of the shiftable means to overdrive ratio when torque through the overdrive is interrupted, and selectively operable means including the selector means in said active transmission drive position, to effect shift of the shiftable means to said last-named drive.

47. In a control for a transmission having means providing two speed ratios, a governor moved to operating position when a transmission shaft is above a predetermined speed range, and returned from said operating position when said shaft descends below said speed range, means to change the transmission from first speed ratio to second including the governor in operating position and an additional control device in a predetermined operating position, said means being adapted to hold said second ratio despite return of the governor from operating position and disposition of the additional control in operating position, and selectively operable means to change the transmission back to first speed ratio.

48. In a control, a transmission having means providing a manually established speed ratio and a second speed ratio in the same direction established without disengagement of the first speed ratio, an engine having an accelerator pedal, manually-operable means operatively connected with said transmission to establish first speed ratio upon rotational movement of said means from an initial position to a first position, mechanism to change to second speed ratio, the mechanism including preselecting means operated by axial movement of the manually-operable means to a position supplemental to said first position without disrupting the aforementioned rotational connection, and a control means for said mechanism operated by release of the accelerator pedal.

49. In a control, a transmission having means providing two forward speed drives, and an engine having an accelerator pedal, power means, first control means for said power means to energize the same for causing change in the transmission drive from first to second speed drive, second control means for said power means for energizing the same to cause change of the transmission drive back from second to first speed drive, manually movable means movable to two positions to preselect which control means will energize said power means, a third control means operated by release of the accelerator pedal, and means to complete energization of the power means after preselection by the manually movable means, including said manually movable means in one position and the accelerator pedal operated control means in released engine idling position, and additional means to insure establishment of first speed drive when the output shaft of the transmission begins to move.

50. In a control, a transmission having means to provide two speed ratios, an engine connected with the transmission, an accelerator pedal for the engine, governor means positioned in one position when the output speed of the transmission is below a predetermined speed, and in a second position when the said speed is above a predetermined speed, manually operable means movable to a position to preselect second speed, control means connected with the accelerator pedal to be operated by movement thereof to predetermined position, mechanism to change from first speed ratio to second upon movement of the governor means to second position and movement of the accelerator pedal to operate its control means, and mechanism to change from second speed ratio to first upon movement of the governor means to first position and movement of the accelerator pedal to operate its control means, the manually operable means being also movable to a position to preselect first speed, and means to change to first speed regardless of the position of the governor means, including the manually operable means in first speed position and the accelerator pedal in position to operate its control means.

51. In a control, a transmission having means providing two speed ratios, preselecting means, manually movable means movable to establish the first speed ratio, and in the same manual operation to operate the preselecting means to preselect second speed ratio, mechanism including the preselecting means so operated, and separately operable means, to complete the change to second speed only after said separately operable means also has been operated.

52. In a control, a transmission having an input shaft, an output shaft, and means providing two speed ratios between the shafts, preselecting means, manually movable means movable to establish the first speed ratio, and in the same manual operation to operate the preselecting means to preselect second speed ratio, mechanism including the preselecting means so operated, and separately operable means, to complete the change to second speed only after said separately operable means has been operated, said separately operable means having a speed responsive means operated only when the speed of a transmission shaft exceeds a predetermined value.

53. In a control, a transmission, an engine, the transmission having means providing two speed ratios, preselecting means, manually movable means to establish the first speed ratio, and in the same manual operation to operate the preselecting means to preselect second speed ratio, mechanism including the preselecting means so operated, and separately operable means to complete the change to second speed only after said separately operable means has been operated, an accelerator pedal for the engine, said separately operable means having control means operated by movement of the accelerator pedal to a predetermined position.

54. In a control, a transmission, an engine, the transmission having an input shaft, an output shaft, and means providing two speed ratios between the shafts, preselecting means, manually movable means to establish the first speed ratio, and in the same manual operation to operate the preselecting means to preselect second speed ratio, mechanism including separately operable means to complete the change to second speed only after separately operable means has been operated, an accelerator pedal for the engine, said separately operable means having control means operated by movement of the accelerator pedal to a predetermined position, and a speed responsive means operated when the speed of a transmission shaft exceeds a predetermined value.

55. In a control, a transmission, an engine, the transmission having an input shaft, an output shaft, and means providing two speed ratios between them, preselecting means, manually movable means to establish the first speed ratio, and in the same manual operation to operate the preselecting means to preselect second speed ratio, mechanism including the preselecting means so operated, and separately operable means to complete the change to second speed only after said separately operable means has been operated, an accelerator pedal, a speed responsive device operable to a first position when the speed of a transmission shaft is below a predetermined value and to a second position when the speed is above a predetermined value, and control means operated by the accelerator pedal, whereby said separately operable means including the speed responsive device in second position and accelerator pedal control means in operated position, and means to return the transmission to first speed ratio including the speed responsive device in first position and accelerator pedal control means in operated position.

56. In a control, a transmission, an engine, the transmission having an input shaft, an output shaft, and means providing two speed ratios between said shafts, preselecting means, manually movable means to establish the first speed ratio, and in the same manual operation to operate the preselecting means to preselect second speed ratio, mechanism including the preselecting means so operated, and separately operable means to complete the change to second speed only after said separately operable means has been operated, an accelerator pedal, a speed responsive device operable to a first position when the speed of a transmission shaft is below a predetermined value and to a second position when the speed is above a predetermined value, and control means operated by the accelerator pedal, whereby said separately operable means including the speed responsive device in second position and accelerator pedal control means in operated position, and means to return the transmission to first speed ratio including the speed responsive device in first position and accelerator pedal control means in operated position, and additional means to return the transmission to first speed ratio when the speed responsive means is in second position and the accelerator pedal control means is in operated position.

57. In a control, a transmission, an engine, the transmission having an input shaft, an output shaft, and means providing two speed ratios between said shafts, preselecting means, manually-movable means to establish the first speed ratio, and in the same manual operation to operate the preselecting means to preselect second speed ratio, mechanism including the preselecting means so operated, and separately operable means to complete the change to second speed only after said separately operable means has been operated, an accelerator pedal, a speed responsive device operable to a first position when the speed of a transmission shaft is below a predetermined value and to a second position when the speed is above a predetermined value, and control means operated by the accelerator pedal, whereby said separately operable means including the speed responsive device in second position and accelerator pedal control means in operated position, and means to return the transmission to first speed ratio including the speed responsive device in first position and accelerator pedal control means in operated position, and additional means to return the transmission to first speed ratio when the speed responsive means is in second position and the accelerator pedal control means is in operated position, the preselecting means having a first speed ratio position to which it is movable by the manually movable means, and the additional return means including the preselecting means in first speed ratio position.

58. In a shifter mechanism for a transmission having means providing a plurality of speed drives including an overdrive, and interconnected with an engine, manually operable means movable to an overdrive position, an accelerator pedal for the engine, control means operated by the accelerator pedal when it is in one end of its path of movement, a power means energizable to effect shift of the overdrive, and control means to energize the power means and thereby effect shift of the overdrive from one speed drive to another, including the manually operable means in overdrive position and the accelerator pedal at said one end of its path of movement, said manually operable means comprising a member movable to a first position and additional means operated by movement thereof to said first position, to establish one of said speed drives other than overdrive, and the manually operable means being movable from the first position to the overdrive position.

59. In a shifter mechanism, a transmission having means providing a plurality of speed drives including an overdrive, and an engine interconnected with the transmission, manually operable means movable to an overdrive position, an accelerator pedal for the engine, power means energizable to effect shift of the overdrive, and control means to energize the power means and thereby effect shift of the overdrive from one speed drive to another, including the manually operable means in overdrive position and the accelerator pedal at one end of its path of movement, said manually operable means comprising a member movable to a first position to establish a transmission speed drive other than overdrive, and movable from the first position to the overdrive position, and means moving the member from said first position to overdrive position, upon release of the manually operable means in first position.

60. In a shifter mechanism for a transmission having means providing a plurality of speed drives including an overdrive, and interconnected with an engine, manually-operable means operatively connected with said drive means to operate the same and movable to an overdrive position without disrupting said operative connection, an accelerator pedal for the engine, power means energizable to effect shift of the overdrive, and control means to energize the power means and thereby effect shift of the overdrive from one speed drive to another, including means operated by the manually-operable means in overdrive position and means operated by the accelerator pedal at one end of its path of movement, and means to energize the overdrive to shift back to a speed drive other than overdrive, when the accelerator pedal is at one end of its path of movement and the movable member is returned to first position.

61. In a control for a transmission, a hand lever having movement in an H pattern to establish a plurality of speed ratios, a shifter shaft upon which the handle is mounted, the shaft having axial movement corresponding to movement of the handle in neutral, across the bar of the H, and having rocking movement from each end of the axial movement, in opposite directions, yieldable means normally urging the shaft axially in one direction, the shaft having a transverse edge, an abutment pin supported for engagement by the edge to limit movement of the shaft axially by the yieldable means, the edge having a cut-away portion at one angular position of the shaft corresponding to one speed ratio only, to permit axial movement of the shaft to a supplemental position by the yieldable means only after it has been displaced to the position of said ratio, a power shifter means to change the speed ratio, and control mechanism for effecting operation of the power shifter means including conditioning means operated to an actuating position by displacement of the shaft axially to its supplemental position.

62. In a control for a transmission, a hand lever having movement in an H pattern to establish a plurality of speed ratios, a shifter shaft upon which the handle is mounted, the shaft having axial movement corresponding to movement of the handle in neutral, across the bar of the H, and having rocking movement from each end of the axial movement, in opposite directions, yieldable means normally urging the shaft axially in one direction, the shaft having a transverse edge, an abutment pin supported for engagement by the edge to limit movement of the shaft axially by the yieldable means, the edge having a cut-away portion at one angular position of the shaft corresponding to one speed ratio only, to permit axial movement of the shaft to a supplemental position by the yieldable means only after it has been displaced to the position of said ratio, a power shifter means to change the speed ratio, and control mechanism for effecting operation of the power shifter means including conditioning means operated to an actuating position by displacement of the shaft axially to its supplemental position, the pin having a larger portion of size too great to be received in the cut-away portion of the edge, and a smaller portion receivable in the cut-away portion, means normally disposing the pin so that the larger portion is positioned to be engaged by the edge on the shaft, and means to displace the pin to move the smaller portion into position to be engaged by the edge on the shaft, and to be received by the cut-away portion thereof.

63. In a control for a transmission, a hand lever having movement in an H pattern to establish a plurality of speed ratios, a shifter shaft upon which the handle is mounted, the shaft having axial movement corresponding to movement of the handle in neutral, across the bar of the H, and having rocking movement from each end of the axial movement, in opposite directions, yieldable means normally urging the shaft axially in one direction, the shaft having a transverse edge, an abutment pin supported for engagement by the edge to limit movement of the shaft axially by the yieldable means, the edge having a cut-away portion at one angular position of the shaft corresponding to one speed ratio only, to permit axial movement of the shaft to a supplemental position by the yieldable means only after it has been displaced to the position of said ratio, a power shifter means to change the speed ratio, and control mechanism for effecting operation of the power shifter means including conditioning means operated to an actuating position by displacement of the shaft axially to its supplemental position, the pin having a larger portion of size too great to be received in the cut-away portion of the edge, and a smaller portion receivable in the cut-away portion, means normally disposing the pin so that the larger portion is positioned to be engaged by the edge on the shaft, and means to displace the pin to move the smaller portion into position to be engaged by the edge on the shaft, and to be received by the cut-away portion thereof, the last named means including an accelerator pedal for an engine connected with the transmission.

64. A vacuum storage system including a vacuum tank, an inlet pipe connecting into the tank, a valve controlling flow through the pipe, pressure-responsive means to open the valve and close it, the said means including a movable wall comprising part of the tank wall exposed to pressure within the tank, operatively connected to the valve and disposed opposite the inlet, and the wall having one side connected to the inlet, whereby the tank may be opened whenever the pressure is relatively high in the tank and the pressure is correspondingly low at the source.

65. A vacuum storage system including a tank, a vacuum pipe connected into the tank and adapted to be connected to a source of vacuum, a valve controlling connection of the vacuum pipe and the tank, a pressure-responsive device for operating the valve, said pressure-responsive device comprising a movable wall, means connecting the wall to the valve, yieldable force means normally urging the valve closed, means enclosing the wall and connecting one side of the wall to the vacuum pipe and the other side to the interior of the tank, said yieldable force means acting in opposition to the pressure within the tank acting on the wall and against the valve, whereby the wall may move when interior pressure has a predetermined excess over vacuum pipe pressure to open the valve.

66. In power transmitting mechanism, an internal-combustion engine controlled by an accelerator-operated carburetor throttle, said accelerator being operatable to and between two extreme positions, a variable-speed gear transmission selectively controlled by a manually-operable gear shifting lever having a supplemental position from a speed establishing positions thereof, and a two-speed gearing arranged in series with said transmission and driven thereby: energizable power means operable for selectively shifting said gearing; electro-magnetically operated valve means for controlling the operation of said power means including switch means and circuits therefor connectable to a source of electrical energy, said switch means being operatively connected to and controlled by said shifting lever and accelerator to operate said valve means to cause said power means to selectively shift said gearing from one speed to the other when said shifting lever is set in its supplemental position and said accelerator is in a predetermined engine controlling position.

67. In control mechanism for a two-speed gearing for driving the axle of a motor vehicle having an internal-combustion engine controlled by an accelerator-operated carburetor throttle, said accelerator being operatable to and between two extreme positions, said gearing being in turn driven by a variable-speed gear transmission selectively actuatable by a manually-movable gear shifting lever settable into a supplemental position substantially normal to its aforesaid gear actuating position without disrupting the actuated relation of said lever with said transmission; energizable power means operable for alternately shifting said gearing: electro-magnetically operated valve means for controlling the operation of said power means; selective switch means including circuit means connectable to a source of electrical energy for energizing said valve means, and operatively connected to and controlled by said shifting lever operated to its aforesaid supplemental position, and said accelerator for operating said valve means to cause said power means to shift said gearing alternately from one speed to the other automatically in response to successive movements of said accelerator between its extreme positions when a speed is actuated in said transmission, and said shifting lever is moved from said actuating position to its aforesaid supplemental position to effect the closing of said selective switch means.

68. In control mechanism for a two-speed gearing for driving the axle of a motor vehicle having an internal-combustion engine controlled by an accelerator-operated carburetor throttle, said accelerator being operatable to and between two extreme positions, said gearing in turn being driven by a variable-speed gear transmission selectively controlled by a manually-operable gear shifting lever operated in a rotational connected relation with said transmission and having a settable supplemental position from a speed establishing position thereof without disrupting said rotational connection; energizable power means operable for alternately shifting said gearing; electro-magnetically operated valve means for controlling the operation of said power means; selective switch means including circuit means connectable to a source of electrical energy, and operatively connected to and controlled by said shifting lever and accelerator for operating said valve means to cause said power means to shift said gearing alternately from one speed to the other automatically in response to successive like movements of said accelerator from only one of its extreme positions when said transmissions are in a speed established condition, and said shifting lever is moved therefrom to its supplemental position to effect the closing of said selective switch means.

69. In control mechanism for a two-speed gearing driven from the driving shaft of a variable-speed gear transmission selectively controlled by a manually-operable gear shifting lever of a motor vehicle equipped with a speed-responsive switch; and an engine controlled by an accelerator-operated carburetor throttle; an energizable power device for selectively operating said gearing; electro-magnetically operated valve means for controlling the operation of said power means including circuits connectable to a source of electrical energy; a first switch operable by said shifting lever; a second switch operatively connected to and controlled by movement of said accelerator to a predetermined engine controlling position, said electro-magnetic valve means being energized by said aforementioned switches in closed condition, and said speed-responsively controlled switch operating in closed condition at substantially a predetermined vehicular speed.

70. In control mechanism for a two-speed gearing driven from the driving shaft of a variable-speed gear transmission selectively controlled by a manually-operable gear shifting lever movable supplementally from a speed establishing position thereof to a second position of a motor vehicle having an engine controlled by an accelerator-operated carburetor throttle; the combination of a two-speed gearing driven by said transmission, energizable power-means operable for selectively shifting said gearing to establish either of said two speeds, electro-magnetically operated valve means for controlling the operation of said power means including circuits connectable to a source of electrical energy, and means for selectively conditioning for operation at will said electro-magnetic means comprising a shifting lever operated switch, and a second switch controlled by movement of said accelerator to a predetermined engine controlling position.

71. In control mechanism for a multi-speed automotive drive assembly embodying a friction clutch having operating means therefor, a multi-speed gear transmission controlled by a manually-operable gear shifting lever, a dual-gear ratio auxiliary transmission driven by said first-named transmission and controlled by energizable power means: solenoid operated dual-valves for controlling the aforesaid operation of said power means, a primary electrical circuit including means for operating said valve means, means controllable when said shift-lever is moved at will from a gear-engaged position of said first-named transmission without disturbing said engaged condition, to a supplemental position, and said clutch is fully engaged for closing said switch-circuit for causing said valve means to energize said power means as aforesaid, a secondary electrical circuit including other switch means and one of said valves, and means controlled by operating said clutch to disengaged condition for closing said last-named switch-circuit upon return of said shift-lever to its said gear-engaged position for causing said last-named valve to energize said power means in one direction only.

72. In a control for variable-speed transmissions having at least two establishable different forward speed drives; a manually-operable lever movable rotationally into a first position, and axially displaceable therefrom into a second position; connecting means between the lever and transmission operated by movement of the lever into first position to establish the first of the two speed drives, and adapted to accommodate displacement of the lever into a second position; means rendered operative upon displacement of the lever into second position without disrupting the first position connection thereof, to establish either the first or the second speed drive, said last-named means including a pedally-controlled member movable to predetermine which of the two speed drives will be established when operated; and operating means for the second-named means.

73. In a shifter mechanism for a change-speed transmission having means providing a plurality of speed drives including an overdrive, and interconnected with an engine; manually-operable means for selectively controlling said speed drives and movable to an overdrive controlling position; an accelerator pedal for the engine and having a path of movement defined by two extreme positions; power means energizable to effect shift of the overdrive; a source of power to energize the power means; and control means to cause energization of the power means by said source to thereby effect shift of the overdrive from overdrive to another of said speed drives, including the manually-operable means in overdrive controlling position and the accelerator pedal at one of its extreme positions.

GLENN T. RANDOL.

References Cited in the file of this patent

UNITED STATES PATENTS

| Number | Name | Date |
|---|---|---|
| 1,786,195 | Dormoy | Dec. 23, 1930 |
| 1,870,341 | Maybach | Aug. 9, 1932 |
| 1,966,865 | Linsley | July 17, 1934 |
| 2,030,838 | Hill et al. | Feb. 11, 1936 |
| 2,051,553 | Fleischel | Aug. 18, 1936 |
| 2,092,446 | Fleischel | Sept. 7, 1937 |
| 2,231,966 | Swennes | Feb. 18, 1941 |
| 2,234,463 | Brewer | Mar. 11, 1941 |
| 2,238,133 | Sanford | Apr. 15, 1941 |
| 2,261,898 | Barkeij | Nov. 4, 1941 |
| 2,277,914 | Kesling | Mar. 31, 1942 |
| 2,373,259 | Price | Apr. 10, 1945 |
| 2,384,448 | Banker | Sept. 11, 1945 |
| 2,398,407 | Brownyer | Apr. 16, 1946 |
| 2,402,343 | Price | June 18, 1946 |
| 2,532,945 | Robinson | Dec. 5, 1950 |